US009661609B2

(12) United States Patent
Jechoux et al.

(10) Patent No.: US 9,661,609 B2
(45) Date of Patent: May 23, 2017

(54) RADIO COMMUNICATION DEVICE AND METHOD FOR OPERATING A RADIO COMMUNICATION DEVICE

(71) Applicant: Intel Mobile Communications GmbH, Neubiberg (DE)

(72) Inventors: Bruno Jechoux, Antibes (FR); Francois Deparis, Zirndorf (DE); Matthias Hofmann, Freital (DE); Volker Aue, Dresden (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/832,839

(22) Filed: Mar. 15, 2013

(65) Prior Publication Data
US 2013/0259010 A1     Oct. 3, 2013

Related U.S. Application Data

(60) Provisional application No. 61/618,917, filed on Apr. 2, 2012.

(51) Int. Cl.
*H04W 72/02*     (2009.01)
*H04W 88/06*     (2009.01)

(52) U.S. Cl.
CPC ............ *H04W 72/02* (2013.01); *H04W 88/06* (2013.01)

(58) Field of Classification Search
CPC .............................. H04W 72/02; H04W 88/06
(Continued)

(56) References Cited

U.S. PATENT DOCUMENTS 6,301,238 B1    10/2001 Hagerman et al.
6,351,653 B1     2/2002 Alberth, Jr. et al.
(Continued)

FOREIGN PATENT DOCUMENTS

CN    1357175 A    7/2002
CN    1436429 A    8/2003
(Continued)

OTHER PUBLICATIONS

Office Action received for German Patent Application No. 10 2013 103 275.3, Mailed on Sep. 19, 2014, 8 pages of Office Action and 3 pages of English translation.
(Continued)

*Primary Examiner* — Kan Yuen
*Assistant Examiner* — Richard Chang
(74) *Attorney, Agent, or Firm* — Viering, Jentschura & Partner mbB

(57) ABSTRACT

According to an aspect of this disclosure, a radio communication device is provided including a first transceiver configured to transmit and receive signals in accordance with a Cellular Wide Area radio communication technology; a second transceiver configured to transmit and receive signals in accordance with a Short Range radio communication technology; a first processor configured to control the first transceiver to receive and transmit data packets in accordance with a first data transmission frame; a second processor configured to control the second transceiver to receive and transmit data packets in accordance with a second data transmission frame; wherein the first processor is further configured to control the first transceiver such that the first transceiver does not transmit a data packet during at least a time period provided for a first transmission of a respective data packet transmitted by the second transceiver in accordance with the second data transmission frame.

18 Claims, 39 Drawing Sheets

(58) Field of Classification Search
USPC .................. 370/252, 311, 350; 455/436, 501
See application file for complete search history.

(56) References Cited

U.S. PATENT DOCUMENTS

| | | | |
|---|---|---|---|
| 6,891,841 | B2 | 5/2005 | Leatherbury et al. |
| 7,171,165 | B2 | 1/2007 | Azman et al. |
| 8,121,068 | B2 | 2/2012 | Zhu |
| 8,189,535 | B2 | 5/2012 | Akselsen |
| 8,265,563 | B2 | 9/2012 | Beninghaus et al. |
| 8,279,813 | B2 | 10/2012 | Lomnitz et al. |
| 8,345,704 | B2 | 1/2013 | Desai et al. |
| 8,520,586 | B1 | 8/2013 | Husted et al. |
| 8,688,142 | B2 | 4/2014 | Feher |
| 8,792,431 | B2 | 7/2014 | Kondo |
| 8,797,895 | B2 | 8/2014 | Baba et al. |
| 8,886,265 | B2 | 11/2014 | Rofougaran |
| 2004/0176039 | A1 | 9/2004 | Leyh et al. |
| 2005/0020213 | A1 | 1/2005 | Azman et al. |
| 2005/0215284 | A1 | 9/2005 | Su et al. |
| 2007/0153729 | A1 | 7/2007 | Alapuranen |
| 2007/0165754 | A1 | 7/2007 | Kiukkonen et al. |
| 2008/0043705 | A1 | 2/2008 | Desai et al. |
| 2008/0062919 | A1 | 3/2008 | Chen et al. |
| 2009/0017756 | A1 | 1/2009 | Tsfaty et al. |
| 2009/0129367 | A1 | 5/2009 | Bitran |
| 2009/0147763 | A1 | 6/2009 | Desai et al. |
| 2009/0156276 | A1 | 6/2009 | Rofougaran |
| 2009/0258607 | A1 | 10/2009 | Beninghaus et al. |
| 2009/0279511 | A1 | 11/2009 | Zhu |
| 2010/0027525 | A1 | 2/2010 | Zhu |
| 2010/0091747 | A1 | 4/2010 | Dorsey et al. |
| 2010/0142500 | A1 | 6/2010 | Sudak |
| 2010/0178919 | A1 | 7/2010 | Deepak et al. |
| 2010/0197235 | A1 | 8/2010 | Wilhelmsson |
| 2010/0304685 | A1 | 12/2010 | Wietfeldt et al. |
| 2011/0141989 | A1 | 6/2011 | Kondo |
| 2011/0188398 | A1 | 8/2011 | Baba et al. |
| 2011/0205978 | A1 | 8/2011 | Nory et al. |
| 2011/0243094 | A1 | 10/2011 | Dayal et al. |
| 2011/0292854 | A1 | 12/2011 | Terry et al. |
| 2012/0020229 | A1 | 1/2012 | Dayal et al. |
| 2012/0033645 | A1* | 2/2012 | Mantravadi ....... H04W 72/1215 370/336 |
| 2012/0069766 | A1 | 3/2012 | Fu et al. |
| 2012/0071185 | A1 | 3/2012 | Dayal et al. |
| 2012/0120821 | A1* | 5/2012 | Kazmi et al. ................. 370/252 |
| 2012/0163307 | A1 | 6/2012 | Wang et al. |
| 2012/0184327 | A1* | 7/2012 | Love .................... H04B 1/0064 455/552.1 |
| 2012/0243473 | A1 | 9/2012 | Kadous et al. |
| 2012/0269107 | A1 | 10/2012 | Palm et al. |
| 2012/0275362 | A1 | 11/2012 | Park et al. |
| 2013/0072209 | A1 | 3/2013 | Haartsen |
| 2013/0102261 | A1 | 4/2013 | Le Naour et al. |
| 2013/0194938 | A1 | 8/2013 | Immonen et al. |
| 2013/0260687 | A1 | 10/2013 | Paycher et al. |
| 2014/0120969 | A1 | 5/2014 | Sang et al. |

FOREIGN PATENT DOCUMENTS

| | | |
|---|---|---|
| CN | 1535551 A | 10/2004 |
| CN | 1606257 A | 4/2005 |
| CN | 1729652 A | 2/2006 |
| CN | 1738310 A | 2/2006 |
| CN | 101132368 A | 2/2008 |
| CN | 101427518 A | 5/2009 |
| CN | 101453759 A | 6/2009 |
| CN | 101459442 A | 6/2009 |
| CN | 102017726 A | 1/2010 |
| CN | 101640565 A | 2/2010 |
| CN | 101682540 A | 3/2010 |
| CN | 101874386 A | 10/2010 |
| CN | 101919302 A | 12/2010 |
| CN | 102014086 A | 4/2011 |
| CN | 102100118 A | 6/2011 |
| CN | 102138288 A | 7/2011 |
| CN | 102308611 A | 1/2012 |
| CN | 102396293 A | 3/2012 |
| CN | 102450050 A | 5/2012 |
| CN | 102870339 A | 1/2013 |
| CN | 103004246 A | 3/2013 |
| CN | 103222321 A | 7/2013 |
| WO | 0079694 A1 | 12/2000 |
| WO | 02096144 A1 | 11/2002 |
| WO | 2004056045 A1 | 7/2004 |
| WO | 2007117906 A1 | 10/2007 |
| WO | 2008124445 A1 | 10/2008 |
| WO | 2009042469 A1 | 4/2009 |
| WO | 2009114802 A1 | 9/2009 |
| WO | 2010025678 A1 | 3/2010 |
| WO | 2010045548 A1 | 4/2010 |
| WO | 2010089281 A1 | 8/2010 |
| WO | 2011034865 A1 | 3/2011 |
| WO | 2011050713 A1 | 5/2011 |
| WO | 2011113317 A1 | 9/2011 |
| WO | 2011123555 A1 | 10/2011 |
| WO | 2011137007 A1 | 11/2011 |
| WO | 2011157235 A1 | 12/2011 |
| WO | 2012/021879 A2 | 2/2012 |
| WO | 2012-052791 A1 | 4/2012 |

OTHER PUBLICATIONS

Office Action received for German Patent Application No. 10 2013 103 270.2, Mailed on Sep. 15, 2014, 5 pages of Office Action and 4 pages of English translation.

Office Action received for German Patent Application No. 10 2013 103 262.1, Mailed on Jul. 17, 2014, 8 pages of Office Action and 3 pages of English translation.

Office Action received for German Patent Application No. 10 2013 103 265.6, Mailed on Sep. 16, 2014, 5 pages of Office Action and 3 pages of English translation.

Office action received for German Patent Application No. 102013105589.3, mailed on Oct. 21, 2014, 6 pages of office action and 4 pages of English Translation.

Office action received for U.S. Appl. No. 13/714,463, mailed on Oct. 28, 2014, 22 pages of office action.

Office action received for Taiwanese Patent Application No. 102115463, mailed on Aug. 20, 2014, 14 pages of office action including 7 pages of English Translation.

Office action received for German Patent Application No. 10 2013 104 564.2, mailed on Aug. 4, 2014, 18 pages of office action including 6 pages of English Translation.

Office action received for U.S. Appl. No. 13/834,723, mailed on Jan. 16, 2014, 29 pages.

Office action received for U.S. Appl. No. 13/834,723, mailed on Jul. 18, 2014, 33 pages.

Office action received for U.S. Appl. No. 13/714,463, mailed on Jan. 16, 2014, 21 pages.

Office action received for U.S. Appl. No. 13/714,463, mailed on Jul. 17, 2014, 23 pages.

Office Action received for German Patent Application No. 10 2013 103 283.4, Mailed on Sep. 5, 2013, 10 pages of Office Action including 4 pages of English Translation.

3rd Generation Partnership Project; Technical Specification Group Radio Access Network; Evolved Universal Terrestrial Radio Access (E-UTRA); Physical Channels and Modulation (Release 10), 3GPP TS 36.211, V10.4.0, Dec. 2011, pp. 1-101.

Office Action received for Chinese Patent Application No. 201310160490.7, dated Nov. 26, 2014 (14 pages) including English translation (29 pages), 43 pages.

Office Action received for Chinese Patent Application No. 201310112883.0, dated Dec. 3, 2014 (12 pages) including English translation (23 pages), 35 pages.

Office Action received for Chinese Patent Application No. 201310112850.6, dated Dec. 3, 2014 (9 pages) including English translation (20 pages), 29 pages.

(56) References Cited

OTHER PUBLICATIONS

Office Action received for U.S. Appl. No. 13/833,007, dated Feb. 9, 2015, 16 pages.
Notice of Allowance of the U.S. Appl. No. 13/837,035 dated Feb. 11, 2015.
Non-Final Office Action of the U.S. Appl. No. 13/832,801 dated Feb. 12, 2015.
Office Action received for Chinese Patent Application No. 201310209272.8, dated Jan. 4, 2015 (7 pages), including English translation (13 pages), 20 pages.
Office Action received for German Patent Application No. 10 2013 105 587.7, dated Feb. 25, 2015, 8 pages.
Non-Final Office Action received for U.S. Appl. No. 13/833,534 dated Mar. 27, 2015.
Notice of Allowance received for U.S. Appl. No. 13/832,937 dated Mar. 18, 2015.
Non-Final Office Action of the U.S. Appl. No. 13/714,463 dated May 8, 2015.
Final Office Action of the U.S. Appl. No. 13/833,007 dated May 12, 2015.
Final Office Action of the U.S. Appl. No. 13/832,801 dated May 5, 2015.
Office action received for U.S. Appl. No. 13/837,035, mailed on Oct. 24, 2014, 11 pages.
Office action received for U.S. Appl. No. 13/835,062, mailed on Dec. 26, 2014, 17 pages.
Office action received for U.S. Appl. No. 13/834,723, mailed on Dec. 31, 2014, 30 pages.
Office action received for U.S. Appl. No. 13/832,937, mailed on Dec. 16, 2014, 14 pages.
Office action received for U.S. Appl. No. 13/833,007, mailed on Nov. 12, 2014, 6 pages.
Office action received for U.S. Appl. No. 13/832,801, mailed on Nov. 12, 2014, 7 pages.
Office Action received for the corresponding CN Patent Application No. 201310160490.7, dated Sep. 17, 2015, 13 pages of Office Action and 29 pages of English Translation.
Office Action received for the corresponding CN Patent Application No. 201310209276.6, dated Sep. 21, 2015, 9 pages of Office Action and 19 pages of English Translation.
Non-final Office Action of the U.S. Appl. No. 13/833,534, dated Oct. 23, 2015, 13 pages.
Non-final Office Action of the U.S. Appl. No. 13/833,007, dated Oct. 14, 2015, 17 pages.
Final Office Action of the U.S. Appl. No. 13/714,463, dated Oct. 7, 2015, 19 pages.
Non-final Office Action of the U.S. Appl. No. 13/834,723, dated Sep. 22, 2015, 23 pages.
Office Action received for the corresponding Chinese patent application No. 201310112883.0, issued Jul. 31, 2015, 32 pages including 21 pages of English translation.
Office Action received for the corresponding Chinese patent appliation No. 201310112850.6, issued on Jul. 31, 2015, 30 pages, including 19 pages of English translation.
Office Action for the corresponding Chinese patent appliation No. 201310112878.X, issued on Aug. 5, 2015, 18 pages, including 12 pages of English translation.
Office Action received for the corresponding Chinese patent appliation No. 201310112882.6, issued on Aug. 25, 2015, 8 pages, for reference purposes only.
Office Action received for the corresponding Chinese patent appliation No. 201310112849.3, issued on Aug. 26, 2015, 9 pages, for reference purposes only.
Non-final Office Action of the U.S. Appl. No. 13/832,801, dated Nov. 13, 2015, 19 pages.
Office Action received for the corresponding DE Patent Application No. 10 2014 101 562.2 dated Feb. 1, 2016, 8 pages of Office Action (information purpose only).
Office Action received for the corresponding CN Patent Application No. 201310112850.6 dated Feb. 3, 2016, 11 pages of Office Action and 23 pages of English translation.
Office Action received for the corresponding CN Patent Application No. 201310112883.0 dated Feb. 3, 2016, 5 pages of Office Action and 7 pages of English translation.
Office Action received for the corresponding DE Patent Application No. 10 2013 103 283.4 dated Jan. 11, 2016, 7 pages of Office Action (information purpose only).
Office Action received for the corresponding CN Patent Application No. 201310209272.8 dated Dec. 21, 2015, 4 pages of Office Action and 8 pages of English translation.
Final Office Action received for the corresponding U.S. Appl. No. 13/833,007, dated Mar. 16, 2016, 23 pages of Office Action.
Final Office Action received for the corresponding U.S. Appl. No. 13/832,801, dated Mar. 16, 2016, 19 pages of Office Action.
Office Action received for the corresponding CN Patent Application 201310112849.3, dated Mar. 22, 2016, 9 pages of Office Action and 13 pages of English translation.
Final Office Action received for the corresponding U.S. Appl. No. 13/714,463 dated Mar. 24, 2016, 19 pages of Office Action.
Office Action received for the corresponding CN Patent Application 201310112878.X, dated Apr. 12, 2016, 5 pages of Office Action and 12 pages of English translation.
Final Office Action received for the corresponding U.S. Appl. No. 13/833,534 dated May 20, 2016, 15 pages of Office Action.
Office Action received for the corresponding CN Patent Application 201310112882.6., dated May 24, 2016, 8 pages of Office Action (for Reference Purpose Only).
Notice of Allowance received for the U.S. Appl. No. 13/834,723, dated Jun. 6, 2016, 7 pages.
Office Action received for corresponding CN Application No. 201310160490.7 dated Oct. 8, 2016, 8 pages, including its English Translation of 5 pages.
Notice of Allowance received for corresponding CN Application No. 201310112849.3 dated Sep. 5, 2016, 5 pages, including its English Translation of 2 pages.
Office Action received for corresponding U.S. Appl. No. 13/833,534 dated Nov. 7, 2016, 14 pages.
Office Action received for corresponding U.S. Appl. No. 14/741,489 dated Sep. 28, 2016, 19 pages.
Office Action received for corresponding CN Application No. 201310112878.X dated Oct. 26, 2016, 17 pages, including its English Translation of 12 pages.
Office Action received for corresponding U.S. Appl. No. 13/714,463 dated Sep. 23, 2016, 14 pages.
Office Action received for the corresponding CN Patent Application No. 201310209272.8, dated Jul. 4, 2016, 3 pages of Office Action and 4 pages of English translation.
Notice of Allowance received for the corresponding U.S. Appl. No. 13/833,007 dated Jul. 1, 2016, 9 pages.
Office Action received for the corresponding CN Patent Application No. 201310209276.6, dated Jun. 14, 2016, 8 pages of Office Action and 11 pages of English translation.
Notice of Reexamination received for the corresponding CN Patent Application No. 201310160490.7, dated Jul. 7, 2016, 8 pages of Reexamination Notice and 12 pages of English translation.
Notice of Allowance received for the corresponding U.S. Appl. No. 13/832,801, dated Jul. 29, 2016, 9 pages.
Office Action received for the corresponding CN Patent Application 201410094905.X dated Jan. 5, 2017, 7 pages and 11 pages of English translation (For reference purpose only).
Restriction Requirement received for the corresponding U.S. Appl. No. 15/281,082, dated Mar. 13, 2017, 6 pages (For reference purpose only).
Office Action received for the corresponding CN Patent Application 201310112882.6 dated Mar. 13, 2017, 8 pages (For reference purpose only).
Final Office Action received for the corresponding U.S. Appl. No. 14/741,489, dated Mar. 23, 2017, 25 pages (For reference purpose only).

\* cited by examiner

2900

RADIO COMMUNICATION DEVICE AND METHOD FOR OPERATING A RADIO COMMUNICATION DEVICE

CROSS-REFERENCE TO RELATED APPLICATION

This application claims the benefit of U.S. provisional application No. 61/618,917, filed 2 Apr. 2012, the content of it being hereby incorporated by reference in its entirety for all purposes.

TECHNICAL FIELD

The present disclosure relates to radio communication devices and methods for operating a radio communication device.

BACKGROUND

Mobile communication terminals may support a plurality of radio access technologies, e.g. a cellular radio communication technology, e.g. LTE (Long Term Evolution) and a Short Range radio communication technology (e.g. Bluetooth or WLAN) or a Metropolitan Area System radio communication technology such as WiMax. Although typically, different frequency bands are allocated to such different radio access technology there may still be interference between them, for example when a mobile communication terminal wants to operate two different radio access technologies in parallel. Avoiding such interference and improving coexistence between different radio access technologies is desirable.

SUMMARY

According to an aspect of this disclosure, a radio communication device is provided including a first transceiver configured to transmit and receive signals in accordance with a Cellular Wide Area radio communication technology; a second transceiver configured to transmit and receive signals in accordance with a Short Range radio communication technology; a first processor configured to control the first transceiver to receive and transmit data packets in accordance with a first data transmission frame; a second processor configured to control the second transceiver to receive and transmit data packets in accordance with a second data transmission frame; wherein the first processor is further configured to control the first transceiver such that the first transceiver does not transmit a data packet during at least a time period provided for a first transmission of a respective data packet transmitted by the second transceiver in accordance with the second data transmission frame.

According to a further aspect of this disclosure, a method for operating radio communication devices corresponding to the radio communication device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Figure 1:
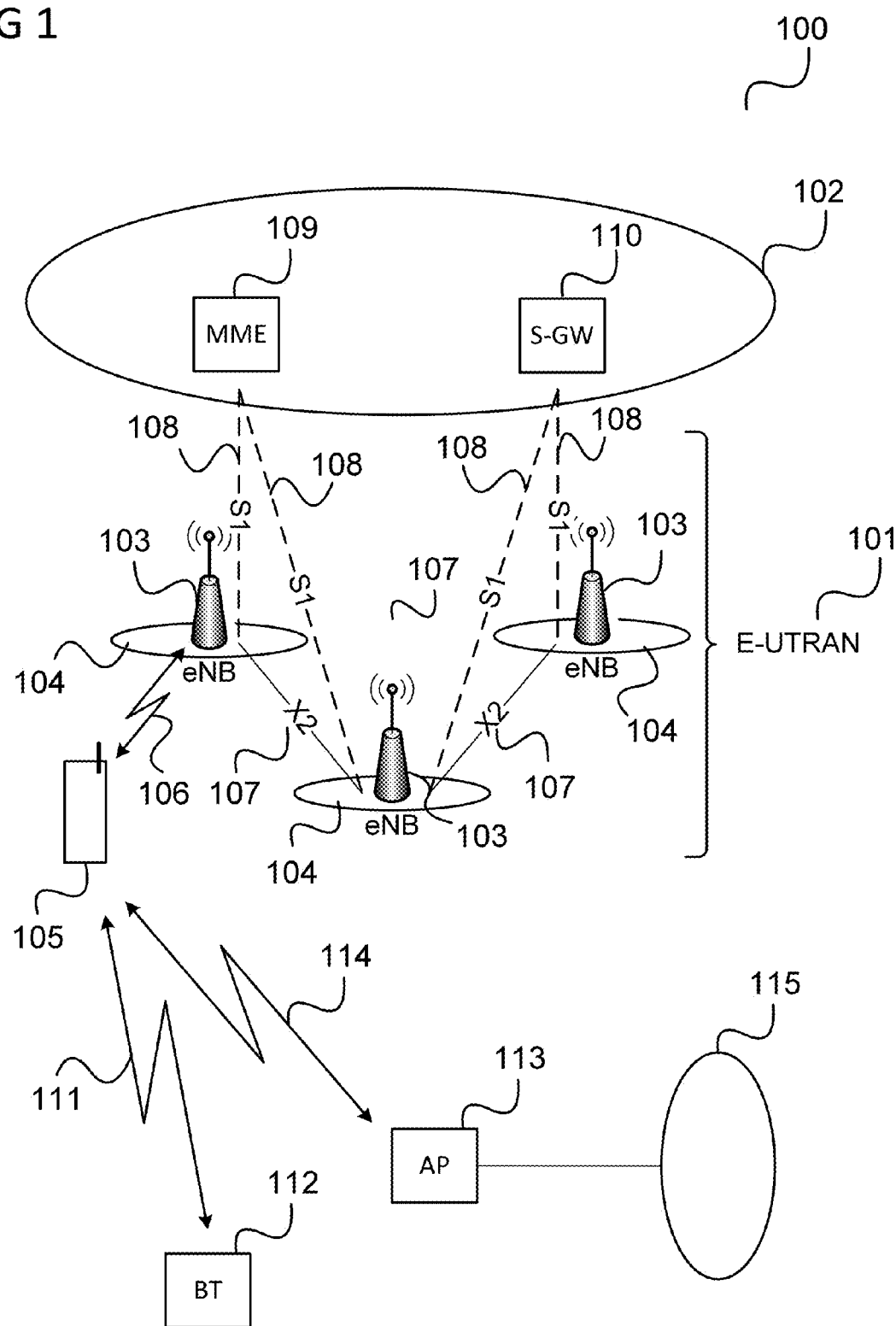
FIG. 1 shows a communication system according to an aspect of this disclosure.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that is used according to an aspect of this disclosure and which for example a communication system according to LTE is described in the following with reference to FIG. 1.

FIG. 1 shows a communication system 100 according to an aspect of this disclosure.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109);

CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

In addition to the communication via the E-UTRAN 102, the mobile terminal 105 may support communication via a Bluetooth (BT) communication connection 111, for example to another mobile terminal 112 and communication a WLAN communication connection 113 to a WLAN access point (AP) 114. Via the access point 114, the mobile terminal may access a communication network 115 (e.g. the Internet) which may be connected to the core network 102.

LTE operates in a newly allocated set of frequency bands. The major difference introduced by this new set of bands compared to those used for 2G/3G communication systems is that two of them are in the immediate vicinity of the ISM band where WLAN and Bluetooth operate.

Figure 2:
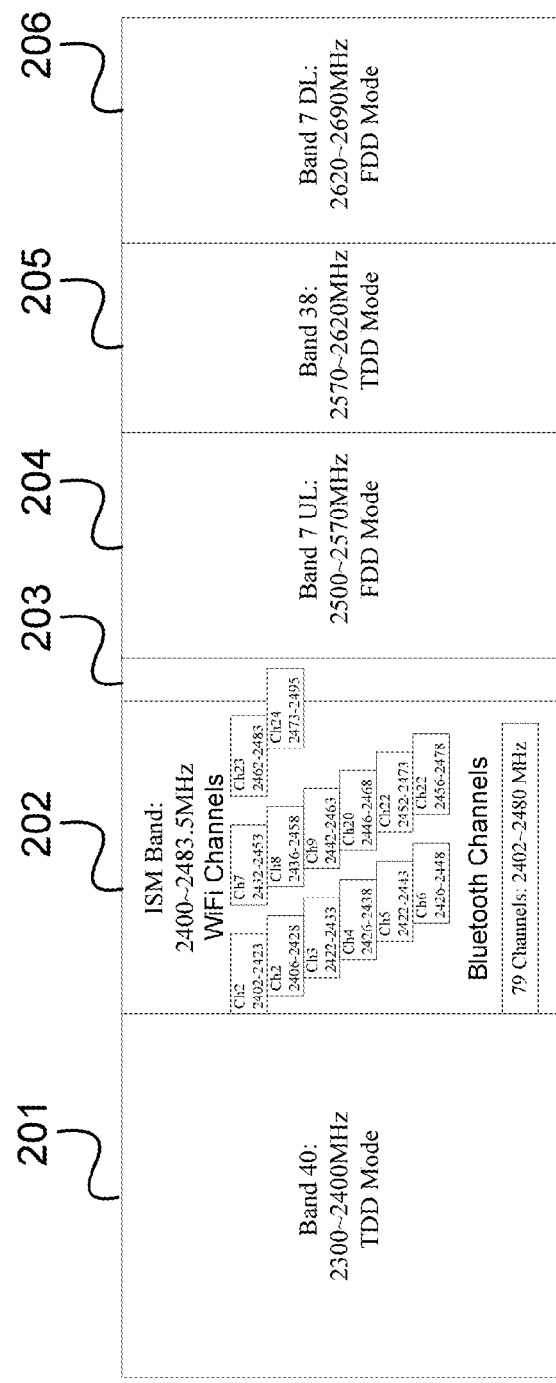
FIG. 2 shows a frequency band diagram.

This is illustrated in FIG. 2.

FIG. 2 shows a frequency band diagram 200.

In the band diagram 200, frequency includes from left to right.

From left to right, LTE-Band 40 201, ISM band 202, LTE-Band 7 UL (Uplink), a guard band 204, LTE-Band 38 205 and LTE-Band 7 DL (Downlink) 206 are shown. The band diagram 200 thus illustrates the spectrum allocated to LTE around the ISM band 202.

LTE-Band 40 201 used by LTE-TDD (Time Division Duplex) is immediately contiguous to the lower band of the ISM band 202 without any guard band in between and LTE-Band 7 204 used for LTE-FDD (Frequency Division Duplex) UL is contiguous to the higher band of the ISM band 202 with the guard band 203 of 17 MHz.

In the following, in order to illustrate the coexistence problems are (in this example between LTE) results of real measurements carried out with current hardware are given. The three test cases for which results are given are:
1: WLAN affecting band 40;
2: LTE band 40 disturbing WLAN in the ISM band;
3: LTE Band 7 disturbing WLAN in the ISM band.
The test system used is illustrated in FIG. 3.

Figure 3:
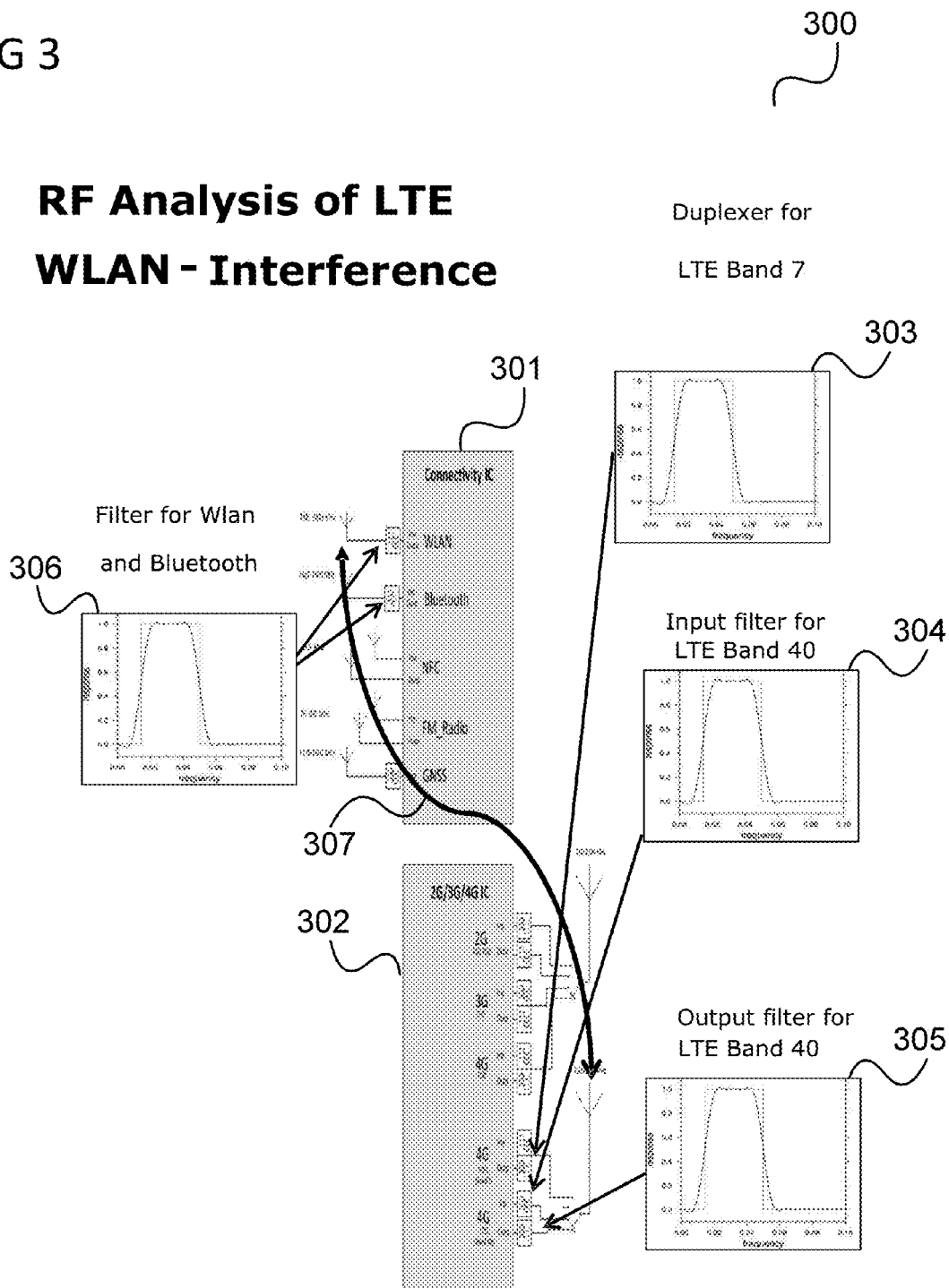
FIG. 3 shows a test system.

FIG. 3 shows a test system 300.

The test system 300 includes a first communication circuit 301 supporting (among others) WLAN and Bluetooth and a second communication circuit 302 supporting (among others) LTE communication. Various filter 303, 304, 305, 306 are provided for the testing.

An arrow 307 indicates the coexistence case of interest in this example (WLAN/LTE coexistence). It should be noted that in the measurements, the RF (radio frequency) analysis has focused on interference via the antennas, and not via pin to pin interference on IC level.

In the first test case, LTE-Band 40 201 is the receiver (or interference victim) and ISM band 202 is the interferer.

Figure 4:
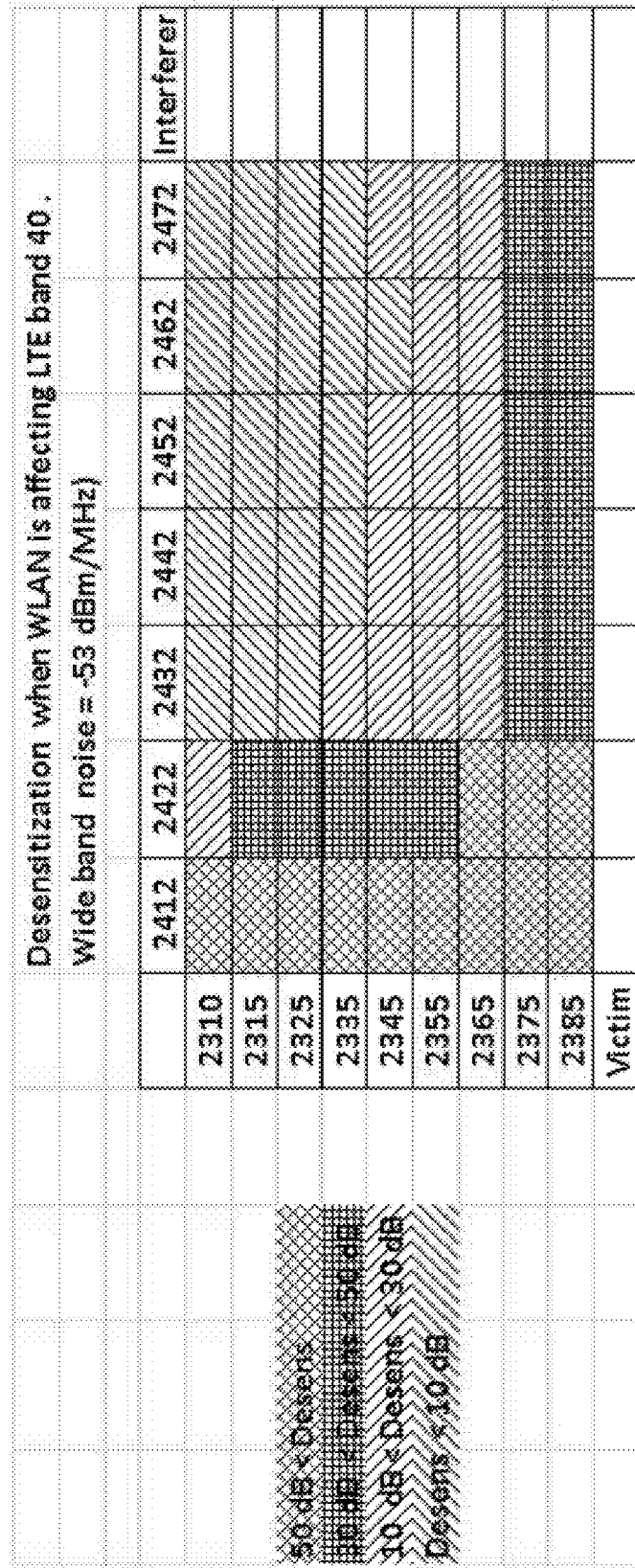
FIG. 4 shows the measurement results of the first test case.

FIG. 4 shows the measurement results of the first test case.

Figure 5:
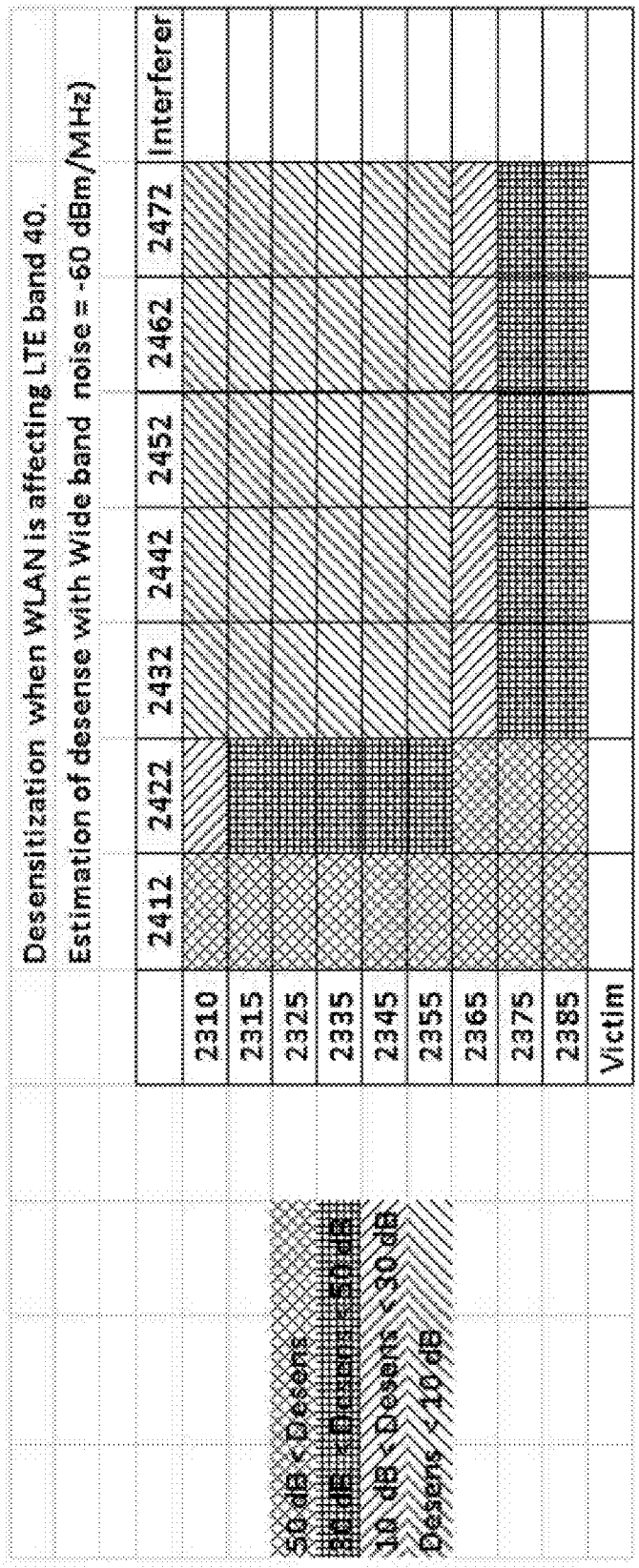
FIG. 5 shows modified measurement results for the first test case for a different wide band noise.

FIG. 5 shows modified measurement results for the first test case for a different wide band noise.

From the first test case, it can be seen that using the lower part of the ISM band desensitizes the whole band 40.

In the second test case, LTE-Band 40 201 is the interferer and ISM band 202 is the receiver (or interference victim).

Figure 6:
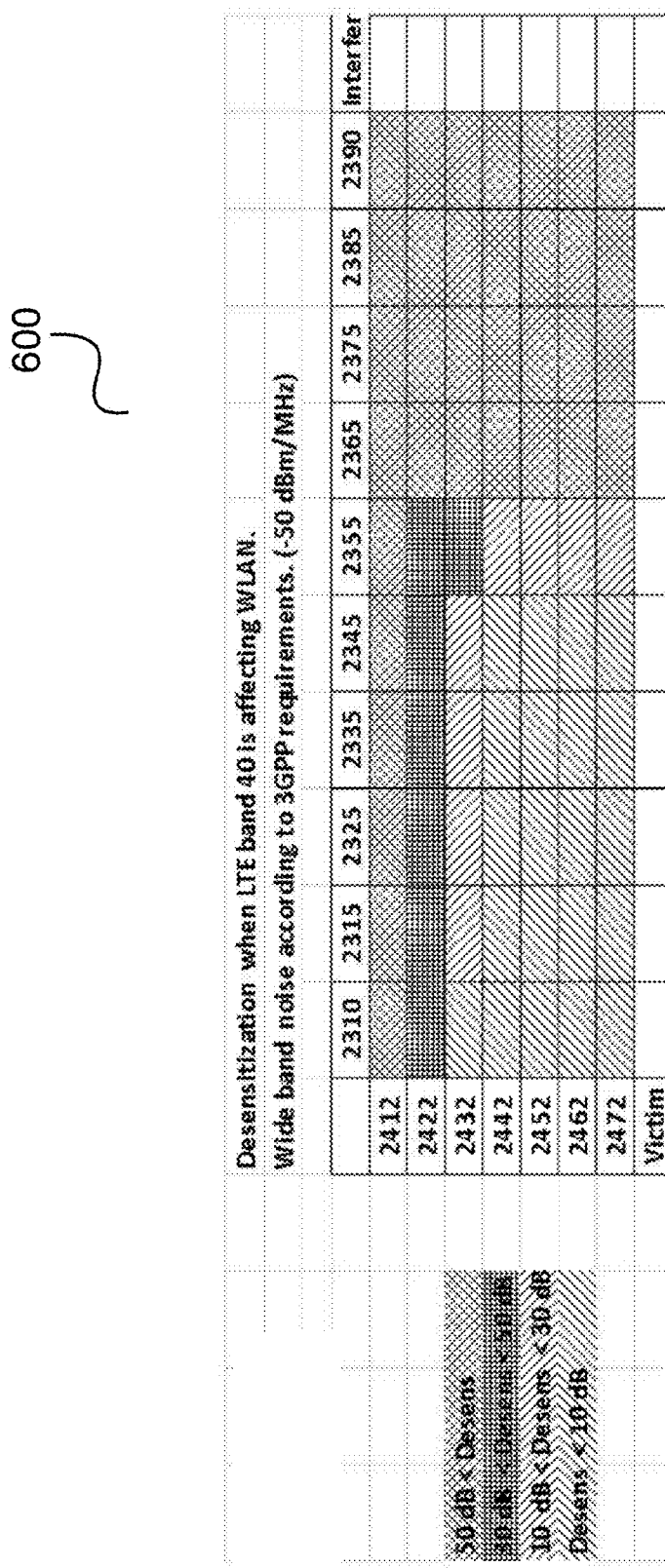
FIG. 6 shows the measurement results of the second test case.

FIG. 6 shows the measurement results of the second test case.

Figure 7:
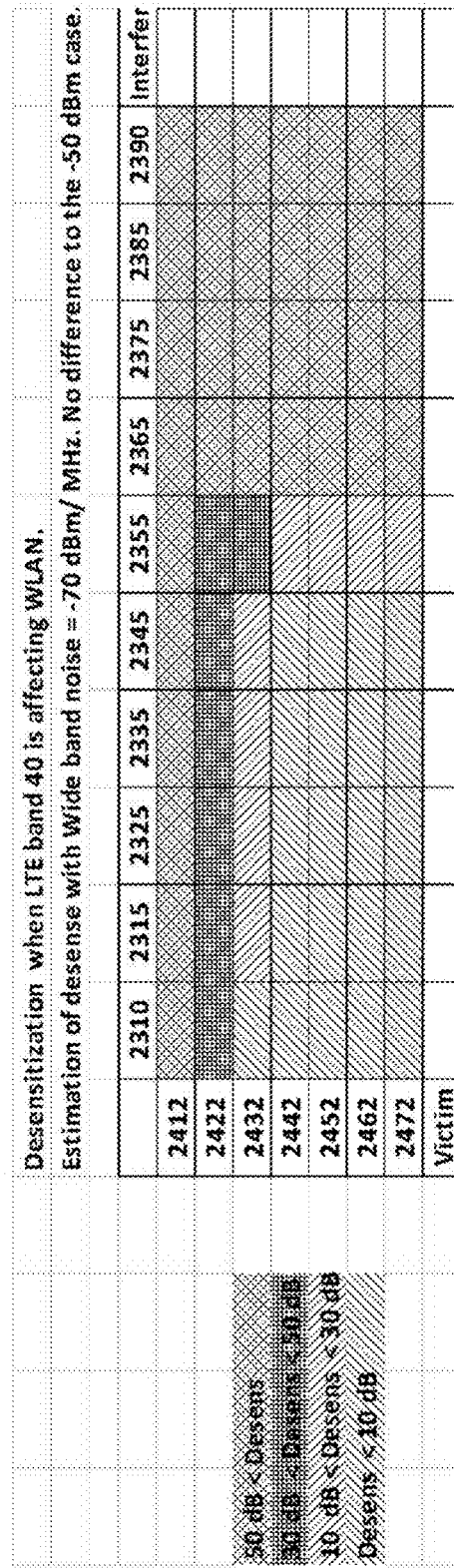
FIG. 7 shows modified measurement results for the second test case for a different wide band noise.

FIG. 7 shows modified measurement results for the second test case for a different wide band noise.

From the second test case, it can be seen that using the higher part of band 40 desensitizes the whole ISM band. Roughly 75% of the frequency combinations have more than 10 dB of desensitization.

In the third test case, LTE-Band 7 UL 204 is the interferer and ISM band 202 is the receiver (or interference victim).

Figure 8:
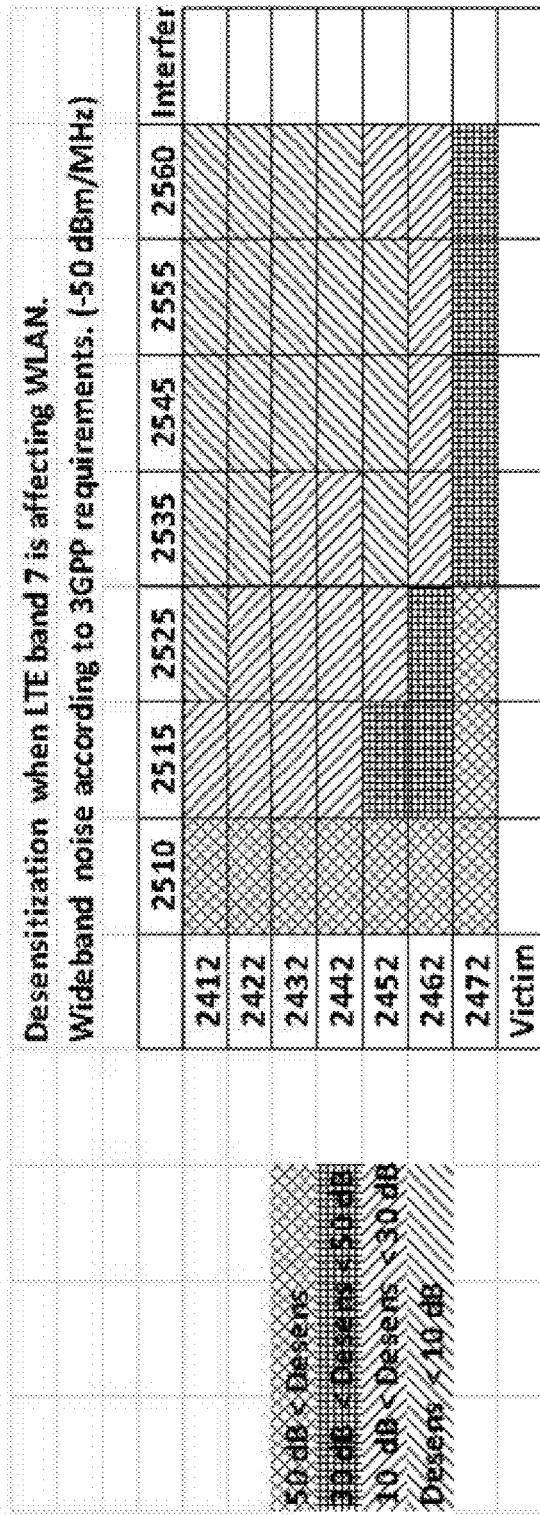
FIG. 8 shows the measurement results of the second test case.

FIG. 8 shows the measurement results of the second test case.

Figure 9:
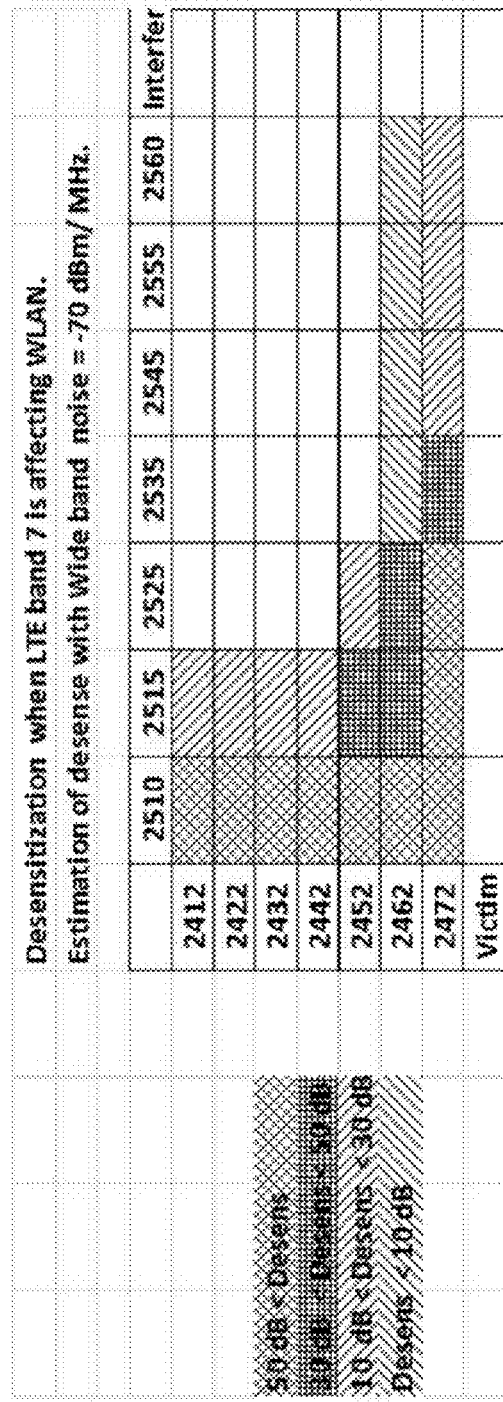
FIG. 9 shows modified measurement results for the second test case for a different wide band noise.

FIG. 9 shows modified measurement results for the second test case for a different wide band noise.

From the third test case, it can be seen that even with a narrow WLAN filter there is a severe desensitization at the frequency 2510 MHz.

It can be seen from the test results that with existing hardware severe coexistence problems arise in all three test cases.

According to various aspects of this disclosure, these issues are solved or mitigated using mechanisms applied at PHY level and protocol level and for example relying on a mixture of software (SW) and hardware (HW) implementations.

Figure 10:
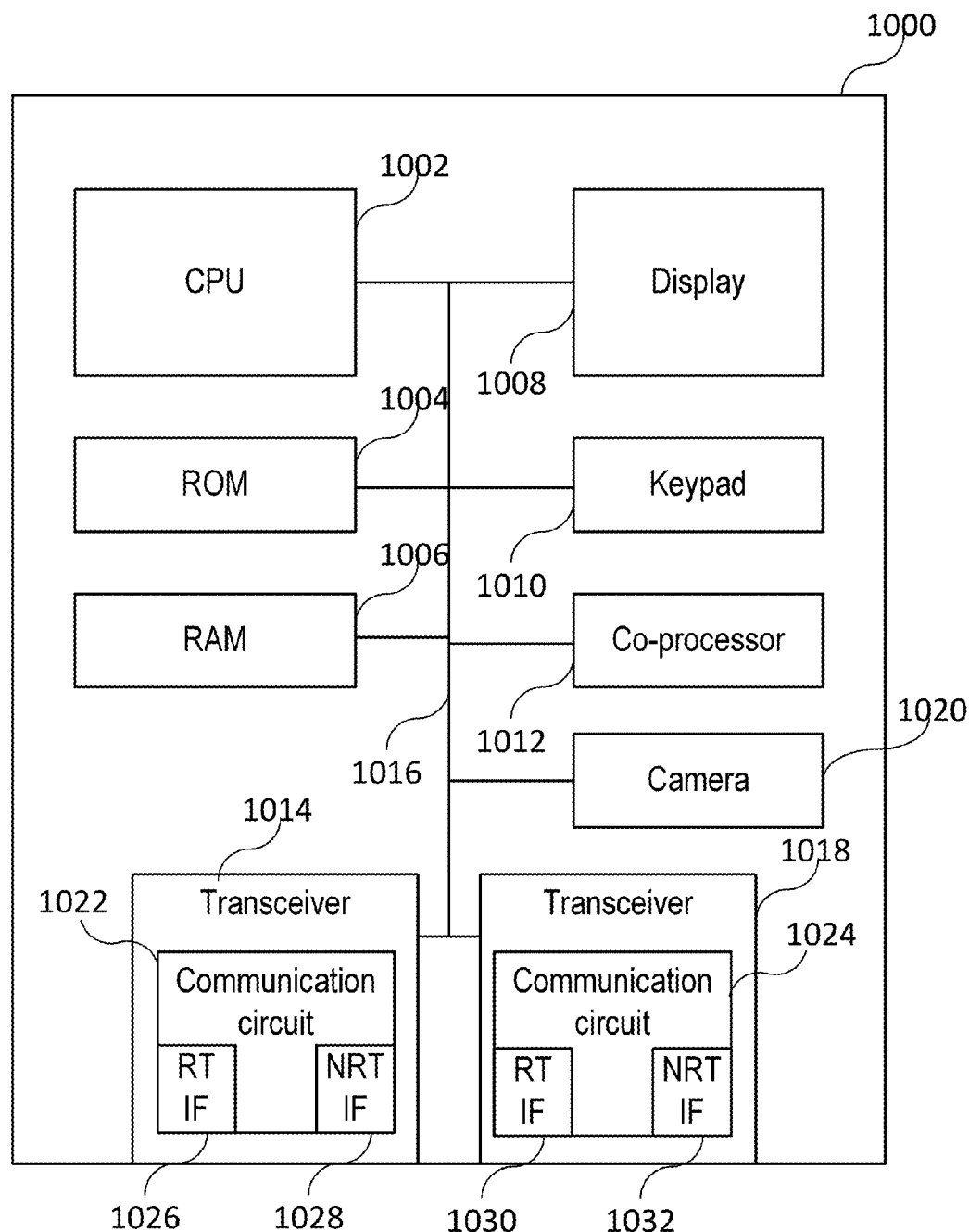
FIG. 10 shows a communication terminal according to various aspects of this disclosure.

Examples are described in the following with reference to an exemplary communication terminal as illustrated in FIG. 10.

FIG. 10 shows a communication terminal 1000 according to various aspects of this disclosure.

For example, the communication terminal 1000 is a mobile radio communication device configured in accordance with LTE and/or other 3GPP mobile radio communication technologies. The communication terminal 1000 is also also referred to as radio communication device.

In various aspects of the disclosure, the communication terminal 1000 may include a processor 1002, such as e.g. a microprocessor (e.g. a central processing unit (CPU)) or any other type of programmable logic device (which may for example act as controller). Furthermore, the communication terminal 1000 may include a first memory 1004, e.g. a read only memory (ROM) 1004 and/or a second memory 1006, e.g. a random access memory (RAM) 1006. Moreover, the communication terminal 1000 may include a display 1008 such as e.g. a touch sensitive display, e.g. a liquid crystal display (LCD) display or a light emitting diode (LED) display, or an organic light emitting diode (OLED) display. However, any other type of display may be provided as the display 1008. The communication terminal 1000 may in addition include any other suitable output device (not shown) such as e.g. a loudspeaker or a vibration actuator. The communication terminal 1000 may include one or more input devices such as keypad 1010 including a plurality of keys. The communication terminal 1000 may in addition include any other suitable input device (not shown) such as e.g. a microphone, e.g. for speech control of the communication terminal 1000. In case the display 1008 is implemented as a touch sensitive display 1008, the keypad 1010 may be implemented by the touch sensitive display 1008. Moreover, optionally, the communication terminal 1000 may include a co-processor 1012 to take processing load from the processor 1002. Furthermore, the communication terminal 1000 may include a first transceiver 1014 and a second transceiver 1018. The first transceiver 1014 is for example an LTE transceiver supporting radio communication according to LTE and the second transceiver 1018 is for example a WLAN transceiver supporting communication according to a WLAN communication standard or a Bluetooth transceiver supporting communication according to Bluetooth.

The above described components may be coupled with each other via one or more lines, e.g. implemented as a bus 1016. The first memory 1004 and/or the second memory 1006 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 1002 (and optionally the co-processor 1012) may be stored in the first memory 1004. Data (e.g. the messages received or to be transmitted via the first transceiver 1014) to be processed by the processor 1002 (and optionally the co-processor 1012) may be stored in the second memory 1006. The first transceiver 1014 may be configured such that it implements a Uu interface in accordance with LTE. The communication terminal 1000 and the first transceiver 1014 may also be configured to provide MIMO radio transmission.

Moreover, the communication terminal 1000 may include a still image and/or video camera 1020, configured to provide a video conference via the communication terminal 1000.

Furthermore, the communication terminal 1000 may include a Subscriber Identity Module (SIM), e.g. a UMTS Subscriber Identity Module (USIM) identifying a user and subscriber of the communication terminal 1000. The processor 1002 may include audio processing circuits such as e.g. audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

It should be noted that while most of the examples described below are described for the coexistence of LTE and WLAN or Bluetooth, the first transceiver 1014 and the second transceiver 1018 may also support other communication technologies.

For example, each of the transceivers 1014, 1018 may support one of the following communication technologies:

a Short Range radio communication technology (which may include e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Metropolitan Area System radio communication technology (which may include e.g. a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Cellular Wide Area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

Short Range radio communication technologies may include the following Short Range radio communication technology sub-families:

personal area networks (Wireless PANs) radio communication sub-family, which may include e.g. IrDA (Infrared Data Association), Bluetooth, UWB, Z-Wave and ZigBee; and wireless local area networks (W-LANs) radio communication sub-family, which may include e.g. HiperLAN/2 (High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

Metropolitan Area System radio communication technology families may include the following Metropolitan Area System radio communication technology sub-families:

a Wireless campus area networks (W-CANs) radio communication sub-family, which may be considered one form of a metropolitan area network, specific to an academic setting, and which may include e.g.WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

Cellular Wide Area radio communication technologies may also be considered as Wireless Wide Area Network (Wireless WAN) radio communication technologies.

In the following examples, it is assumed that the first transceiver 1014 supports LTE communication and accordingly operates in the LTE frequency bands 201, 204, 205, 206. Accordingly, the first transceiver 1014 is also referred to as LTE RF.

It is further assumed for the following examples that the second transceiver 1018 operates in ISM band 202 and supports WLAN communication or Bluetooth communication.

The first transceiver 1014 includes a first communication circuit 1022 which may perform various tasks related to the communication carried out by the first transceiver 1014 such as controlling transmission/reception timings etc. The first communication circuit 1022 may be seen as a (first) processor of the communication terminal 1000 and is for example configured to control the first transceiver 1014.

The second transceiver 1018 similarly includes a second communication circuit 1024 which may perform various tasks related to the communication carried out by the second transceiver 1018 such as controlling transmission/reception timings etc. The second transceiver 1018 is also referred to as connectivity (system) or CWS. The second communication circuit 1024 is also referred to as CWS chip or connectivity chip. The second communication circuit 1024 may be seen as a (second) processor of the communication terminal 1000 and is for example configured to control the second transceiver 1018.

Each of the first transceiver 1014 and the second transceiver 1018 may further include frontend components (filters, amplifiers etc.) and one or more antennas.

The first communication circuit 1022 may include a first real-time (RT) interface 1026 and a first non-real-time interface (NRT) 1028. Similarly, the second communication circuit 1024 may include a second RT interface 1030 and a second NRT interface 1032. These interfaces 1026 to 1032 are described in more detail in the following and may be used to exchange control information with the respective other components of the communication terminal 1000. The RT interfaces 1026, 1030 may for example form an RT interface between the first communication circuit 1022 and the second communication circuit 1024. Similarly, the NRT interfaces 1028, 1032 may form an NRT interface between the first communication circuit 1022 and the second communication circuit 1024.

It should be noted that a "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A circuit may also be a processor executing software, e.g. any kind of computer program, e.g. a computer program using a virtual machine code such as e.g. Java. Any other kind of implementation of the respective functions which will be described in more detail below may also be understood as a circuit in accordance with aspects of this disclosure.

RT Coexistence Mechanisms

According to one aspect of this disclosure, a real time coexistence architecture is provided which relies on two methods (or at least one of these methods), namely protocol synchronization and traffic arbitration.

Protocol synchronization may for example consist of two mechanisms: exploiting the available periods where the LTE RF 1014 is idle and organizing the RF activity of the connectivity system 1018 so that RX (i.e. receiving) periods occur simultaneously to LTE RX periods and TX (i.e. transmission) periods occur simultaneously to LTE TX periods. Protocol synchronization may be achieved via the usage of LTE frame indication and LTE gaps indication signals which allow the second transceiver 1018 (WLAN or BT) to schedule its activity at appropriate times: i.e. when the LTE RF 1014 is idle or when the respective activities are compatible (i.e. such that both the first transceiver 1014 and the second transceiver 1018 are receiving or such that both the first transceiver 1014 and the second transceiver 1018 are transmitting).

Traffic arbitration may consist of receiving the indication of the upfront CWS 1018 activity and of the upfront LTE RF 1014 activity and selecting the traffic which is allowed to proceed when a conflict is identified. Traffic arbitration may be achieved via CWS activity indication used by a RT (real time) arbiter to derive CWS-kill and LTE-kill signals (to "kill" a frame or subframe for a communication technology, i.e. to prohibit transmission via the communication technology in the subframe or frame).

In the following, LTE frame indication in the LTE-TDD case (i.e. in case that the LTE RF 1014 is operating in TDD mode) is described which is used for protocol synchronization according to one aspect of this disclosure.

Being a Time Division Duplex system, LTE-TDD has a unique frame structure containing both DL and UL subframes. This is illustrated in FIG. 11.

Figure 11:
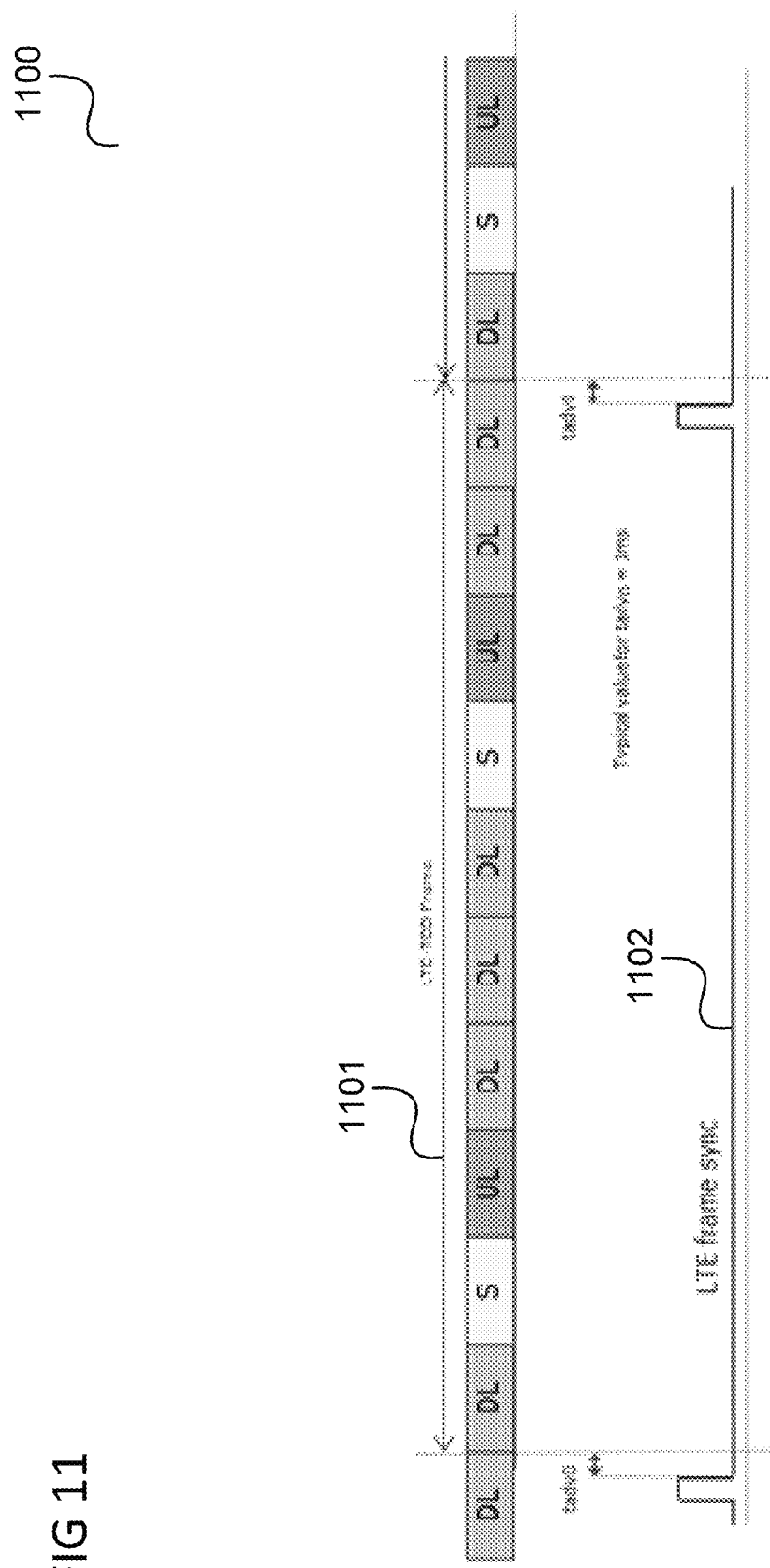
FIG. 11 shows a frame structure.

FIG. 11 shows a frame structure 1100.

The frame structure 1100 illustrates an LTE-TDD frame 1101 including DL subframes, i.e. subframes allocated for downlink transmissions (in which the LTE RF 1024 receives data), UL subframes, i.e. subframes allocated for uplink transmissions (in which the LTE RF 1028 transmits data) and special (S) subframes which may for example be used as a guard time and pilot transmission.

There is a set of seven possible configurations defined in 3GPP for TDD. Whichever the selected configuration, the TDD frame structure contains a periodic DL/UL pattern which can be communicated to the CWS chip 1024 and which can be exploited by the connectivity system 1018 to schedule communication traffic.

The LTE-TDD frame structure is typically static or varies very rarely. It may be indicated to the CWS chip 1028 via NRT messaging via the NRT interface 1032. The required synchronization between the CWS chip 1028 and LTE-TDD frame timing may be performed via the RT interfaces 1026, 1030 using a LTE-frame sync signal 1102 as illustrated in FIG. 11.

The LTE frame start (i.e. the beginning of the each frame 1001) is indicated 1ms in advance to the CWS chip 1024 via the pulse sent over the RT interface between the first communication circuit 1022 and the second communication circuit 1024 (i.e. via the RT interfaces 1026, 1030) 1 ms in advance.

Using the LTE frame sync signal coupled with the LTE frame structure signaled via an NRT message, the CWS chip 1024 has full knowledge of the LTE-TDD frame and it can schedule its communication activity accordingly.

This LTE-TDD frame structure signaling message over the NRT (coexistence) interface between the first communication circuit 1022 and the second communication circuit 1024 (formed by NRT interfaces 1028, 1032) has for example the format as illustrated in table 1.

TABLE 1

| ID | Message payload | Info bits | I/O | Description |
|---|---|---|---|---|
| 11 | LTE-BITMAP | 10 × 2 | O | 0 = special subframe<br>1 = RX LTE subframe<br>2 = TX LTE subframe |

This message may be reduced to 3 bits (7 configurations only) and encoding of S sub frame structure may be added:
the seven UL/DL TDD frame configuration as defined in 3GPP: 3 bits
the nine special sub frame configurations: 4 bits
Considering that this message is a NRT message and that using an implicit LTE configuration encoding would require some LTE knowledge on the connectivity chip 1024 it may be desirable to stick to the explicit 20 bits encoding.

For LTE frame indication in the LTE-FDD (Frequency Division Duplex) case, LTE-band 7 UL 204 is the most relevant band. This is an uplink band hence all subframes are UL subframes. Nevertheless, an LTE frame indication may also be used in this case in order to allow the CWS chip 1024 to properly schedule its activity on the LTE UL sub frame boundaries. It can also be used by the CWS chip 1024 to synchronize its system clock over the LTE system clock.

When (traffic) arbitration gives medium access to the CWS 1018, this may by definition hold till the end of the killed LTE sub frame, knowing the subframe boundaries the CWS 1018 is able to apply scheduling in order to maximize the amount of traffic transferred till the end of the killed (LTE) subframe.

In the following, LTE gap indication in case of LTE-FDD discontinuous reception (DRX) and discontinuous transmission (DTX) is described which is used for protocol synchronization according to one aspect of this disclosure.

LTE has been designed to address the need for mobile Internet access. Internet traffic can be characterized by a high burstiness with high peak data rates and long silence periods. In order to allow for battery savings, an LTE system allows for DRX (discontinuous reception). Two DRX profiles are supported which are addressed by short DRX and long DRX, respectively. For the reverse link, i.e. the uplink, in order to increase system capacity, an LTE system allows for discontinuous transmission (DTX).

For example, for VoLTE (Voice over LTE) isochronous traffic can be assumed. As the speech coder produces one packet every 20 ms, the underlying periodicity of the LTE traffic can be exploited for WLAN and BT transmission during LTE silence periods.

Figure 12:
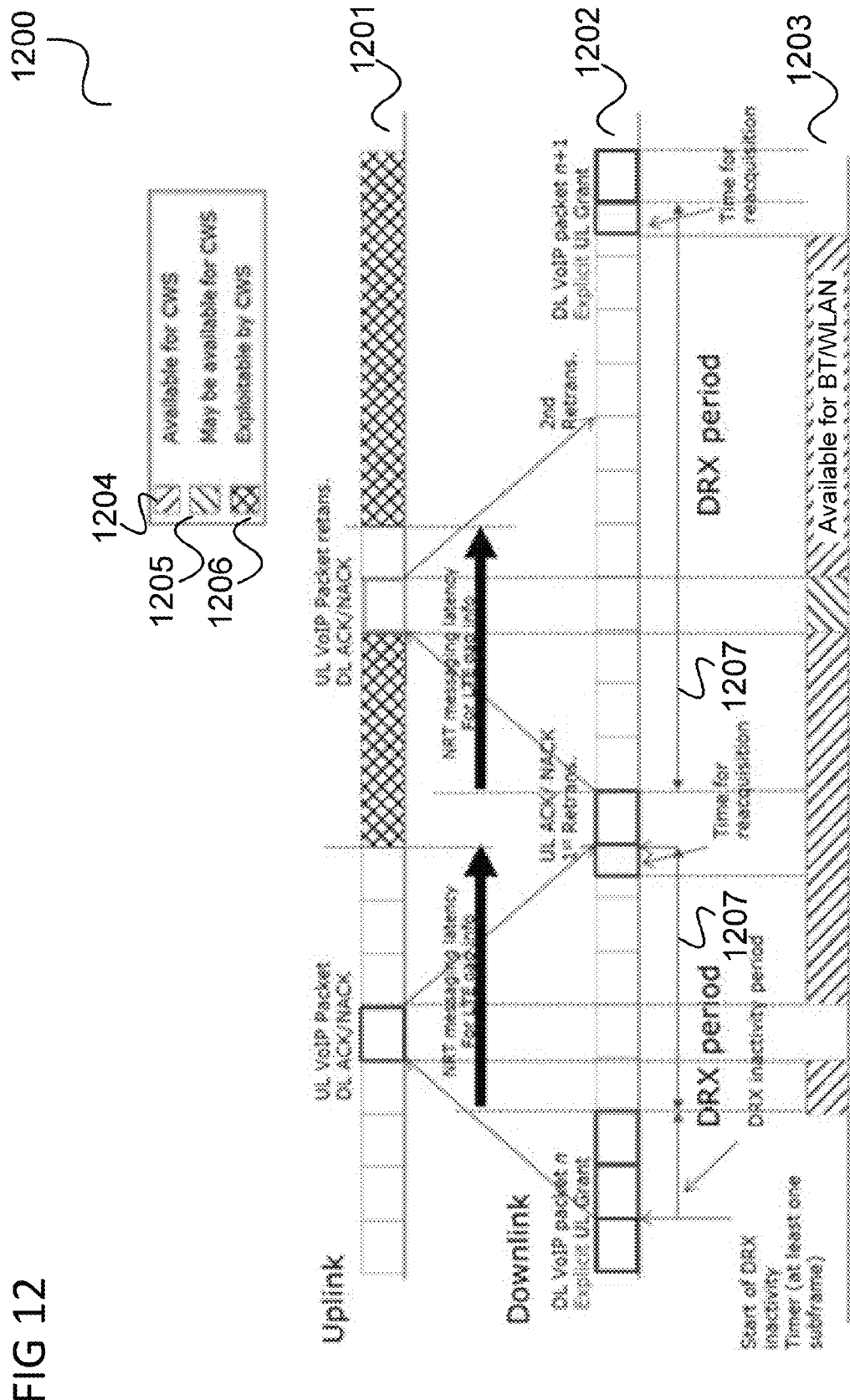
FIG. 12 shows a data transmission diagram.

As an example, for an inactivity period of two (the smallest allowed value in 3GPP Release 9 for DRX Inactivity Time is 1), the UL/DL schedule is shown in FIG. 12.

FIG. 12 shows a data transmission diagram 1200.

In the data transmission diagram 1200, time increases from left to right. The data transmission diagram 1200 illustrates uplink LTE data transmission 1201, downlink LTE data transmission 1202 and, on a bottom timeline 1203, illustrates the times (in terms of subframes) which are available for the CWS 1024 due to DRX periods 1207.

A first hatching 1204 indicates periods available for the CWS 1024 (e.g. BT or WLAN), a second hatching 1205 indicates periods which may be available for the CWS 1024 and a third hatching 1206 indicates periods which are exploitable by the CWS 1024.

In the bottom timeline 1203 the periods are marked (by the first hatching 1204 and the second hatching 1205) for which no LTE-UL activity is expected and thus could be given to the CWS 1024. It shall be noted that interference free time needs to be given to the LTE transceiver 1022 (specifically in its role as receiver) prior to the upcoming reception to settle the AGC (Automatic Gain Control) and potentially reacquire the signal. For short LTE DRX periods, this period is approximately 300 µs, for long DRX periods it is less than 1.3 ms.

The LTE standard also offers a mechanism called Semi-Persistent Scheduling (SPS) to reduce the signaling overhead in case of isochronous transfer. In this case, the UL grant is implicitly given by the SPS schedule and the DRX period can start right after the reception of the scheduled TTI (Transmission Time Interval).

In the following, an RT algorithm for LTE-FDD gap indication which may be used for protocol synchronization according to an aspect of this disclosure is described.

An LTE transmission gap may be created at any time by the communication terminal 1000 following network deployed decision rules. The starts and ends of these transmission are according to one aspect of this disclosure indicated to the CWS 1024 so that the CWS 1024 can schedule its data traffic within the transmission gaps (e.g. in case that the CWS 1024 performs WLAN communication or a Bluetooth communication using a profile which is ACL (Asynchronous Connectionless Link) based).

In 3GPP release 9 there are three possible root causes to have transmission gaps created: Measurement gaps, DRX/DTX and Autonomous measurement gaps.

A measurement (transmission) gap is known 34 ms or 74 ms in advance at LTE L1 level and is 6 ms long. A DRX/DTX (transmission) gap in a subframe is known after decoding the PDCCH (Packet Data Control Channel) in the previous subframe, i.e. much less than 1ms in advance (for example approximately 200 µs). However, a transmission gap decision can be overruled in ad-hoc mode till 1.5 ms before the transmission gap starts.

Figure 13:
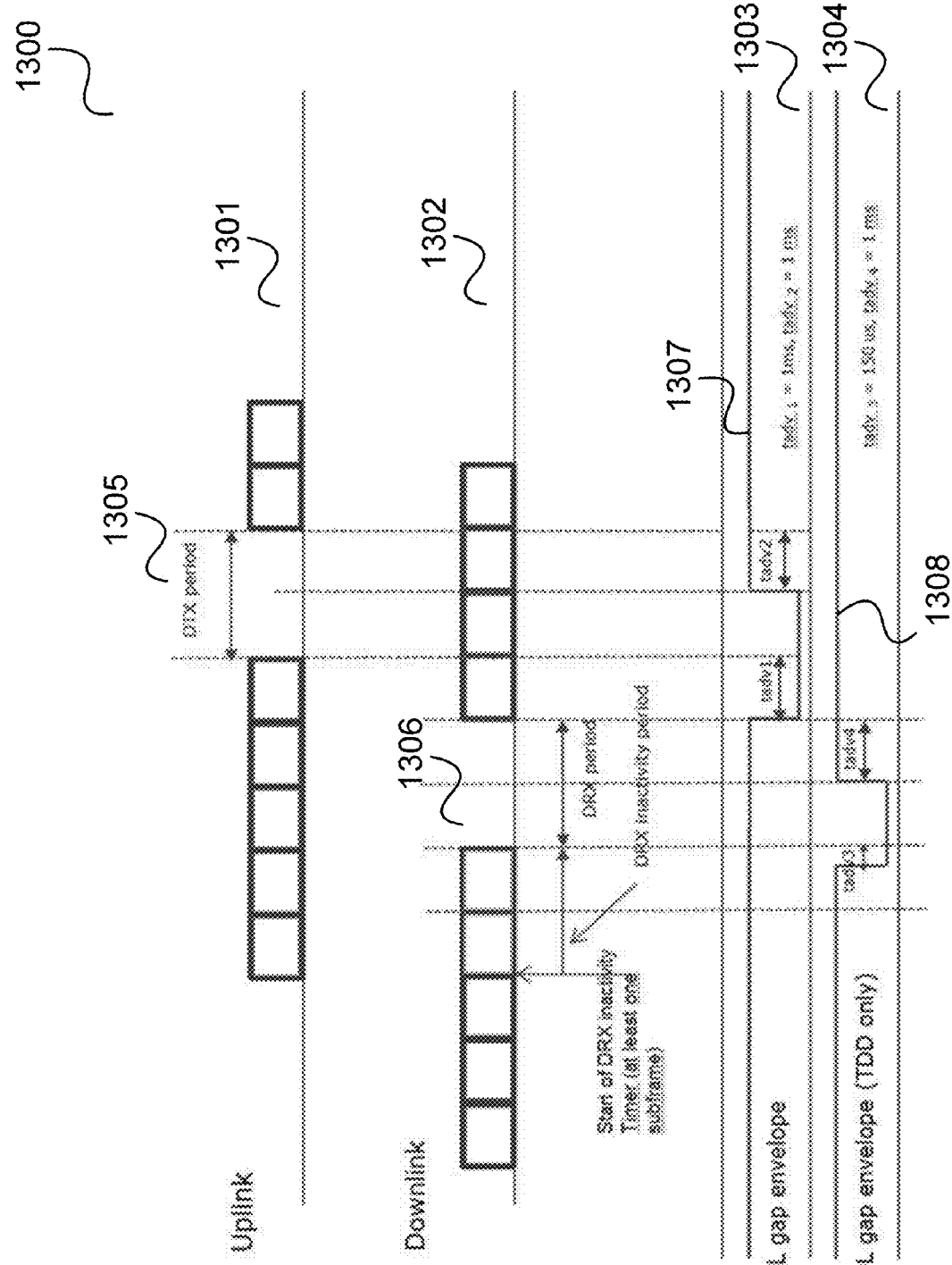
FIG. 13 shows a transmission diagram.

LTE gap signaling according to one aspect of this disclosure is illustrated in FIG. 13.

FIG. 13 shows a transmission diagram 1300.

The transmission diagram 1300 illustrates uplink LTE data transmission 1301, downlink LTE data transmission

1302, uplink transmission gap signaling 1303 and downlink transmission gap signaling 1304. Time increases from left to right.

In this example, there is an uplink transmission gap 1305 and a downlink transmission gap 1306. The uplink transmission gap 1305 is signaled by an uplink transmission gap signal 1307 (UL gap envelop signal) and the downlink transmission gap 1306 is signaled by a downlink transmission gap signal 1308 (DL gap envelop signal), wherein the start and the termination (end) of the transmission gaps 1305, 1306 are for example indicated 1 ms in advance to the CWS chip 1204 by the uplink transmission gap signal 1307 and the downlink transmission gap signal 1308, for example via the RT interface between the first communication circuit 1022 and the second communication circuit 1024.

It should be noted that under 3GPP Rel11—Work item "In Device Coexistence" newly defined transmission gaps triggered especially for coexistence purpose may be introduced. The transmission gap signaling according to one aspect of this disclosure is compliant with these new transmission gaps.

Practically, the timing advance of the DL gap envelop signal 1308 is kept short as the decision to go for a transmission gap can be taken during the last DL subframe before the DL transmission gap and can be done only once the PDCCH is decoded. For UL transmission gaps, decision is also based on DL subframe decoding but there is a delay of roughly 4 ms between DL and UL subframes. In addition, the UL transmission gap decision can be overruled before it is applied until 1.5 ms before the transmission gap start-up. Overruling requests posterior to this time, if any, are not applied. Therefore, UL transmission gap start-up can be signaled 1ms in advance (<1.5 ms). Similarly, transmission gap termination can be signaled 1ms in advance maximum since a higher value could not be applied for 1 ms UL transmission gaps (1 subframe). According to one aspect of this disclosure, 1 ms advance signaling is retained for LTE transmission gap termination signaling as the maximization of the advance facilitates traffic scheduling on the side of the CWS 1018.

As indicated in FIG. 13, the advance values are for example tadv$_3$: 150 μs, tadv$_4$: 1 ms, tadv$_1$ and tadv$_2$: 1 ms.

It should be noted that optimum signaling for a transmission gap may be achieved by indicating the transmission gap start and the transmission gap duration.

It should further be noted that protocol synchronization may also be used for LTE-TDD Discontinuous reception (DRX) and discontinuous transmission (DTX).

In the following, arbitration of the LTE-TDD case is described.

Due to LTE resource usage and due to the WLAN/BT protocol requirements, perfectly synchronizing the protocols on each side and applying only concurrent RX and concurrent TX may not be sufficient to support the use cases and some conflicting RX/TX events may occur.

Figure 14:
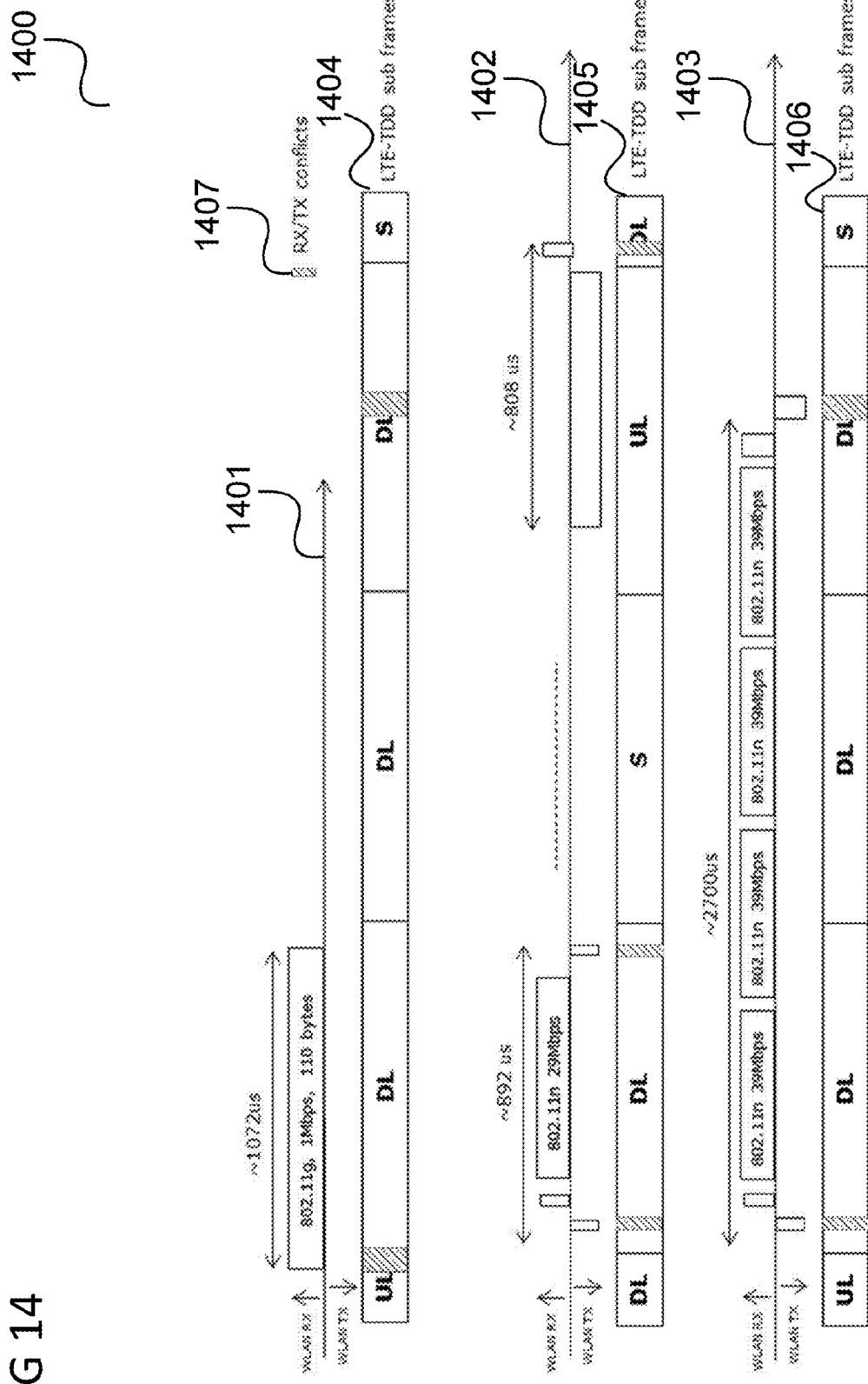
FIG. 14 shows a transmission diagram.
Figure 15:
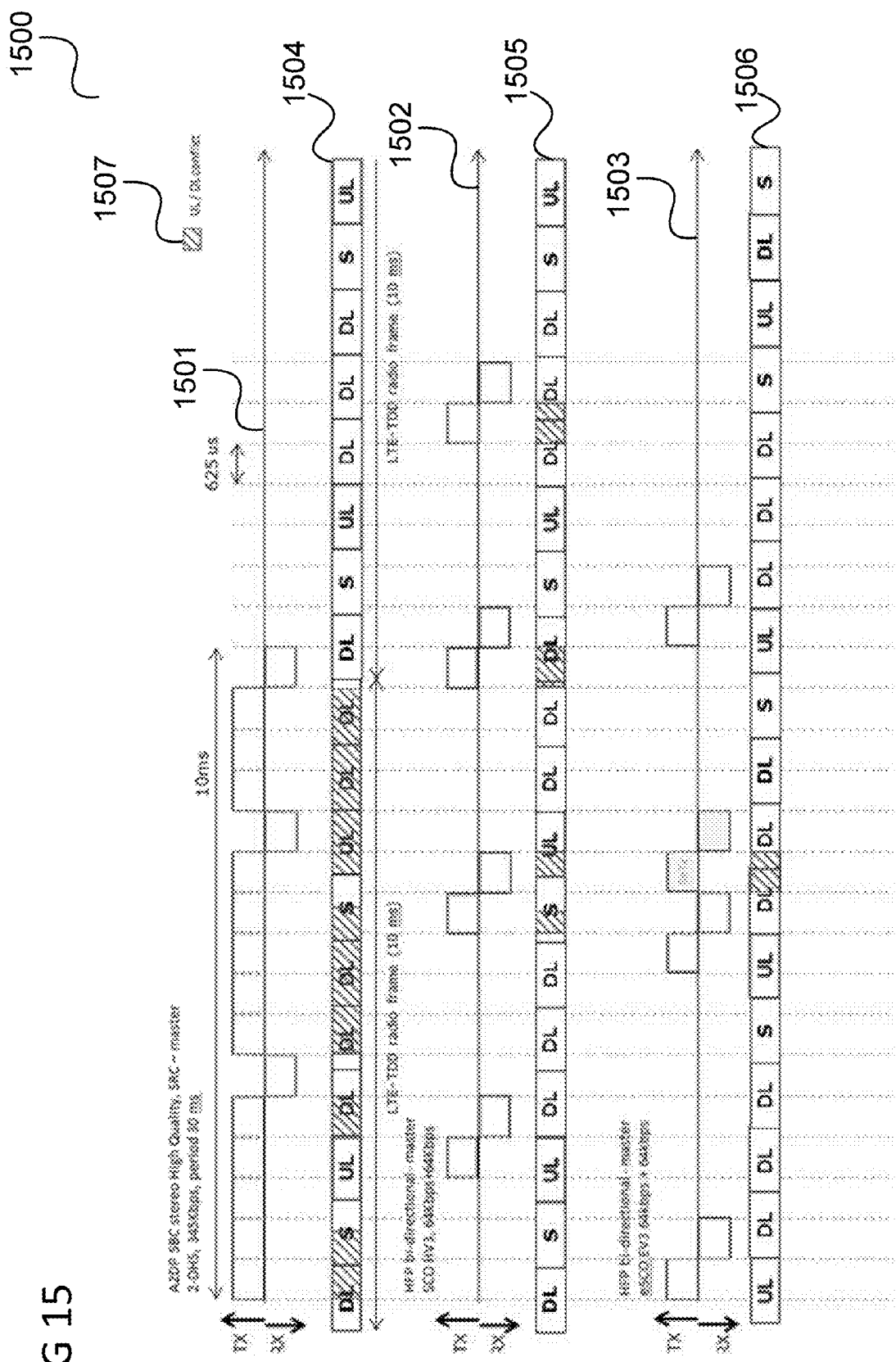
FIG. 15 shows a transmission diagram.

FIGS. 14 and 15 illustrate conflicts between LTE-TDD operation and WLAN/BT operation that may occur.

FIG. 14 shows a transmission diagram 1400.

The transmission diagram 1400 illustrates the occurrence of transmission-reception conflicts in case of synchronized LTE-TDD and WLAN traffic.

For each of three timelines 1401, 1402, 1403 WLAN downlink transmissions are illustrated above and WLAN uplink transmissions are illustrated below the timelines 1401, 1402, 1403 wherein time increases from left to right and, for example, from top to bottom along the timelines 1401, 1402, 1403. Further, LTE transmissions (or LTE subframe allocation) 1404, 1405, 1406 are illustrated for the timelines 1401, 1402, 1403.

A hatching 1407 indicates RX/TX conflicts that may occur between the WLAN transmissions and LTE transmissions.

FIG. 15 shows a transmission diagram 1500.

The transmission diagram 1500 illustrates the occurrence of UL-DL conflicts in case of synchronized LTE-TDD and Bluetooth traffic.

For each of three timelines 1501, 1502, 1503 Bluetooth data transmission is illustrated above and Bluetooth data reception is illustrated below the timelines 1501, 1502, 1503 wherein time increases from left to right for each of the timelines 1501, 1502, 1503. Further, LTE transmissions (or LTE subframe allocation) 1504, 1505, 1506 are illustrated for the timelines 1501, 1502, 1503.

A hatching 1507 indicates UL/DL conflicts that may occur between the Bluetooth transmissions and LTE transmissions.

RX/TX conflict may be handled via arbitration which potentially leads to LTE sub frame loss. Arbitration may be performed between WLAN/BT and LTE to determine whether the WLAN/BT traffic is allowed or not.

For example, when a WLAN/BT transmit event (by the second transceiver 1018) is conflicting with a LTE-DL subframe (i.e. a scheduled reception by the first transceiver 1014), real time arbitration is performed. The arbitration process decides either to kill the WLAN/BT transmission to protect the LTE-DL sub-frame or to let it occur. In the latter case, depending on RF interference level, the LTE-DL sub frame is likely not to be decoded by LTE PHY, i.e. the LTE physical layer (implemented by components of the first transceiver 1014).

In the LTE-UL case, an arbitration decision may consist in allowing WLAN/BT reception or allowing an LTE-UL subframe (i.e. an LTE transmission). FIGS. 14 and 15 can be seen to illustrate the impact of WLAN and Bluetooth use cases over LTE-TDD for full connectivity traffic support (i.e. support of the communication by the second transceiver 1018), relying only on LTE denial and LTE desense. This sets the worst case for LTE-TDD side and can be used as reference to quantify the enhancement provided by coexistence mechanisms for LTE-TDD.

The RT arbitration may be an entity implemented by a mixture of HW and SW located in the LTE subsystem (e.g. in the first transceiver 1014) which handles synchronization of the first transceiver 1014 and the second transceiver 1018 via the real time (coexistence) interface between the first transceiver 1014 and the second transceiver 1018 (formed by the RT interfaces 1026, 1030), e.g. in the context given by an NRT arbiter decision. It derives RT arbitration and applies it onto the first transceiver 1014 and the second transceiver 1018 (via the RT coexistence interface).

For LTE-FDD, the interfering band is an UL band. LTE UL cannot be harmed by the CWS hence the arbitration's role is reduced to protect or not to protect the WLAN/BT RX from LTE TX. When a conflict occurs, i.e. as a consequence of mis-scheduling or insufficient medium access for connectivity traffic, the arbitration may be applied. It leads either to killing the LTE UL-sub-frame or to let it happen normally.

Figure 16:
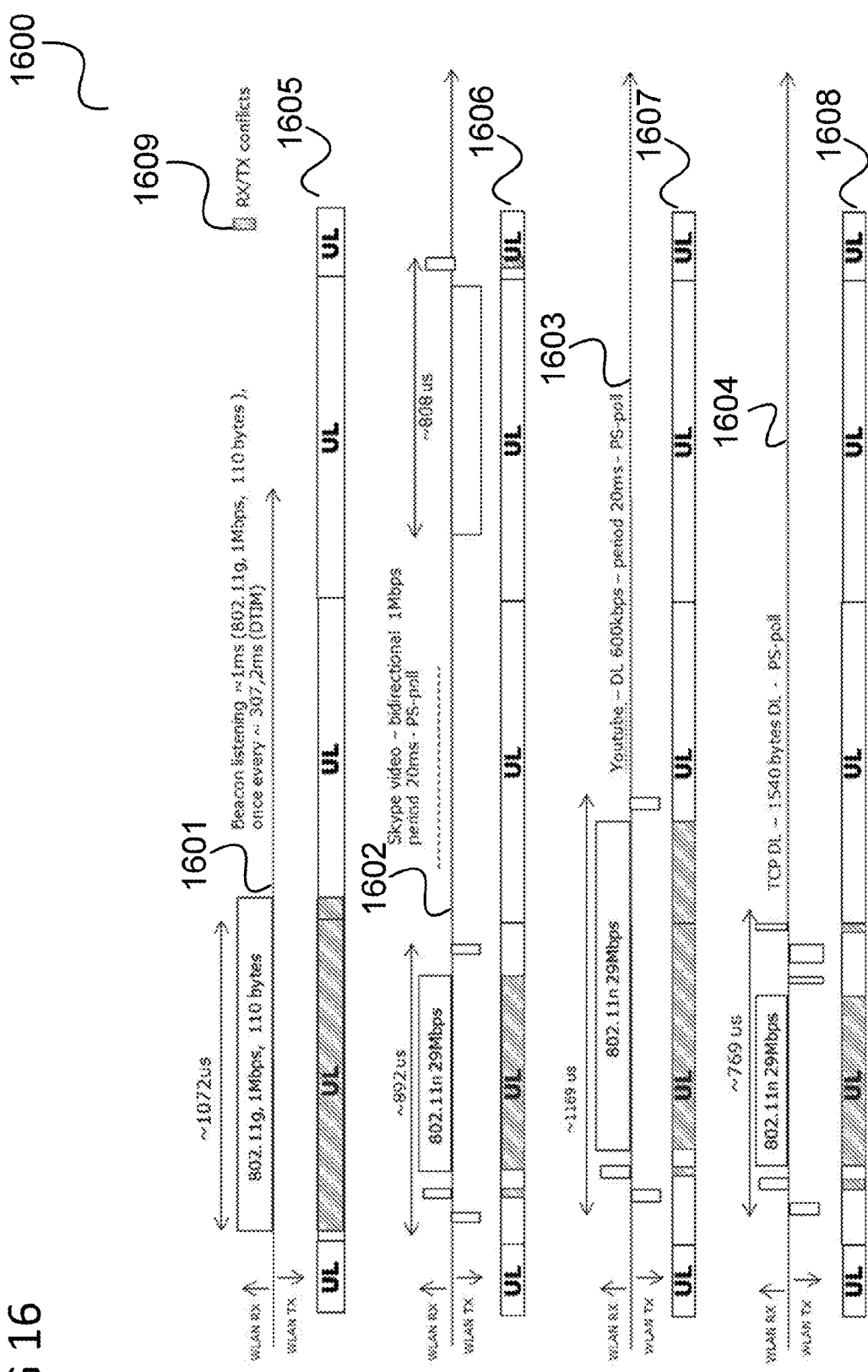
FIGS. 16 and 17 depict the impact of WLAN and Bluetooth use cases over LTE-FDD for full connectivity traffic support, relying only on LTE denial and LTE kill.
Figure 17:
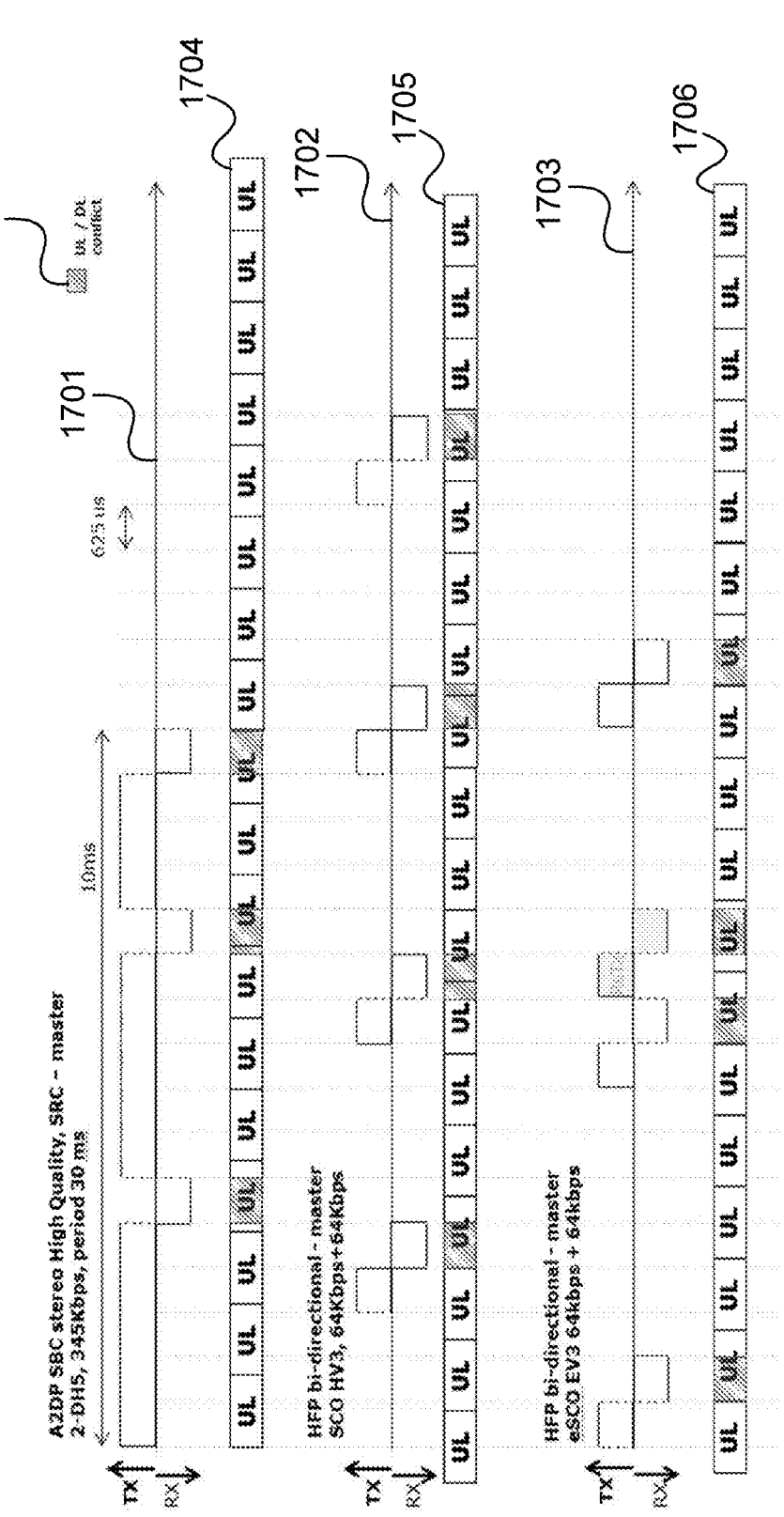

FIGS. 16 and 17 depict the impact of WLAN and Bluetooth use cases over LTE-FDD for full connectivity traffic support, relying only on LTE denial and LTE kill. This sets the worst case for LTE-FDD side and can be used as reference to quantify the enhancement provided by coexistence mechanisms for LTE-FDD.

FIG. 16 shows a transmission diagram 1600.

The transmission diagram 1600 illustrates the occurrence of transmission-reception conflicts in case of synchronized LTE-FDD and WLAN traffic.

For each of four timelines 1601, 1602, 1603, 1604 WLAN downlink transmissions are illustrated above and WLAN uplink transmissions are illustrated below the timelines 1601, 1602, 1603, 1604 wherein time increases from left to right. Further, LTE transmissions (or LTE subframe allocation) 1605, 1606, 1607, 1608 are illustrated for the timelines 1601, 1602, 1603, 1604.

A hatching 1609 indicates RX/TX conflicts that may occur between the WLAN transmissions and LTE transmissions.

FIG. 17 shows a transmission diagram 1700.

The transmission diagram 1700 illustrates the occurrence of UL-DL conflicts in case of synchronized LTE-FDD and Bluetooth traffic.

For each of three timelines 1701, 1702, 1703 Bluetooth data transmission is illustrated above and Bluetooth data reception is illustrated below the timelines 1701, 1702, 1703 wherein time increases from left to right for each of the timelines 1701, 1702, 1703. Further, LTE transmissions (or LTE subframe allocation) 1704, 1705, 1706 are illustrated for the timelines 1701, 1702, 1703.

A hatching 1707 indicates UL/DL conflicts that may occur between the Bluetooth transmissions and LTE transmissions.

The real time (coexistence) interface 1026 may be implemented by hardware only or by a mixture of hardware and software located in the LTE subsystem (i.e. in the first transceiver 1014). According to one aspect of this disclosure, it includes a set of eight proprietary real time signals to support protocol synchronization and traffic arbitration. These signals may for example be controlled via a software driver located in the LTE subsystem. It is connected to the CWS chip RT interface 1030.

The RT interface may for example include the traffic arbitration signals as shown in table 2.

TABLE 2

| Signal | Width | I/O | Description |
|---|---|---|---|
| CWS active | 1 | I | Medium Busy indicating a CWS RF activity<br>0 = idle/1 = active |
| CWS Tx/Rx | 1 | I | CWS traffic direction<br>0 = RX/1 = Tx |
| CWS Priority | 2 | I | CWS Priority<br>0 = Low priority/1 = BT high priority/2 = WLAN high priority (PS-POLL, ACK, BACK)/3 = reserved |
| LTE active | 1 | O | CWS-Kill indication |

The RT interface may for example include the protocol synchronization signals as shown in table 3.

TABLE 3

| Signal | Width | SRC/Dest | I/O | Description |
|---|---|---|---|---|
| LTE frame sync | 1 | CWS | O | Synchronization signal indicating LTE frame start |

TABLE 3-continued

| Signal | Width | SRC/Dest | I/O | Description |
|---|---|---|---|---|
| UL gap envelop | 1 | CWS | O | Synchronization signal indicating LTE UL gap. Envelop signal with edges occurring 1 ms before in-the-air gar (raising and falling edges) |
| DL gap envelop | 1 | CWS | O | Synchronization signal indicating LTE DL gap. Envelop signal with raising edge used only for LTE-TDD. Envelop signal with edges occurring 1 ms before in-the-air gar (raising and falling edges) |

In the following an example for a hardware implementation of the RT interface between the first transceiver 1014 and the second transceiver 1018 is given.

The example describes the RT interface between first communication chip 1022 and the connectivity chip 1024. The purpose of the RT interface is to allow fast communication between both chips 1022, 1024 in both directions. Non-real time communication may for example be handled via a standardized interface between the first transceiver 1014 and the second transceiver 1018.

Figure 18:
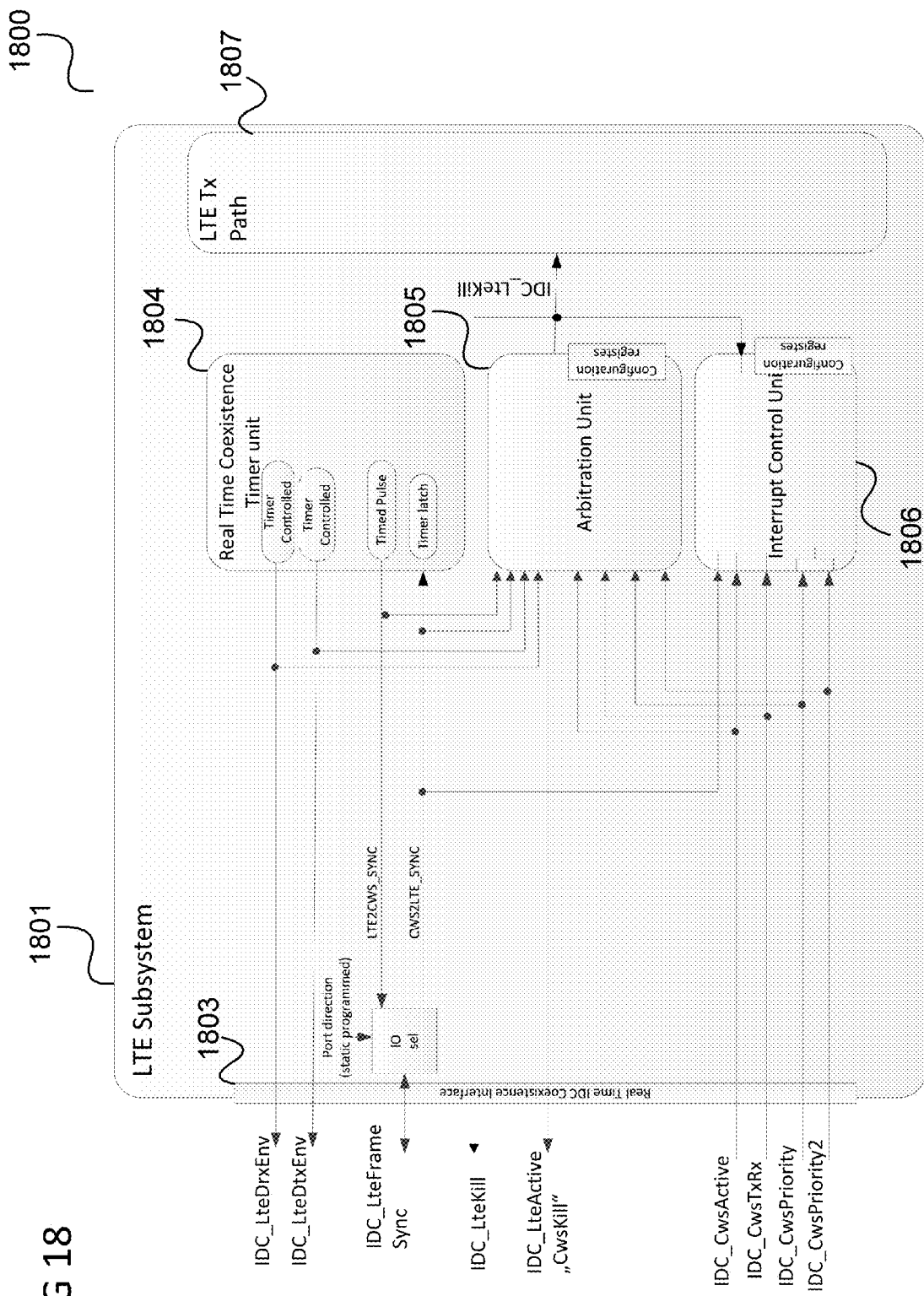
FIG. 18 shows a communication circuit according to an aspect of this disclosure.

The real-time interface may be seen to basically consist of a set of discrete signals as shown in FIG. 18.

FIG. 18 shows a communication circuit 1800 according to an aspect of this disclosure.

The communication circuit 1800 for example corresponds to the first communication circuit 1022.

The communication circuit 1800 includes an LTE subsystem 1801 (L1CC) which may control all hardware interaction. The communication circuit 1800 includes an RT interface 1803 via which the LTE subsystem 1801 may be connected to another communication circuit, e.g. the second communication circuit 1024, using various IDC (in device coexistence) signals which are indicated on the left hand side of the RT interface 1803 and which are described in more detail in the following text.

According to one aspect of this disclosure, there are no specific requirements on the electrical characteristics of the RT interface 1803. The IDC signals are for example configured during system startup. There is no need to reconfigure the IDC ports (implementing the RT interface 1803) during operation.

From a hardware point of view the communication protocol on the interface signals may be kept simple. However additional hardware support may be required in the layer 1 subsystem context to support the real time handling of the interface signals (i.e. the IDC signals).

The LTE subsystem 1801 includes an RT coex (coexistence) timer unit 1804 which is responsible to generate time accurate events on the output signals IDC_LteDrxEnv, IDC_LteDtxEnv and IDC_LteFrameSync if configured as output signal. If IDC_LteFrameSync is configured as input signal a snapshot of the LTE timing is taken. In the following the signal characteristics are described in more detail.

IDC_LteFrameSync—LTE2CWS_SYNC configuration (output signal): This signal can be used to generate frame periodic pulses for the CWS 1018. It should be noted that the pulse signal may not be available during LTE sleep phases.

IDC_LteDrxEnv, IDC_LteDtxEnv:

These output signals are envelope signals to indicate discontinuous transmit/receive phases towards the CWS subsystem 1018. They are used to indicate discontinuous transmit/receive phases whichever their root cause: DRX, DTX, measurements or any other. Both signals can be programmed individually via a timer.

IDC_LteFrameSync—CWS2LTE_SYNC configuration (input signal): This signal may be used, LTE2CWS_SYNC may be desirable as solution while this one is kept as a fallback. Via this signal the CWS subsystem 1018 can request a snapshot of the LTE timing. In addition an interrupt can be generated on this event.

The LTE subsystem 1801 further includes an arbitration unit 1805, an interrupt control unit (IRQ) 1806 and an LTE transmission (Tx) path 1807. The arbitration unit 1805 is shown in more detail in FIG. 19.

Figure 19:
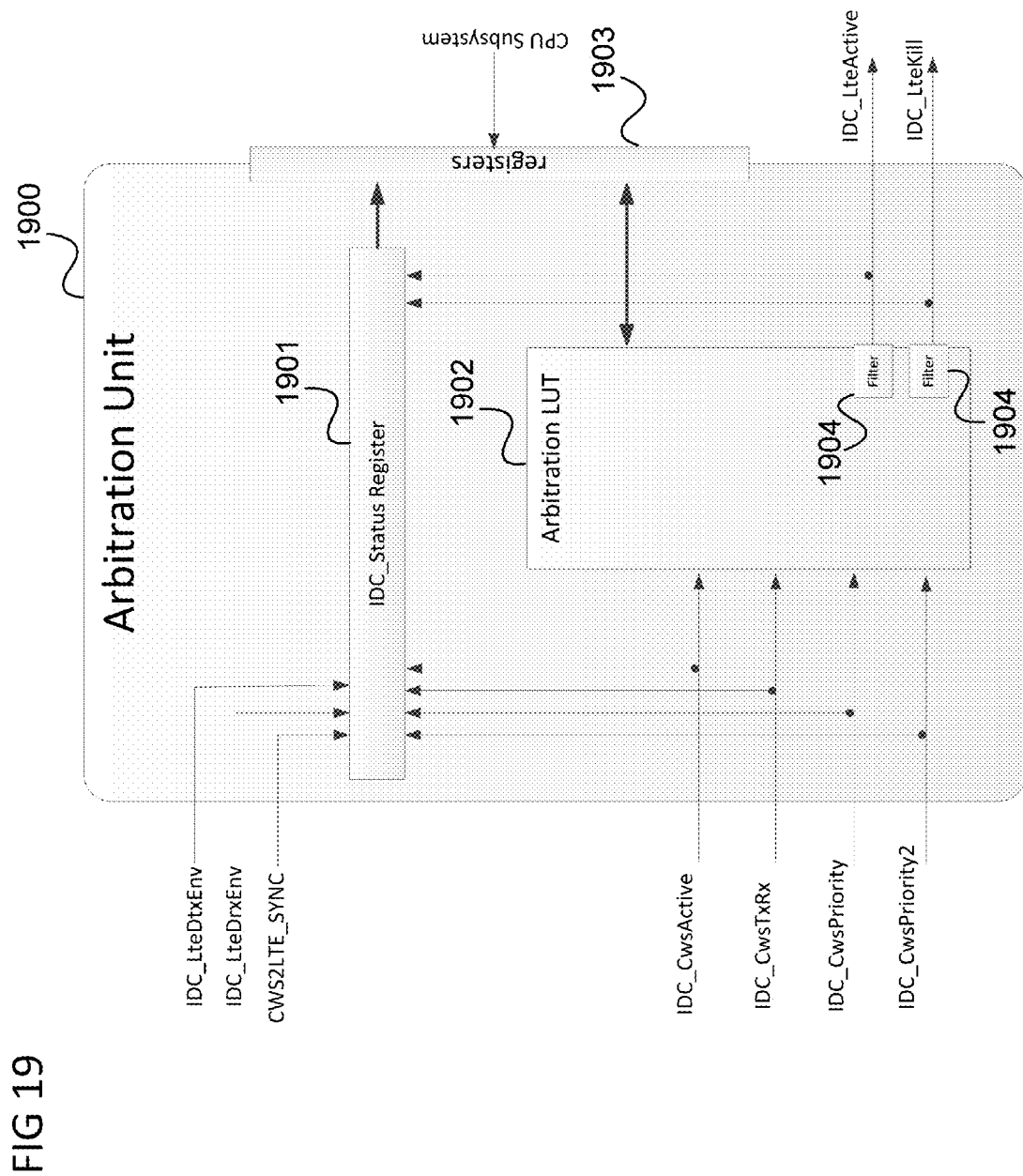
FIG. 19 shows a status & arbitration unit according to an aspect of this disclosure.

FIG. 19 shows an arbitration unit 1900 according to an aspect of this disclosure.

The arbitration unit 1900 includes an IDC status register 1901, an arbitration look up table (LUT) 1902 and registers 1903.

The arbitration unit 1900 may serve for status indication (e.g. by means of the IDC status register 1901) and for interrupt generation. For example, the current level of signals, e.g. the IDC related signals mentioned in the following can be monitored via the arbitration unit 1900. In addition some of the signals may be supplied to the interrupt control unit 1806.

The arbitration unit 1900 in its role as arbitration unit provides hardware support for the IDC_real time arbitration. The task of the arbitration unit 1900 is to control the signals IDC_LteActive and IDC_LteKill depending on the input signals IDC_CwsActive, IDC_CwsTxRx, and IDC_CwsPriority (which can because of its width be seen to consist of two signals, IDC_CwsPriority1 and IDC_CwdPriority2). For this purpose a combination of the input signals is done according to a programmable lookup table, the arbitration LUT 1902. The lookup table 1902 can be programmed on-the-fly via the LTE subsystem 1801.

IDC_LteActive: This signal is available at the IDC RT interface 1803. The connectivity chip 1024 is receiver of this signal. This signal may be composed by hardware to provide a fast response in case of changing input parameters. For example, the reset and isolation level of this signal is zero.

IDC_LteKill: This signal can be used for an "ad-hoc" termination of an LTE transmission. Within the LTE subsystem 1014 the signal can be used to generate an interrupt for the LTE subsystem 1804 and/or the LTE Tx path 1807. In principle this signal can be used for a direct manipulation of the Tx IQ data stream. For fallback purposes the LteKill signal is visible at the external IDC real time interface 1803. If needed the LteKill signal can be connected from the RT interface 1803 to a GPIO (General Purpose Input/Output) in order to enable a fast killing of a current LTE transmission.

The arbitration LUT 1902 may include dedicated lookup tables implemented for IDC_LteActive and IDC_LteKill.

The arbitration unit 1900 may include filters 1904 for output signal filtering. In principle transients on the output signals (e.g. IDC_LteActive and IDC_LteKill) are possible if e.g. an input signal changes and/or the lookup table 1902 is updated. In case that the transients cause a problem on the receiving side a filtering at the output might be required. In this case changes at the output only applies if the inputs are stable for a minimum time (e.g. 1 µs). A 1 µs filtering does not imply any loss of granularity in the signaling process as there is no need to indicate events shorter than 1 µs. This filtering generates a 1 µs latency that can be hidden in requiring the CWS 1018 to indicate its activity on the RT interface 1030 1 µs earlier.

LTE-kill is a mechanism used to stop (or terminate) a current LTE transmission (i.e. an UL communication) such that the LTE transceiver 1014 does not transmit, e.g. in order to release the communication medium for WLAN/BT usage. It may for example occur as a result of real time arbitration in favor of WLAN/BT.

According to one aspect of this disclosure, abrupt switch off of the LTE transmission is avoided as it would have several side effects such as spurious emissions and possibly impacts on eNodeB AGC, power control.

In order to avoid these spurious, the LTE-kill may performed via a power decrease command (e.g. sent over a digRF interface) or via zeroing of the IQ samples. Usage of the power decrease command may be chosen over a power off command as it provides the possibility to reduce the LTE transmit power down to −40 dBm (vs −50 dBm) while avoiding non-desirable side effects (such as PLL (Phase Locked Loop) shut down . . . ).

Using a command sent over a digRF interface ensure that variations of transmit power are applied in a smooth manner hence avoiding spurs generation.

According to one aspect of this disclosure, in order to adapt optimally to the WLAN/BT traffic, the LTE-kill has a very short latency, e.g. approximately 10 µs for WLAN traffic and approximately 150 µs for BT traffic.

Figure 20:
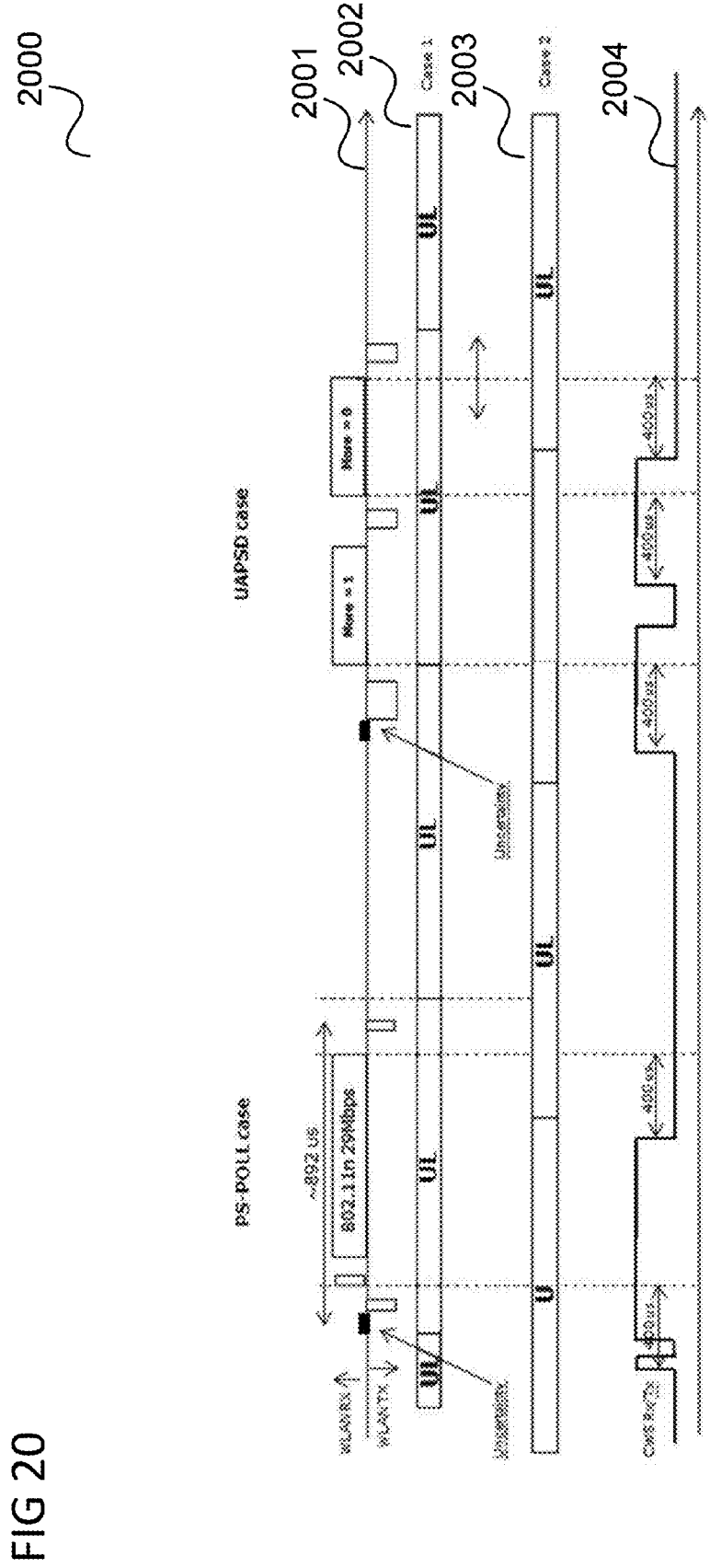
FIG. 20 shows a transmission diagram.

FIG. 20 shows a transmission diagram 2000.

Along a timeline 2001, WLAN traffic over the medium is shown wherein data reception (i.e. downlink communication) is shown above the timeline 2001 and data transmission (i.e. uplink communication) is shown below the timeline 2002. Further, LTE transmission for a first case 2002 and for a second case 2003 are shown. Additionally, the CWS Rx/Tx over the RT interface 2004 is shown.

It should be noted that WLAN activity has a timing uncertainty due to contention in CSMA (Carrier Sense Multiple Access):

if a WLAN device wins the access, timing uncertainty is in order of several µs. It cannot be known precisely in advance but it is bounded by WLAN MAC (Medium Access Control) protocol;

if a WLAN device loses the medium access, its activity is differed by several hundreds of µs and can be considered from the coexistence point of view as new traffic event. This cannot be known in advance, and may repeat several times.

On the contrary, BT has no timing uncertainty.

It should be noted that it may be crucial to ensure that LTE-kill does not apply on consecutive retransmission of the same sub frame to protect the HARQ. For FDD that means that LTE-kill of sub frames n and n+8 is forbidden. For this, a pattern to protect the HARQ channel may be used.

It should further be noted that full usage by the WLAN/BT of the remaining time in the killed LTE sub frame may be desirable.

In the following, another example for components of the communication terminal 1000 is given.

Figure 21:
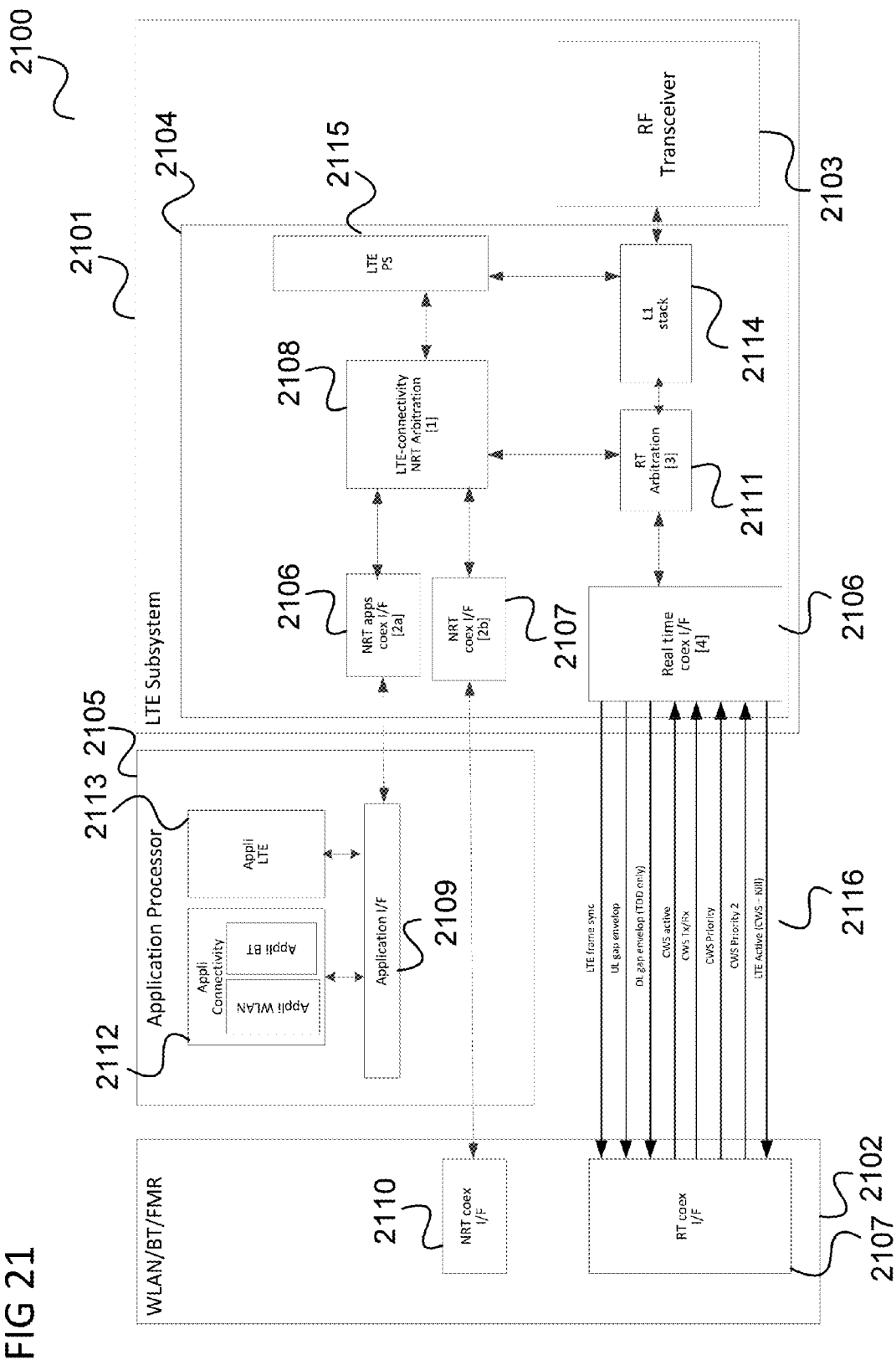
FIG. 21 shows a communication terminal

FIG. 21 shows a communication terminal 2100.

The communication terminal 2100 for example corresponds to the communication terminal 1000 wherein only some of the components are shown while the others are omitted for simplicity.

The communication terminal 2100 includes an LTE subsystem 2101 for example corresponding to the first transceiver 1014 and/or the LTE subsystem 1801 and a WLAN/Bluetooth communication circuit 2102 for example corresponding to the second communication circuit 1024. The LTE subsystem 2101 includes an LTE radio module 2103 and a communication circuit 2104 for example corresponding to the first communication circuit 1022. The LTE subsystem 2101 may implement the L1 (layer 1) LTE communication stack 2114 and the LTE protocol stack 2115 (above layer 1).

The communication terminal 2100 further includes an application processor 2105 for example corresponding to the to together form an RT interface 2116 between the LTE subsystem 2101 and the WLAN/Bluetooth communication circuit 2102.

Table 4 shows the signals which may for example be exchanged over the RT interface 2116.

TABLE 4

| Signal | Width | I/O | Description | Used for in FDD Band 7 | Used for in TDD Band 40 |
|---|---|---|---|---|---|
| CWS active | 1 | I | Medium Busy indicating a CWS RF activity 0 = idle/1 = active | arbitration | arbitration |
| CWS Tx/Rx | 1 | I | CWS traffic direction 0 = Rx 1 = Tx | Unused (CWS active high only for Rx) | arbitration |
| CWS Priority | 2 | I | CWS Priority 0: Low prio/1: BT high prio/2: WLAN high prio (PS-POLL, ACK, BACK)/3: reserved | arbitration | arbitration |
| LTE active | 1 | O | CWS-Kill indication | arbitration | arbitration |
| LTE frame sync | 1 | O | Synchro signal indicating LTE frame start | Unused | Traffic synchronization |
| UL gap envelop | 1 | O | Synchro signal indicating LTE UL gap. Envelop signal with edges occurring 1 ms before in-the-air gap (rising and falling edges) | Traffic synchronization | Traffic synchronization |
| DL gap envelop | 1 | O | Synchro signal indicating LTE DL gap. Envelop signal with raising edge Used only for LTE-TDD. Envelop signal with edges occurring 1 ms before in-the-air gap (raising and falling edges) | Unused | Traffic synchronization | processor (CPU) 1002. Connectivity applications 2112 (including WLAN applications and/or Bluetooth applications) and LTE applications 2113 may run on the application processor 2105.

The communication circuit 2104 may include an NRT apps (applications) coexistence interface 2106 for communicating with the application processor 2105 by means of an application interface 2109 of the application processor 2105 and an NRT coexistence interface 2107 which for example corresponds to the NRT interface 1028 for communicating with the WLAN/BT communication circuit 2102 by means of an NRT coexistence interface 2110 of the WLAN/BT communication circuit 2102 which for example corresponds to the NRT interface 1032.

The LTE subsystem 2101 includes an RT arbitration entity 2111 (for example corresponding to the arbitration unit 1805).

The communication circuit 2104 further includes an (LTE-connectivity) NRT arbitration entity 2108. It should be noted that the NRT arbitration entity 2108 is not necessarily located in the communication circuit 2104 but may also be located in other components of the communication terminal 1000, 2108. It may for example be realized by the CPU 1002.

The LTE subsystem 2101 includes a first RT interface 2106 for example corresponding to the first RT interface 1026 and the WLAN/Bluetooth communication circuit 2102 includes a second RT interface 2107 for example corresponding to the second RT interface 1030 which can be seen It should be noted that the CWS priority signal can be seen as two signals CWS priority 1 & 2 because of its width.

It should further be noted that the first transceiver 1014 and the second transceiver 1018 may also be connected via the application processor 2105 (i.e., for example, the CPU 1002) instead of a direct connection (as a direct RT interface). Further, it should be noted that in general, communication may also be implemented via a serial or parallel bus instead of using dedicated signals (as for example shown in table 4).

According to one aspect of this disclosure, a degraded RT mode may be used. Specifically, only a subset of the RT coexistence I/F signals as given in table 4 may be effectively connected to the WLAN/Bluetooth communication circuit 2102.

For a FDD only platform (i.e. in case the first transceiver 1014 and the second transceiver 1018 only use FDD), a first option (referred to as option 1a in table 5 below) for a degraded RT interface is to remove the DL gap envelop signal and the CWS Tx/Rx signal such that six signals remain. Since these removed signals are useless for FDD, there is no impact on the coexistence performance. As a second option (referred to as option 1b in table 5 below), in addition to the removal of the DL gap envelop signal and the CWS Tx/Rx signal the CWS priority signal (CWS priority signal 1 & 2) may be removed such that four signals remain. In this case, there is no more priority indication. Alternatively, a light arbitration may be used where the second transceiver 1018 may indicate activity only for high priority traffic, but high priority traffics from BT and WLAN cannot be differentiated from each other.

For a FDD-TDD platform (i.e. in case the first transceiver 1014 and the second transceiver 1018 use both TDD and FDD), a first option (referred to as option 2 in table 5 below) is to get rid of arbitration and rely solely on traffic synchronization such that only three signals remain. In this case, the second transceiver 1018 becomes a pure slave and can only use the communication resources left available by the LTE communication (i.e. the first transceiver 1014) and signaled via the DL gap envelop signal and the UL gap envelop signal or synchronization over the TDD frame structure based on the LTE frame sync signal. In this case, there is no way to protect LTE traffic from wrong or too late CWS scheduling.

As a second option (referred to as option 3 in table 5 below), traffic synchronization and light arbitration may kept such that six signals remain. In this case, there are no priority settings. The second transceiver 1018 may only signal above a certain priority but may not differentiate between BT and WLAN. The same arbitration rules are used for the LTE-BT conflict and the LTE-WLAN conflict.

Table 5 summarizes the options for a degraded RT interface.

General Coexistence Architecture

According to an aspect of this disclosure, five entities handle the LTE-CWS coexistence management: the NRT arbitration entity 2108, the NRT applications coexistence interface 2106, the NRT coexistence interface (formed by NRT coexistence interfaces 2107, 2110), the RT arbitration entity 2111 and the RT coexistence interface (formed by RT interfaces 2106, 2107).

The (LTE-connectivity) NRT arbitration entity 2108 may for example be implemented by software located in the communication circuit 2104. For example, it uses a mixture of application requirements (from connectivity and LTE apps) and context information from both cores (e.g. from both the first transceiver 1014 and the second transceiver 1018), e.g. the band, the bandwidth, the EARFCN (E-UTRA Absolute Radio Frequency Channel Number), to arbitrate and indicate static information such as selected frequency bands or selected power levels to the first transceiver 1014 and the second transceiver 1018. It also provides indications to the RT arbiter 2111 located in the LTE subsystem 2101. It should be noted that according to one aspect of this disclosure, the NRT arbitration entity 2108 does not arbitrate

TABLE 5

| Option | Applicable for TDD/FDD | Removed signals | I/F signals | Impact BT | WLAN | On LTE | Comment |
|---|---|---|---|---|---|---|---|
| 1a | FDD only | DL gap envelop CWS Tx/Rx | 6 | None | None | None | Traffic sync Arbitration |
| 1b | FDD only | DL gap envelop CWS Tx/Rx CWS Priority 1 & 2 | 4 | None | None | Nbr of LTE denial increased | Traffic sync Arbitration No differentiation between WLAN and BT activity |
| 2 | FDD & TDD | CWS Active Cws Tx/Rx Cws Priority 1 & 2 LTE Active | 3 | HFP not supported A2DP supported only for low/medium LTE air occupancy | Use cases supported only for low/medium LTE air occupancy | None | Traffic sync only No arbitration |
| 3 | FDD & TDD | Cws Priority 1 & 2 | 6 | None | None | Nbr of LTE denial increased | Traffic sync Arbitration No differentiation between WLAN and BT activity |

As a summary, the following may for example be provided for an RT coexistence mechanism according to various aspects of this disclosure
  LTE frame indication (signal+frame structure message)
  UL gap indication
  DL gap indication
  Arbitration including short conflict possibility
  HARQ protection (for arbitration and for LTE denial)
  Degraded RT modes
  Full usage of an LTE-killed subframe
  Implementation of an RT interface as for example described above between WLAN and BT. This arbitration may for example be performed in the WLAN/BT communication circuit.

The NRT apps (applications) coexistence interface 2106 may also be an entity implemented by means of software running on the communication circuit 2104. It transfers NRT messages carrying application information from connectivity applications 2112 and LTE applications 2113 running on the applications processor 2105. Table 6 gives a list of messages which may be exchanged between the application processor 2105 and the communication circuit 2104 by means of the NRT apps coexistence interface 2106 (and the corresponding application interface 2109).

TABLE 6

Messaging over LTE - NRT Apps coex I/F (R/W)

| ID | Message payloads | Info bits | I/O | Description |
|---|---|---|---|---|
| 1 | IS_COEX | 1 | I | 1 = coexisting between at least 2 systems<br>0 = no coexistence |
| 2 | IS_TETHERING | 1 | I | 1 = WLAN entity is an Access Point<br>0 = WLAN entity is a STA |
| 3 | WLAN_APP_PERIOD | 16 | I | Required service period for WLAN in ms |
| 4 | WLAN_APP_DURATION | 6 | I | Required service duration for WLAN in ms |
| 5 | BT_APP_PERIOD | 16 | I | Required service period for BT in ms. Applies for link using eSCO or SCO. |
| 6 | BT_APP_DURATION | 6 | I | Required service duration for BT in ms. Applies for link using eSCO or SCO only. |
| 7 | WLAN_APP_THROUGHPUT | 16 | I | In kbps |
| 8 | BT_PROFILE_BITMAP | 32 | I | Bitmap of the active BT profiles (HFP, HSP, A2DP . . . ) |
| 9 | LTE_APP_THROUGHPUT | 16 | I | Application latency in ms |
| 10 | LTE_APP_LATENCY | 16 | I | In kbps |

The NRT coexistence interface 2107 may also be an entity implemented by SW located in the communication circuit 2104. It transfers NRT messages carrying context information from the WLAN/BT communication circuit and sends notifications from the NRT arbiter 2108 to the WLAN/BT communication circuit (by means of the corresponding NRT coexistence interface 2110 of the WLAN/BT communication circuit). Table 7 gives a list of messages that may for example be exchanged over the interface formed by the NRT coexistence interface 2107 of the communication circuit 2104 and the NRT coexistence interface 2110 of the WLAN/BT communication circuit 2102.

TABLE 7

Messaging over LTE - NRT coex I/F (R/W)

| ID | Message payloads | Info bits | I/O | Description |
|---|---|---|---|---|
| 1 | WLAN_CHAN_NBR | 3 | I/O | WLAN channel number (applied or to be applied) |
| 2 | WLAN_BW | 1 | I/O | WLAN bandwidth (applied or to be applied):<br>0 = 20 Mhz<br>1 = 40 Mhz |
| 3 | WLAN_MCS | 4 | I | WLAN MCS |
| 4 | WLAN_TX_POWER | 4 | I/O | WLAN Tx power (applied or to be applied) |
| 5 | WLAN_CHANNEL_RANK | 14 × 4 | I | WLAN channel map ranked from preferred to worst based on SINR measurements and WLAN/BT constraints |
| 6 | BT_AFH_RANK | 79 × 3 | I | Full AFH map (including channels that could be excluded for WLAN/BT coex) with preference coded over 3 bits:<br>000 ->preferred<br>111 ->worst |
| 7 | BT_AFH_MAP | 79 | I/O | BT AFH bitmap (applied or to be applied) |
| 8 | BT_PKT_TYPE | 4 | I | Bluetooth packet type |
| 9 | GNSS_BD | 2 | | Operating frequency band |
| 10 | GNSS_STATE | 2 | | 0 = sleep<br>1 = acquisition<br>2 = tracking |
| 11 | LTE_BITMAP | 10 × 2 | O | 0 = Special subframe<br>1 = RX LTE subframe<br>2 = TX LTE subframe |
| 13 | WLAN_LTE_EN | 1 | O | Transmission of WLAN packets shorter than wlan_short_tx during LTE RX allowed |
| 14 | BT_LTE_EN | 1 | O | Transmission of BT packets at power < bt_low_pwr_tx during LTE RX allowed |
| 15 | LTE_SPS_PATTERN | 24 | O | SPS Periodicity (ms): 11 bits<br>SPS event duration (ms): 9 bits<br>SPS initial offset (sub-frame offset in first LTE frame where SPS is applied): 4 bits |

It should be noted that the LTE bitmap can be changed (limited to seven frame structures but also more configurations for the S content itself). It should further be noted that the NRT messages mentioned above can also be sent partially or in totality to the eNodeB 103 if some decision relative to coexistence are taken by it.

Additionally, it should be noted that depending on the platform architecture and application stacks, the split between information located in the communication circuit 2104 and in the WLAN/BT communication circuit 2102 may change.

According to one aspect of this disclosure, the NRT coexistence algorithm and the RT coexistence algorithm are coordinated. This is illustrated in FIG. 22.

Figure 22:
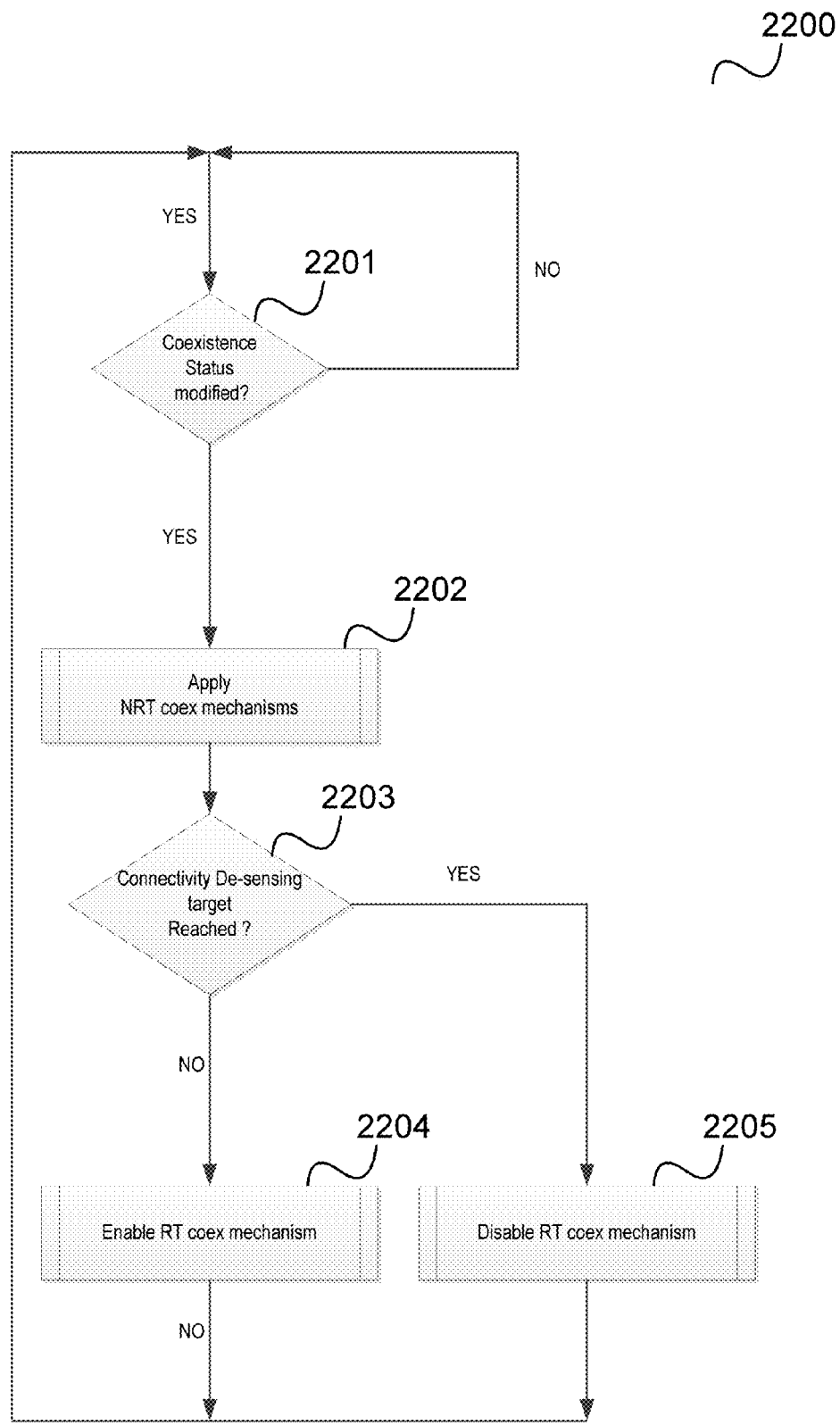
FIG. 22 shows a flow diagram.

FIG. 22 shows a flow diagram 2200.

When the coexistence status changes within the communication terminal 1000 in 2201, the NRT coexistence mechanisms are activated in 2202. Messaging is then sent over the NRT coexistence interface to apply the NRT arbitration decisions.

Consecutively, in 2203, the de-sensing level for the connectivity RAT reached with the newly applied NRT arbitration is estimated using pre-calculated RF interference tables. If it is above the desense target, the RT coexistence mechanisms are enabled 2204 and they run continuously in an autonomous manner. If the de-sensing level is below the desense target, in 2205, the RT coexistence mechanisms are disabled.

When receiving updates (via SW messages) either from the LTE subsystem 2101 or the WLAN/BT communication circuit 2102, the NRT arbiter 2108 can detect a change of the coexistence status, in the sense that, for example, if the frequency used for LTE and CWS communication so far were not in the critical bands, it could now have become the case and coexistence algorithms need to be activated.

The NRT arbiter 2108 is the responsible entity for activating or deactivating any specific coexistence algorithm, and is always ready to receive input messages from LTE or CWS indicating change in any of the relevant parameters.

Cases of coexistence status change may for example include (among others):
a second RAT becomes active;
a handover is performed in LTE communication to another LTE band;
the LTE bandwidth is modified;
the number of active RATs go down to 1.

As described above, according to various aspects of this disclosure, there may be a split (e.g. in terms of interfaces) between RT and NRT. RT and NRT processing may be synchronized. NRT messaging may be extended by messaging between the communication terminal 105 and the eNodeB 103.

NRT Coexistence Mechanisms

The NRT coexistence mechanism may include an FDM/PC (Frequency Division Multiplex/Power Control) algorithm for Bluetooth which is described in the following.

Bluetooth medium access is based on a slotted traffic scheduling. Slots are scheduled in time and frequency on a fixed grid. The time slots are 625 µs long and are mapped onto 1 Mhz wide BT channels. The frequency channel used for a given timeslot is imposed by the frequency hopping pattern, it pseudo randomly changes from slot to slot.

A BT entity (e.g. in form of the communication terminal 1000 using Bluetooth) can be either a (Bluetooth) Master or a (Bluetooth) Slave. A Bluetooth master provides reference time and controls the synchronism and the activity of a piconet that is controls which is a small network of Bluetooth devices surrounding it. Slave entities have to monitor periodically the medium to capture any control information coming from the piconet master. A Bluetooth slave listens on all potential master transmissions (1.25 ms period) during a slot or a slot fraction and answers in next slot if it has received a packet addressed to it in the current slot. A BT slave can use "Sniff mode" to lower power consumption and avoid: master-slave transaction only on reserved slots (negotiated before going into sniff mode).

According to Bluetooth, useful data and/or control data is carried over two periodic and/or asynchronous packets. The kind of packets used for a given data traffic depends on the corresponding traffic profile (which is standardized). Control traffic is carried by asynchronous traffic.

A BT slave can use "Sniff mode" to lower power consumption and avoid: master-slave transaction only on reserved slots (negotiated before going into sniff mode).

Target Bluetooth profiles may be A2DP for audio (e.g. music) streaming and HFP as voice headset profile. A2DP is an asynchronous traffic profile using variable length packets (single-multislot), HFP is a periodic single slot traffic transferred in scheduled (reserved) slots. Devices may also be BTpaired with no traffic.

Slots may be reserved during link set-up (by Link Managers). Most common packets are HV3 packets (for Synchronous Connection-Oriented (SCO) communication), which occupy one third of the double slots.

Figure 23:
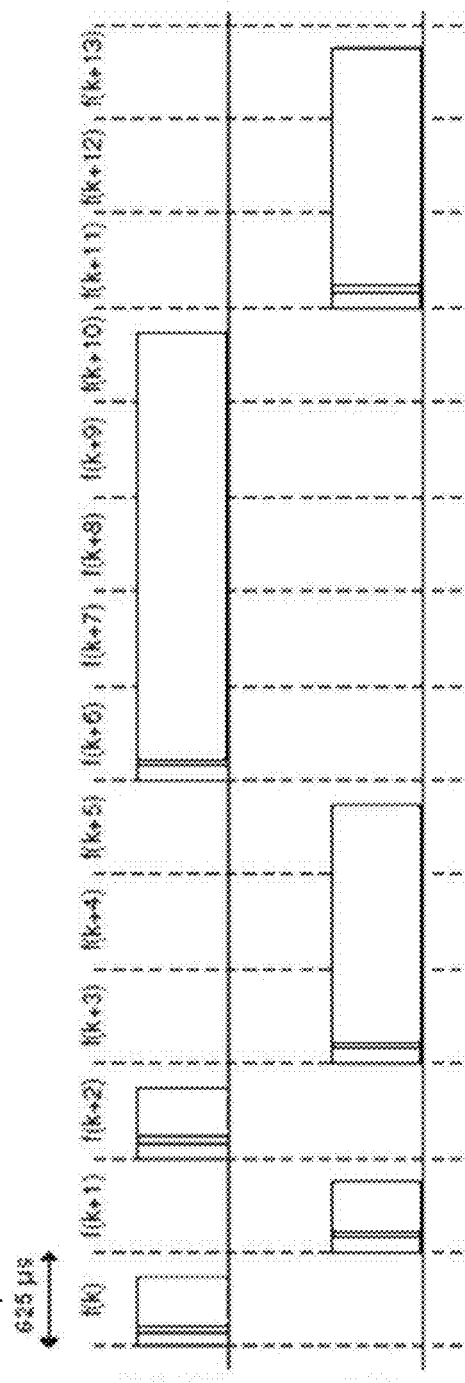
FIG. 23 shows a transmission diagram.

An example for Multi slot Bluetooth traffic is illustrated in FIG. 23.

FIG. 23 shows a transmission diagram 2300.

In the transmission diagram 2300, time increases from left to right and is divided into time slots 2301 of 625 µs. First transmissions 2302 are performed by a master device and second transmissions 2303 are performed by a slave device.

Bluetooth communication applies frequency hopping. In a communication, the operating frequency channel changes pseudo-randomly from time slot to time slot and performs a pseudo random walk through 79 available 1 Mhz channels in the ISM band 202.

Adaptive frequency hopping (AFH) is a mechanism which allows limiting this to a subset of the 79 channels. The number N of used channels must however not go below 20. The channel map selection is completely flexible but results from a negotiation between master and slave performed on a static basis. AFH can be disabled for parked slaves.

The adaptive frequency hopping mechanism may be used to push away the BT traffic from the LTE frequency bands. It is especially efficient to protect LTE Rx from BT Tx (LTE-TDD case), less in the reverse direction because BT front end (filter/low noise amplifier (LNA)) is wide band.

According to one aspect of this disclosure, the adaptive frequency hopping mechanism is exploited by the following:
The first communication circuit 1022 performs static requests to the second communication circuit 1024 (acting as (local) BT core) to modify its channel map;
The second communication circuit 1024 updates the channel map and aligns it with the peer entity (e.g. another communication terminal);

The Bluetooth spectrum occupancy can be reduced down to one third of the ISM band 202. This provides a guard band of up to 60 Mhz to LTE-Band 40 201 and a guard band of up to 79 Mhz to LTE-Band 7 UL 204. It should be noted that the efficiency of AFH for BT/LTE coexistence may be limited due to the fact that the BT RX front end receives the full band even in AFH context (non-linearities are there anyway).

The impact of the usage of this mechanism on BT/WLAN coexistence can be seen to be limited.

In the following, an procedure for protecting Bluetooth from LTE-FDD transmissions in LTE-Band 7 UL 204 is described with reference to FIG. 24.

Figure 24:
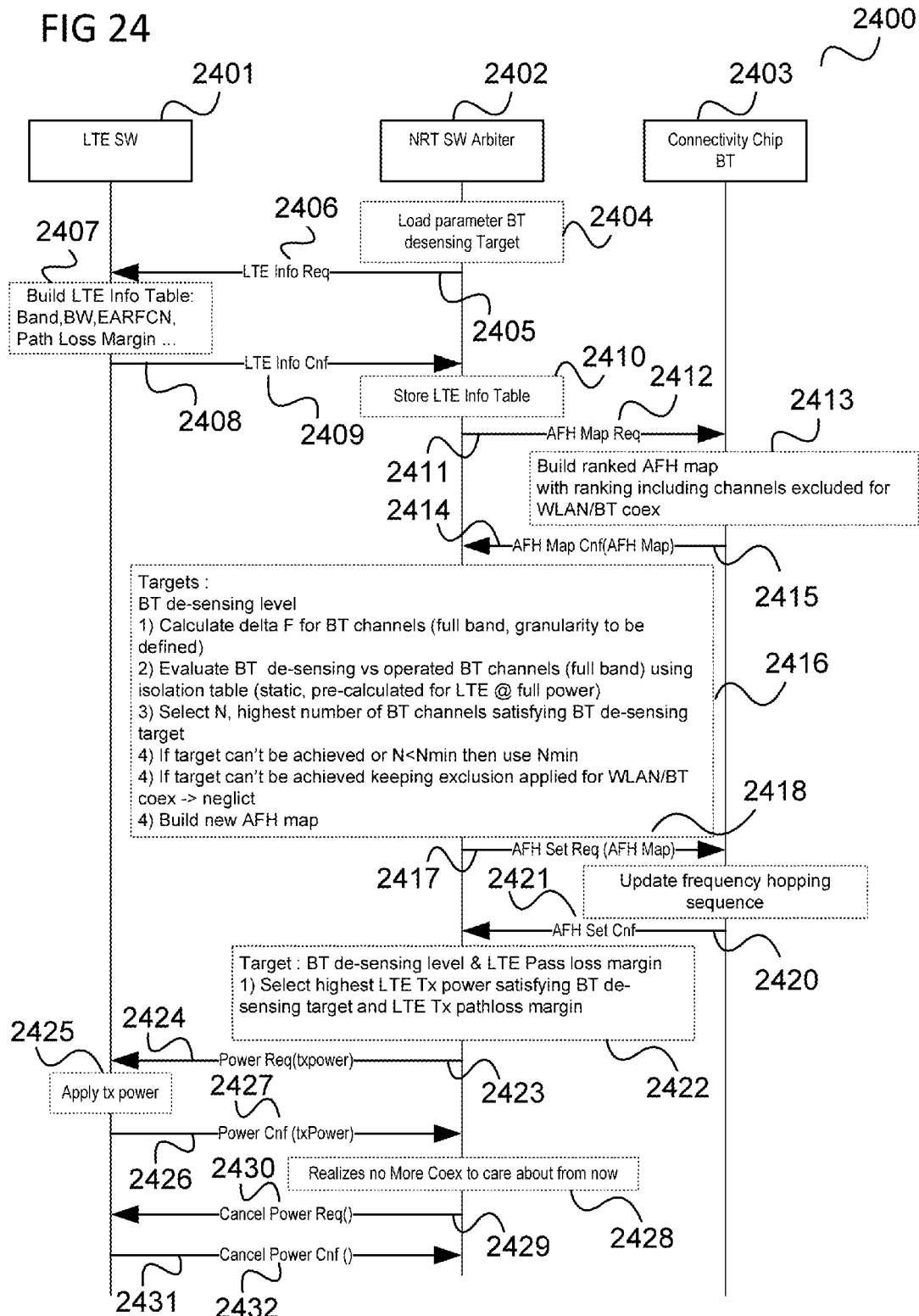
FIG. 24 shows a message flow diagram.

FIG. 24 shows a message flow diagram 2400.

An NRT algorithm corresponding to the message flow diagram 2400 may for example be carried out by the NRT arbitration unit 2108.

The message flow takes place between a LTE subsystem 2401 corresponding to the LTE subsystem 2101 (e.g. corresponding software), an NRT arbiter 2402 corresponding to the NRT arbiter 2108 and a BT communication circuit 2403 corresponding to the WLAN/BT communication circuit 2102.

In 2404, the NRT arbiter 2402 loads the BT desensing target.

In 2405, the NRT arbiter 2402 sends an LTE info request message 2406 to the LTE subsystem 2401 for requesting information about the LTE configuration.

In 2407, the LTE subsystem 2401 generates information about the LTE configuration, e.g. an LTE information table including the band used, the bandwidth used, the EARFCN, the path loss margin (estimated transmission power decrease without triggering modulation/bandwidth change) etc.

In 2408, the LTE subsystem 2401 sends the generated information with an LTE information confirm message 2409 to the NRT arbiter 2402.

In 2410, the NRT arbiter 2042 stores the information received with the LTE information confirm message 2409.

In 2411, the NRT arbiter 2402 sends an AFH map request message 2412 to the BT communication circuit 2403 for requesting an AFH map.

In 2413, the BT communication circuit 2403 builds a ranked AFH map including channels excluded for coexistence.

In 2414, the BT communication circuit 2403 sends the generated AFH map to the NRT arbiter 2402 with an AFH map confirm message 2415.

In 2416, the NRT arbiter 2402 generates a new AFH map. The target in this is the BT de-sensing level. The generation may for example include the following:
1) Calculate delta F for BT channels (full band, granularity to be defined)
2) Evaluate BT de-sensing vs operated BT channels (full band) using isolation table (static, pre-calculated for LTE at full power)
3) Select N, highest number of BT channels satisfying BT de-sensing target
4) If target cannot be achieved or N<Nmin then use Nmin
5) If target cannot be achieved keeping exclusion applied for WLAN/BT coex→neglict
6) Build new AFH map In 2417, the NRT arbiter 2402 sends the new AFH map to the BT communication circuit 2403 with an AFH set request message 2418 requesting the BT communication circuit 2403 to use the new AFH map.

In 2419, the BT communication circuit 2403 updates the frequency hopping sequence accordingly.

In 2420, the BT communication circuit 2403 confirms the usage of the new AFH map by means of an AFH set confirm message 2421.

In 2422, the NRT arbiter 2402 selects the highest LTE Tx (transmission) power satisfying the BT de-sensing target and the LTE Tx pathloss margin.

It should be noted that this approach may be dangerous for interoperability tests (IOT). According to one aspect of this disclosure, it is ensured that it is applied only in the coexistence case as defined by AP.

In 2423, the NRT arbiter 2402 sends the determined LTE Tx power to the LTE subsystem 2401 with a power request message 2424 requesting the LTE subsystem 2401 to use the determined Tx power.

In 2425, the LTE subsystem 2401 applies the Tx power accordingly.

In 2426, the LTE subsystem 2401 confirms the usage of the Tx power by means of a power confirm message 2427.

It is assumed that in 2428, the NRT arbiter 2402 realizes that no more coexistence is to care of from now.

In 2429, the NRT arbiter 2402 sends a cancel power request message 2430 to the LTE subsystem 2401 which is confirmed in 2431 by means of a cancel power confirm message 2432 from the LTE subsystem 2401.

According to one aspect of this disclosure, the NRT coexistence mechanism includes an FDM/PC algorithm for WLAN which is described in the following.

WLAN medium access is based on Carrier Sense Medium Access (CSMA) where stations listen to the medium and compete to get access to it when it is free. There is no resource scheduling, no traffic periodicity. A global synchronization is achieved via a beacon transmitted every approximately 102 ms by the access point but effective beacon transmission can be delayed due to medium occupancy.

WLAN MAC adapts to the radio channel conditions via a link rate adaptation, based on packet error rate computed at transmitter side based on received ACKs (positive ACK with retransmission).

In the 2.4 Ghz band (ISM band), WLAN systems operate over 14 overlapping channels referred to as CH #1 to CH#14 (CH #14 is used only in Japan). This is illustrated in FIG. 25.

Figure 25:
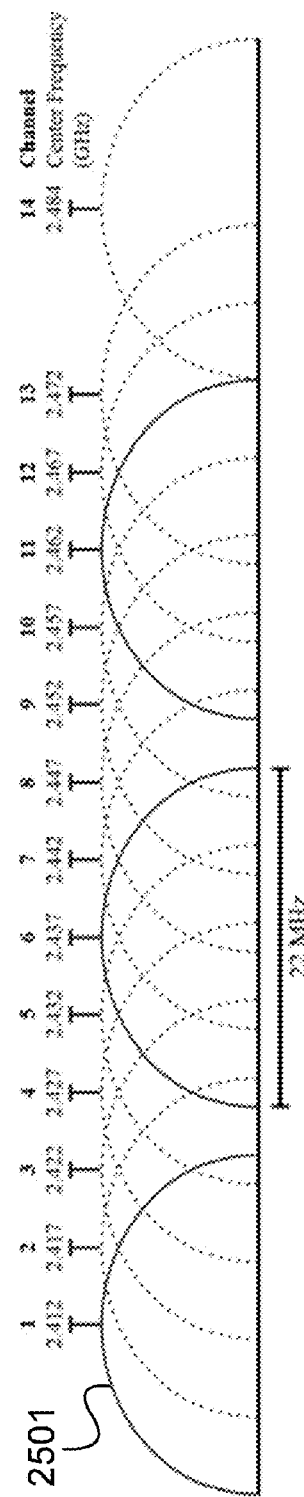
FIG. 25 shows a frequency allocation diagram.

FIG. 25 shows a frequency allocation diagram 2500.

In the frequency allocation diagram 2500, frequency increases from left to right. The 14 overlapping channels allocated for WLAN are illustrated by half circles 2501.

WLAN is typically operating in BSS (basic service set) mode. Peer to peer mode also exists but is rarely used yet. However, it may become useful in the smartphone use case.

In BSS mode, the access point (AP) has full control of the operated WLAN channel selection and mobile station (STA). The WLAN channel is selected in a static access point.

According to one aspect of this disclosure, WLAN power control is used for reducing interference to LTE communication.

WLAN has a peak power of approximately 20 dBm, and is usually transmitting at full power to enable the highest possible PHY rate and shorten as much as possible the packet duration for power consumption reasons. However, the WLAN protocol stack does not prevent from using a lower Tx power nor define a rule to select the used power.

If needed, the second transceiver 1018 (operating as WLAN transceiver in this example) embedded in the communication terminal 1000 can autonomously reduce its Tx power:

If the communication terminal 1000 acts by means of the second transceiver 1018 as a station connected to a home access point or a hot spot, this is likely to trigger a link rate adaptation event to downgrade PHY rate which would cause higher packet duration and hence longer interference from WLAN to LTE. According to one aspect of this disclosure, usage of power control is limited in that case.

If the communication terminal 1000 acts by means of the second transceiver 1018 as an AP (i.e. tethering case)

the distance between the communication terminal 1000 (for example a smartphone) used as an access point (router) and a connected WLAN (e.g. Wifi) client (e.g. laptop) is under control of the user and can be made close. The communication terminal 1000 can then reduce significantly its WLAN Tx power to balance the lower BSS coverage and associated pathloss.

A comparison of the estimated path loss for tethering vs hot spot is given in table 8.

TABLE 8

| Use case | Tethering | Hot spot (indoor) |
|---|---|---|
| AP-STA distance | 10 | 30 |
| Pathloss_dB | 66.1 | 85.2 |
| Delta_dB | | 19.1 |

The rough estimation as given in table 8 gives a 19 dB margin between hot spot and tethering showing that the WLAN Tx power can be reduced by up to 19 dB which corresponds to 1 dBm.

According to one aspect of this disclosure, the AP Tx power is reduced gradually and the PER evolution at the AP is monitored (PER statistics are always build in WLAN).

In summary, WLAN power control could bring a 15-20 dB reduction of WLAN to LTE interference in case of tethering. LTE to WLAN interference rejection requirements could be relaxed (WLAN de-sensing requirement). This approach may not be suitable if coupled with TDM (Time Division Multiplex) solutions as Tx power reduction may lead to lower phy rate and thus increased Tx duration. There may be a trade-off between power control and high PHY rates usage.

According to one aspect of this disclosure, WLAN channel selection is used for reducing WLAN/LTE interference.

In the use cases where the communication terminal 1000 (as WLAN entity) acts as an AP (e.g. for tethering) it can freely select the WLAN channel for its operation. Therefore the WLAN traffic can be pushed away from LTE operating band hence protecting both WLAN from LTE and LTE from WLAN. According to one aspect of this disclosure, WLAN channel quality as perceived by WLAN APs, e.g. reflecting channel occupation by a nearby hot spot or home AP, are taken into account in this process.

WLAN channel selection can bring 18 to 42 dB rejection of WLAN to LTE (LTE-Band 40) interference when channels CH#3 to #14 are selected. This mechanisms is compatible with power control solutions which can be used on top.

WLAN channel selection can bring 27 to 77 dB rejection of LTE (LTE-Band 40) to WLAN interference when channels CH#3 to #10 are selected.

Altogether, AP channel selection can reduce

WLAN to LTE-Band 40 OOB (out-of-band) rejection by 18 to 42 dB

LTE-Band 40 to WLAN OOB rejection by 27 to 77 dB

LTE-Band 7 UL→WLAN OOB rejection by 19 to 49 dB

This mechanism does not harm the WLAN throughput or robustness.

It should be noted that the aforementioned analysis takes into account OOB noise effect only, hence assuming that the non line effects such as signal compression of reciprocal mixing have been avoided by RF system design.

In the following, an procedure for protecting WLAN from LTE-FDD transmissions in LTE-Band 7 UL 204 is described with reference to FIG. 26.

Figure 26:
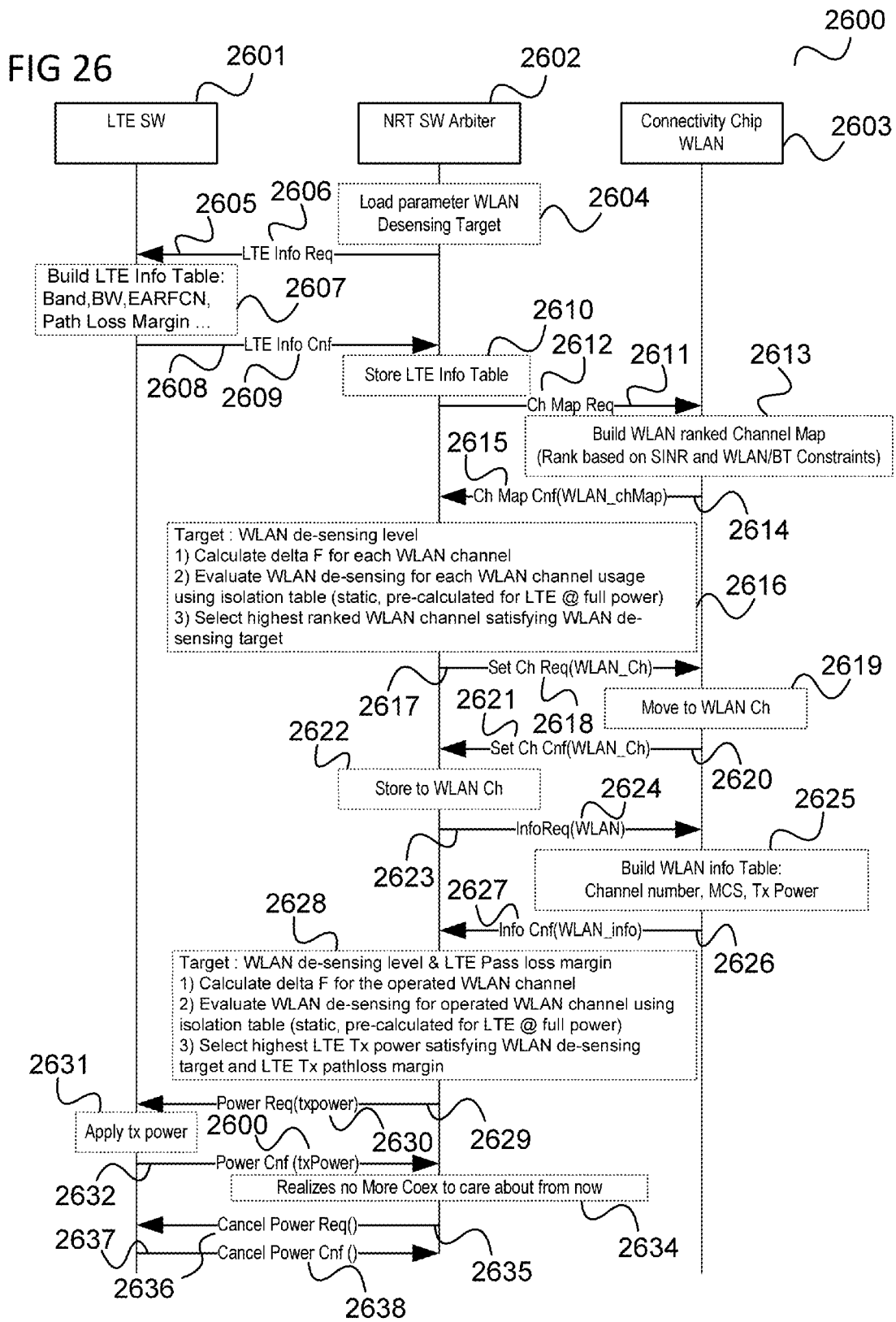
FIG. 26 shows a message flow diagram.

FIG. 26 shows a message flow diagram 2600.

An NRT algorithm corresponding to the message flow diagram 2600 may for example be carried out by the NRT arbitration unit 2108.

The message flow takes place between a LTE subsystem 2601 corresponding to the LTE subsystem 2101 (e.g. corresponding software), an NRT arbiter 2602 corresponding to the NRT arbiter 2108 and a WLAN communication circuit 2603 corresponding to the WLAN/BT communication circuit 2102.

In 2604, the NRT arbiter 2602 loads the WLAN desensing target.

In 2605, the NRT arbiter 2602 sends an LTE info request message 2606 to the LTE subsystem 2601 for requesting information about the LTE configuration.

In 2607, the LTE subsystem 2601 generates information about the LTE configuration, e.g. an LTE information table including the band used, the bandwidth used, the EARFCN, the path loss margin (estimated transmission power decrease without triggering modulation/bandwidth change) etc.

In 2608, the LTE subsystem 2601 sends the generated information with an LTE information confirm message 2609 to the NRT arbiter 2602.

In 2610, the NRT arbiter 2602 stores the information received with the LTE information confirm message 2608.

In 2611, the NRT arbiter 2602 sends an channel map request message 2612 to the WLAN communication circuit 2603 for requesting an channel map.

In 2613, the WLAN communication circuit 2603 builds a ranked channel map The ranking may be based on SNR (signal to noise ratio) and WLAN/BT constraints.

In 2614, the WLAN communication circuit 2603 sends the generated channel map to the NRT arbiter 2602 with a channel map confirm message 2615.

In 2615, the NRT arbiter 2602 determines a WLAN channel to be used. The target in this is the WLAN de-sensing level. The determination may for example include the following:
1) Calculate delta F for each WLAN channel
2) Evaluate WLAN de-sensing for each WLAN channel usage using isolation table (static, pre-calculated for LTE at full power)
3) Select highest ranked WLAN channel satisfying WLAN de-sensing target In 2617, the NRT arbiter 2602 sends an indication of the determined WLAN channel to the WLAN communication circuit 2603 with an set channel request message 2618 requesting the WLAN communication circuit 2603 to use the determined WLAN channel.

In 2619, the WLAN communication circuit 2603 accordingly moves to the determined WLAN channel.

In 2620, the WLAN communication circuit 2603 confirms the usage of the determined WLAN channel by means of a set channel confirm message 2621.

In 2622, the NRT arbiter 2602 stores an indication of the WLAN channel.

In 2623, the NRT arbiter 2602 sends an WLAN info request message 2624 to the WLAN communication circuit 2603 for requesting information about the WLAN configuration.

In 2625, the WLAN communication circuit 2603 generates information about the WLAN configuration, e.g. a WLAN information table including the channel number, the MCS (Modulation and Coding Scheme), the Tx power etc.

In 2626, the WLAN communication circuit 2603 sends the generated information with an WLAN information confirm message 2627 to the NRT arbiter 2602.

In 2628, the NRT arbiter 2602 selects the highest LTE Tx (transmission) power satisfying the WLAN de-sensing target and the LTE Tx pathloss margin.

This may include the following:
1) Calculate delta F for the operated WLAN channel;
2) Evaluate WLAN de-sensing for operated WLAN channel using isolation table (static, pre-calculated for LTE at full power);
3) Select highest LTE Tx power satisfying WLAN de-sensing target and LTE Tx pathloss margin It should be noted that this approach may be dangerous for interoperability testing (IOT). According to one aspect of this disclosure, it is ensured that it is applied only in the coexistence case as defined by AP.

In 2629, the NRT arbiter 2602 sends the determined LTE Tx power to the LTE subsystem with a power request message 2630 requesting the LTE subsystem 2601 to use the determined Tx power.

In 2631, the LTE subsystem 2601 applies the Tx power accordingly.

In 2632, the LTE subsystem 2601 confirms the usage of the Tx power by means of a power confirm message 2633.

It is assumed that in 2634, the NRT arbiter 2602 realizes that no more coexistence is to care of from now.

In 2635, the NRT arbiter 2602 sends a cancel power request message 2636 to the LTE subsystem 2601 which is confirmed in 2637 by means of a cancel power confirm message 2638 from the LTE subsystem 2601.

Messages that may for example be exchanged over the NRT interface formed by the NRT coexistence interface 2107 of the communication circuit 2104 and the NRT coexistence interface 2110 of the WLAN/BT communication circuit 2102 (e.g. operating as WLAN/BT baseband circuit) in the context of NRT coexistence have been shown above in table 7. Further examples are given in the following text.

According to one aspect of this disclosure measurement gap configuration in LTE connected Mode is used for LTE-WLAN coexistence.

While in LTE connected mode, measurement gaps are defined in 3GPP specifications to enable single radio mobile terminals (i.e. mobile terminals with only one LTE transceiver which are not capable of measuring transparently other frequencies (than the one used by the serving cell) while in LTE connected mode) to perform measurements of:
1. LTE neighbor cells operating on different frequencies than the serving cell (inter-frequency measurements)
2. Other RAT (e.g. 2G or 3G) neighbor cells (inter-RAT measurements).

Typically, when LTE is the serving RAT, those measurement gaps have a duration of 6 ms and are scheduled with either 40 ms or 80 ms periodicity.

If LTE communication is performed using a frequency that is interfering with WLAN communication and vice-versa, the measurement gaps can be used for safe WLAN reception and transmission:
  if the gap is used for an LTE inter-frequency measurement, and if the LTE frequency if not overlapping with WLAN frequency
  if the gap is used for 2G or 3G measurement, as there is no interference possible between 2G/3G and the ISM frequency bands, the gap can be used without restriction for WLAN/BT in parallel to the LTE measurement.

Additionally, in LTE connected mode, for better closed subscriber group (CSG) cell support, 3GPP Release 9 introduces the concept of so called autonomous measurement gaps. The reason here is that for CSG cells, the SIB (System Information Block) needs to be read which may require additional measurement gaps asynchronous to the ones scheduled in the regular intervals. If the network supports autonomous measurement gaps, the mobile terminal is allowed to ignore a few TTIs as long as the mobile terminal is able to send at least 60 ACK/NAKs per 150 ms interval. The HARQ and higher layer signaling ensure that data does not get lost.

To inform in advance the second transceiver 1018 of any upcoming regular gap occurrence, during which no interference to WLAN reception or transmission will occur, the first transceiver 1014 (e.g. the LTE baseband circuit) can send a message to the second transceiver 1018 (e.g. the CWS baseband circuit), indicating a gap pattern along with:
  the measurement gap pattern periodicity (for example 40/80 ms),
  the measurement gap duration (example 6 ms)
  an unambiguous method to identify the first measurement gap occurrence for the considered measurement gap pattern.

This may be used for:
  interfrequency measurement gaps,
  inter RAT measurement gaps,
  autonomous measurement gaps.

The message can for example be a Periodic_Gap_Pattern_Config (periodicity, duration, first occurrence date) message, sent from the first transceiver 1014 (e.g. the LTE baseband circuit) to the second transceiver 1018 (e.g. the CWS baseband circuit) which indicates periodic gap pattern, and during each of those gaps the second transceiver 1018 can freely perform transmission and reception.

A criterion and decision in the first transceiver 1014 (e.g. the LTE baseband circuit) to enable the sending of a gap message indication from the first transceiver 1014 (e.g. implementing an LTE Protocol Stack or LTE Physical Layer) controlled by the first processor to the second transceiver 1018 (e.g. the CWS baseband circuit) may belong to the Non Real Time (e.g. software) Arbiter 2108 entity which may run on the first transceiver 1014 (e.g. the LTE baseband circuit), based on whether:
  frequency interference occurs;
  there was enough or not enough interference free time periods during which the second transceiver 1018 (e.g. the CWS baseband circuit) could operate.

The gap message indication may be enabled or disabled dynamically by the Non Real Time (e.g. software) Arbiter 2108 whenever it considers the criterion fulfilled to start or stop using gaps to insure proper second transceiver 1018 functionality.

In summary, WLAN communication can be protected from LTE Band 7 UL 204, Bluetooth communication can be protected from LTE Band 7 UL 204 and also WLAN communication can be protected from LTE Band 40 201 and Bluetooth communication can be protected from LTE Band 40 201.

PHY Mitigations

Pilot symbols in interfered OFDM symbols are typically meaningless. As worst case the case may be seen that two consecutive OFDM symbols are lost per LTE slot. This means that one pilot is missing per antenna per slot (e.g. among two for antennas 0 and 1, among one for antennas 2 and 3). It should be noted that antennas 0 and 1 are only relevant for smartphone. It remains one (for 1/2 antennas) worst case: one pilot is missing for a given carrier.

This may have the following impacts:

1) The outer receiver can be impacted on AGC, Noise estimation, channel estimation.

These tasks are processed with a delay which is sufficient to exploit a real time indication of the WLAN interfering burst, Some filters already exist in equalizer to compensate absence of a RS (reference signal), The indication of the WLAN interfering burst could be used by outer receiver to declare the corresponding RS, if any, as missing, an existing filter could be applied then, This real time indication may be included in the RT coexistence interface In summary, outer receiver protection from WLAN short interference can be done by framework modifications (the implementation of the RT coexistence and RT arbitration can be done as pre-requisite).

2) Inner receiver:

Transport block/code word/Code block vulnerability may be difficult to evaluate; impact depends at least on code block length and channel conditions:

In best case, code blocks are recovered by the turbo code, such that there is no impact on LTE throughput In worst case a code block is impacted similarly in consecutive HARQ retransmissions (periodically). This would mean that the corresponding transport block would never go through the transmission.

It is typically desirable to avoid the worst case. Further, it may be desirable to prevent two consecutive interfering burst in the same LTE subframe. For example, this may be done by banning two consecutive interfering WLAN burst spaced by the HARQ period (e.g. 8 ms).

According to one aspect of this disclosure, spur nulling may be used to address the above issues which can be seen as a frequency domain solution. It is for example assumed that the spur does not saturate the FFT (hence spilling over the full bandwidth in frequency domain): The WLAN/BT requirements on transmission spurious emission may be dimensioned accordingly. For example, frequency domain spur detection & frequency domain spur nulling or signal spur nulling may be applied.

In summary, RS filtering based on an RT coexistence indication (AGC, noise estimation and channel estimation protection) and/or spur detection and nulling is applied for coexistence.

Protocol Mitigations

On the LTE side, several protocol mechanisms may be used to prevent conflicts between the LTE and WLAN/BT activities on the communication medium:

In absence of idle gaps or when their number/duration are insufficient compared to the WLAN/BT needs, some techniques can be used at protocol level to deny some LTE sub frames so that they can be used by WLAN/BT. This is referred to as LTE denial. Such techniques may not rely on current 3GPP specifications and may be done autonomously at mobile terminal level. However they may be partially included in 3GPP standard from Release 11 (IDC Work Item).

Additionally, when the mobile terminal is in handover range, it may try to influence the eUTRAN to prioritize handover towards cell with coexistence-friendly carrier frequency. It can also try to delay the handover toward a less coexistence-friendly cell. This is also referred to as coexistence-friendly handover.

LTE denial can be implemented using UL-grant ignoring or SR (schedule request)-postponing. Coexistence-friendly handover can be implemented via smart reporting of neighboring cells measurement results (values and/or timelines).

The impact of WLAN and Bluetooth use cases over LTE-FDD for full connectivity traffic support, relying only on LTE denial, is illustrated above in FIGS. 16 and 17. This can be seen as the worst case for the LTE-FDD side and can be used as reference to quantify the enhancement provided by coexistence mechanisms for LTE-FDD. The following assumptions are made:

Systematic LTE denial

WLAN is operated with medium channel quality (29 Mbps PHY rate worst case)

WLAN STA (i.e. Not valid for tethering).

Tables 9 and 10 further illustrate the worst case impact of Bluetooth use cases over LTE-FDD and worst case impact of WLAN use cases over LTE-FDD (assuming full support, no LTE gaps), respectively. The use cases are the same as illustrated in FIGS. 16 and 17.

TABLE 9

| BT traffic profiles (from use cases) | Worst case (w/o gap) | Best case (w/o gap) |
| --- | --- | --- |
| HFP bi-directional - master, SCO HV3-64 Kbps + 64 Kbps | 4 non consecutive UL sub-frame over 11 (36%) | Ident |
| HFP bi-directional - master, eSCO EV3 64 kbps + 64 kbps | In absence of re-transmission, 1 UL sub-frame over 6 (16.6%) | Ident |
| A2DP SBC stereo High Quality, SRC 0 master, 2-DH5, 345 Kbps, period 30 ms | 4 non consecutive UL sub-frame per 30 ms (13.3%) | Ident |

TABLE 10

| WLAN traffic types (from use cases) | Worst case (w/o gap) | Best case (w/o gap) |
| --- | --- | --- |
| WLAN Beacon listening | 2 subframe denied every 300 ms (2/300) | Ident |
| Skype video - bidirectional 1 Mbps | 2 subframes every 20 ms (1/10) | Ident |
| Youtube - DL 600 kbps | 2 consecutive subframes every 20 ms (1/10) | Ident |
| TCP - DL 600 kbps | 1 subframe every 20 ms (1/20) | Ident |

According to one aspect of this disclosure, LTE denial consist in:

Denying autonomously at mobile terminal level the usage of UL sub-frames where LTE has allocated communication resources. This can be applied to both LTE-FDD (e.g. LTE-Band 7 UL 204) and LTE-TDD (e.g. LTE-Band 40 201), Denying autonomously at mobile terminal level the usage of DL sub-frames where LTE has allocated communication resources. This can be applied to LTE-TDD (e.g. LTE-Band 40 201)

It should be noted that for UL denial a cancellation/postponing of the scheduled LTE activity may be done while for DL denial, allowing simultaneous TX activity on the CWS side may be sufficient.

In context of SR postponing, it should be noted that LTE has been designed to address the need for mobile Internet access. Internet traffic can be characterized by a high burstiness with high peak data rates and long silence periods. In order to allow for battery savings, an LTE communication system (as shown in FIG. 1) allows for DRX. Two DRX profiles are introduced addressed by short DRX and long DRX, respectively. For the reverse link, i.e. the uplink, in order to increase system capacity, an LTE communication system allows for discontinuous transmission (DTX). For uplink traffic, the mobile terminal 105 reports its uplink buffer status to the eNB 103 which then schedules and assigns uplink resource blocks (RBs) to the mobile terminal 105. In case of empty buffers, the eNB 103 may not schedule any uplink capacity in which case the UE 105 is not able to report its uplink buffer status. In case the uplink buffer changes in one of its uplink queues, the UE 105 sends a so called schedule request (SR) to be able to report its buffer status in a subsequent scheduled uplink shared channel (PUSCH).

In order to prevent this from happening, the mobile terminal 105 MAC layer may delay the SR if the DTX period has been previously granted to WLAN activity. According to one aspect of this disclosure, this mechanism may be used for LTE/WLAN coexistence. It is illustrated in FIG. 27.

Figure 27:
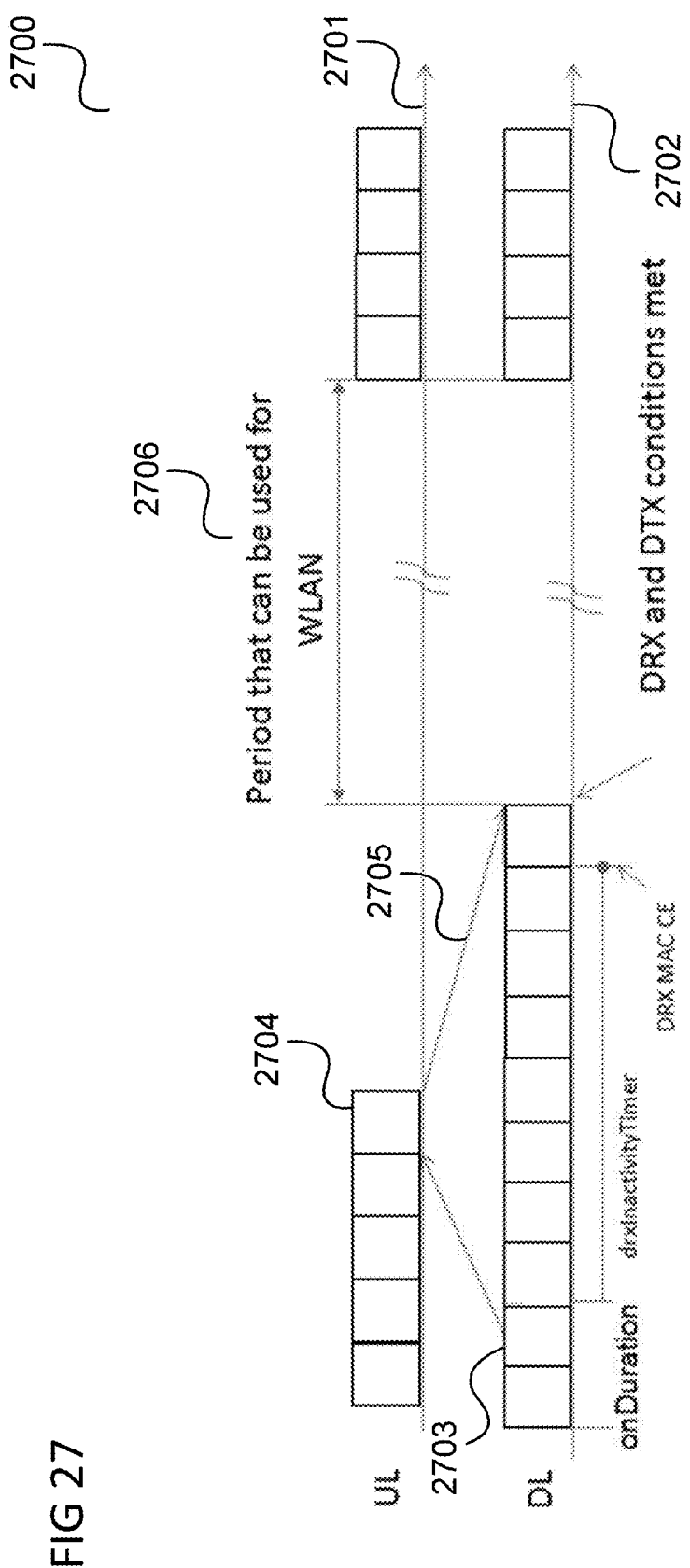
FIG. 27 shows a transmission diagram.

FIG. 27 shows a transmission diagram 2700.

LTE uplink transmissions are illustrated along a first timeline 2701 and LTE downlink transmissions are illustrated along a second timeline 2702. The transmissions for example occur between the mobile terminal 105 and the base station 103 serving the mobile terminal 105. Time increases from left to right along the time lines 2701, 2702.

In this example, the mobile terminal 105 receives an UL grant in a first TTI 2703. The mobile terminal 105 responds to this UL grant by sending an UL signal in a second TTI 2704. At the same time, the mobile terminal 105 is setting its DRX inactivity timer. Assuming that no further UL grants or DL transport blocks (TBs) have been scheduled which would cause the DRX inactivity timer to be reset to the DRX inactivity time, after the mobile terminal 105 receives the outstanding ACK of the last UL transport block it sent (as illustrated by arrow 2705), DRX and DTX conditions are met. During the DRX and DTX period 2706, the mobile terminal 105 does not need to listen to any downlink control channels in the PDCCH and the mobile terminal 105 not scheduled by the eNB 103 before the end of the DRX and DTX period 2706. The DRX and DTX period 2706 may be used for WLAN transfer.

The mobile terminal 105 may send an SR in case it requires sending some uplink data which would put an end to the DRX and DTX period 2706. In order to prevent this from happening, the mobile terminal MAC may suppress the SR if the period is used for interfering WLAN activity.

In the example of FIG. 27, the mobile terminal 105 receives an UL grant in the first TTI 2703. The mobile terminal 105 complies with this UL grant by sending an UL signal in the second TTI 2704 (four TTIs later). However, the mobile terminal 105 may ignore this UL grant hence denying the UL sub frame coming four TTIs later which is hence release for WLAN/BT operations. This released sub frame is indicated to the CWS chip 1024 using the RT coexistence interface 1026 (UL gap indication).

According to one aspect of this disclosure, LTE denial with HARQ protection is used. This is described in the following.

In LTE-WLAN/BT coexistence, usage of LTE-denial may be required to release a LTE subframe for connectivity traffic (overruling LTE sub-frame allocation). When applied in UL, LTE denial may be seen to corresponds to preventing the LTE transceiver 1014 from transmitting in a sub-frame where it had some allocated communication resources. In this case, the characteristics of the LTE HARQ mechanism may be taken into account: HARQ is a MAC level mechanism of retransmission which is synchronous and periodic with a 8 ms period (UL case, in DL it is asynchronous).

In LTE-FDD UL, HARQ is synchronous and supports a maximum of eight processes. The potential retransmission of a packet initially transmitted in sub-frame N hence occurs in sub-frames N+8*K, with K>=1. Thus, the impact of LTE-denial over a transport channel can differ a lot depending on interaction with LTE HARQ. E.g. a periodic LTE-denial with 8 ms period may impact every repetition attempt of a single HARQ process and may lead to a link loss. An example with a denial period of 12 ms is illustrated in FIG. 28.

Figure 28:
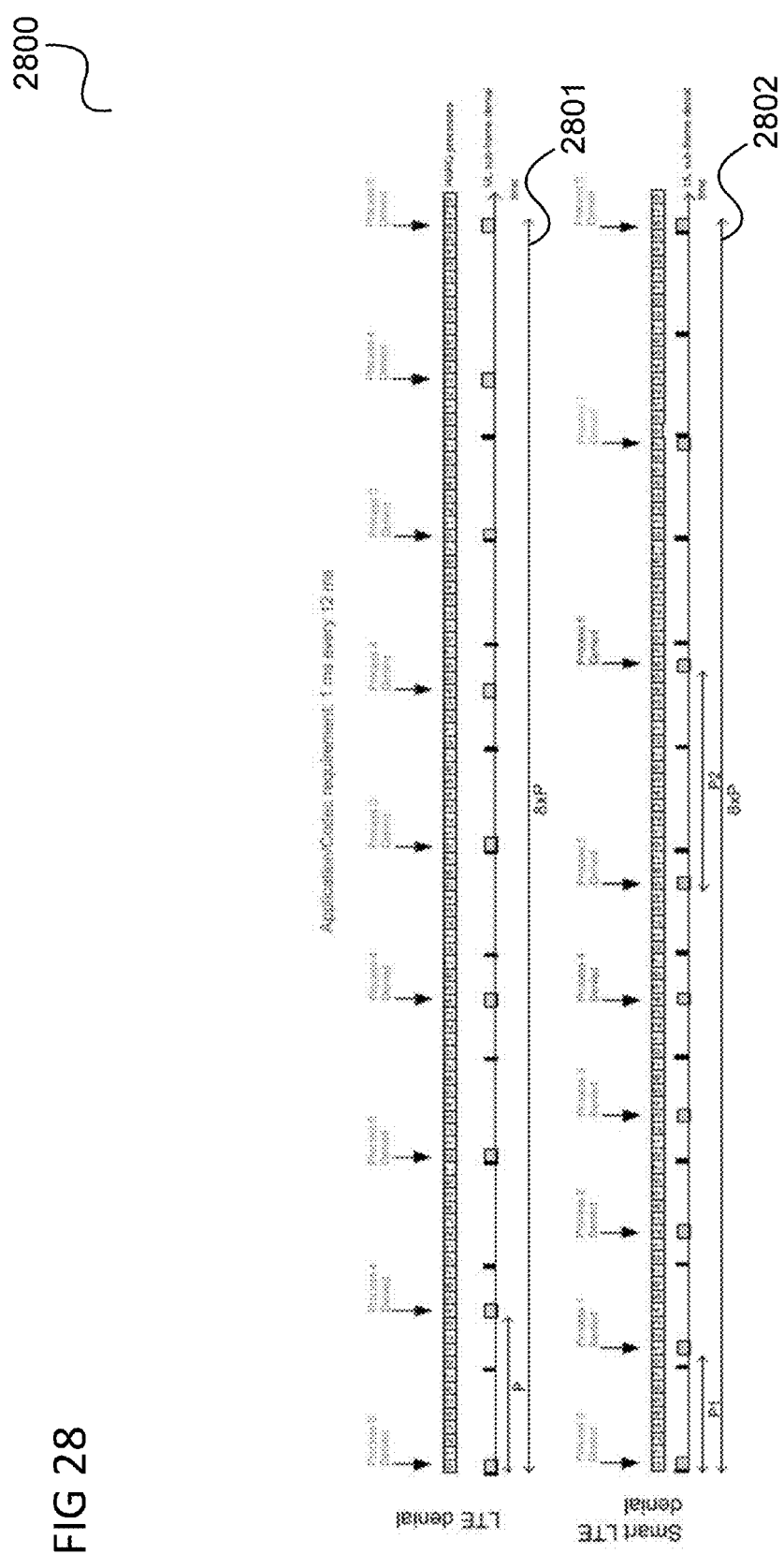
FIG. 28 shows a transmission diagram.

FIG. 28 shows a transmission diagram 2800.

Along a first time line 2801, UL sub-frame denial and the allocation of the TTIs to HARQ processes (numbered 0 to 7) are indicated. In this example, there are regular LTE denials such that processes 0 and 4 are periodically (every second time) denied.

A periodic LTE-denial of period 9 ms impacts same HARQ process only once every eight LTE-denials.

Periodic denial without taking into account the HARQ behavior may have highly negative effects even with a low amount of denial: it may lead to a weaker link (best case) or HARQ failure (worst case). A weaker link may lead to eNodeB link adaptation, reduced resource allocation while HARQ failure may lead either to data loss (RLC in unacknowledged mode) or to a RLC re-transmission with corresponding delay.

It is desirable to avoid applying LTE-denial periods which have such negative impact on HARQ. However, LTE-denial requirements may come from applications/codecs on the connectivity (CWS) side and many codecs have periodic requirements. In the following, mechanisms for smart LTE denial, enabling periodic LTE-denial to support application/codec requirements while minimizing its impact on the HARQ processes, or avoiding periodic LTE-denial when applicable.

For example, following provisions can be taken in applying LTE-denial to minimize impact on HARQ Bursty denial: when there is no stringent requirements from applications/codecs for periodic medium access (e.g. in case of HTTP traffic carried over WLAN), the denied subframes are grouped together (in bursts of time-contiguous sub frames) to minimize the number of successive denials of a given HARQ process (i.e. of denials of TTIs allocated to the same HARQ process). For example, infrequent bursts with duration lower than 8 ms impact each HARQ process at most once. Therefore, it is likely to be completely mitigated by the HARQ.

Smart denial: when bursty denial cannot be applied, a denial pattern is generated which minimizes the impact over HARQ while ensuring periodicity requirements. This pattern is designed to maximize time spacing between successive denials (cancellation) of subframes carrying a given HARQ process:

This approach is optimal with respect to LTE link robustness preservation (HARQ process protection)

Requirements on periodicity are fulfilled in average (the LTE-denial is performed with the required period in average over the full LTE-denial pattern). The pattern includes varying the period between two LTE denials.

Avoid underflow/overflow for codec with periodic behavior

The general pattern generation algorithm for smart LTE denial may for example be as follows:

Requirements:
P: period requirement (in ms)
N: duration requirement (in ms)
W: HARQ window length (8 ms for UL)
Algorithm:

```
Find P1 <= P such that
  [ (MOD(P1,W) >=N) OR (MOD(P1,W)>=W-N) ]
       AND
  (MOD(P1,W) + N) is even
If (P1 = P)
  apply P continuously
else
  apply K1 times P1 with K1= W-abs(P-P1)
  apply K2 times P1+W with K2 = P-P1
```

A simple implementation example of this algorithm is described here below:

$P1 = P - abs(mod(P, W) - N)$ $P2 = P1 + W$ $K1 = W - (P - P1)$ $K2 = P - P1$

An example is illustrated in FIG. 28. Along a second time line 2802, UL sub-frame denial and the allocation of the TTIs to HARQ processes are indicated, wherein the periods between the LTE denials has been determined according to the above algorithm. In this case, the LTE denial pattern period P1 is applied K1 times and P2 is applied K2 times. As can be seen, it is avoided that TTIs allocated to the same HARQ processes are periodically denied.

It should be noted that this pattern generation algorithm is applicable autonomously in the mobile terminal 105. It is also potentially applicable for 3GPP-Release 11 IDC where the possibility to have LTE gap creation decided at eNodeB level is under discussion. In this case definition of LTE denial patterns may be required and the ones described above may be optimal from a robustness point of view.

In the following, a mechanism for Smart VoLTE (Voice over LTE)-BT HFP coexistence is described.

In this use case, the mobile terminal 105 is assumed to be connected to an earphone via BT and a voice call is received or placed over LTE (VoLTE). It is further assumed that the mobile terminal 105 acts as a master BT device (in other words the BT entity in the mobile terminal 105 is assumed to have the master role). If this is not the case, a BT Role Switch command may be issued.

Bluetooth communications are organized in piconets. with a single master controlling the traffic allocation over 625 µs long time slots. This is illustrated in FIG. 29.

Figure 29:
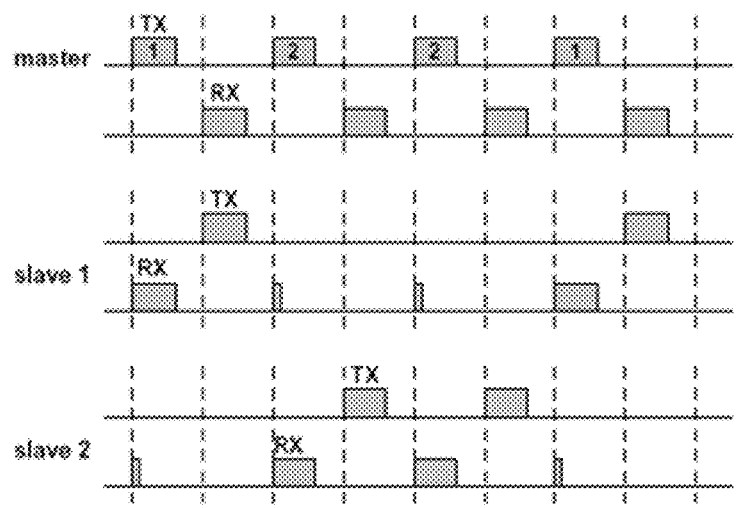
FIG. 29 shows a transmission diagram.

FIG. 29 shows a transmission diagram.

The transmission diagram shows transmissions (TX) and receptions (RX) by a master device, a first slave device (slave 1) and a second slave device (slave 2). The master has transmission opportunities on even slots while the slaves can transmit in odd slots only (based on allocations from the master). The slaves listens on all potential master transmissions, every 1.25 ms, except if they are in a sleep mode (sniff, park, hold modes) where this constraints are relaxed.

For an earphone connection, the BT entities are typically paired and in low power mode (e.g. one traffic exchange every 50 to 500 ms). When a call starts, the BT entities switch into HFP profile (Hands Free Profile) with very frequent periodic eSCO (extended Synchronous Connection Oriented) or SCO (Synchronous Connection Oriented) traffics. This is illustrated in FIG. 30.

Figure 30:
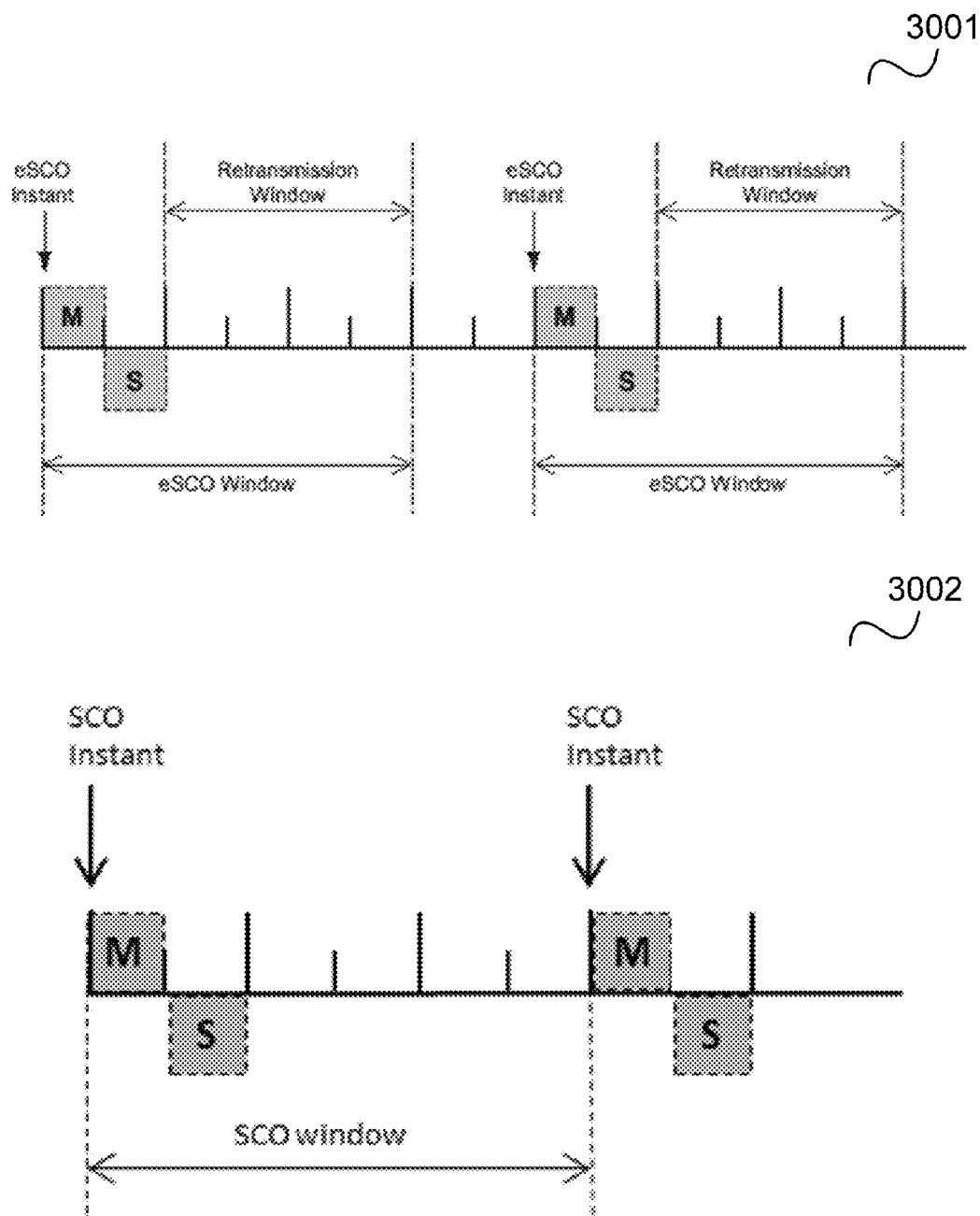
FIG. 30 shows transmission diagrams.

FIG. 30 shows transmission diagrams 3001, 3002.

The first transmission diagram 3001 illustrates eSCO communication between a master (M) and a slave (S) and the second transmission diagram 3002 illustrates SCO communication between the master and the slave.

Typically, as illustrated in FIG. 30, for HFP eSCO set-up has a eight slots period with two consecutive slots dedicated to master and slave transmission followed by retransmission opportunities and SCO set-up has a six slots period with two consecutive slots dedicated to master and slave transmission followed by four idle slots and there is no retransmission opportunity.

It should be noted that once BT devices are paired, a piconet is created and hence BT system clock and slot counter are on. For example, the odd and even slots are then determined. So an attempt to synchronize the Bluetooth system clock with respect to LTE system clock may not be possible after piconet establishment, neither defining odd and even slots. It should further be noted that the term TTI herein refers to the LTE TTI (1 ms) and Ts refers to the BT time slot duration (0.625 ms).

In the following, protection of BT eSCO is described. This is applicable to the case where a Bluetooth entity (e.g. realized by the second transceiver 1018) is using the HFP profile to carry voice from/to the headset with eSCO traffic.

Figure 31:
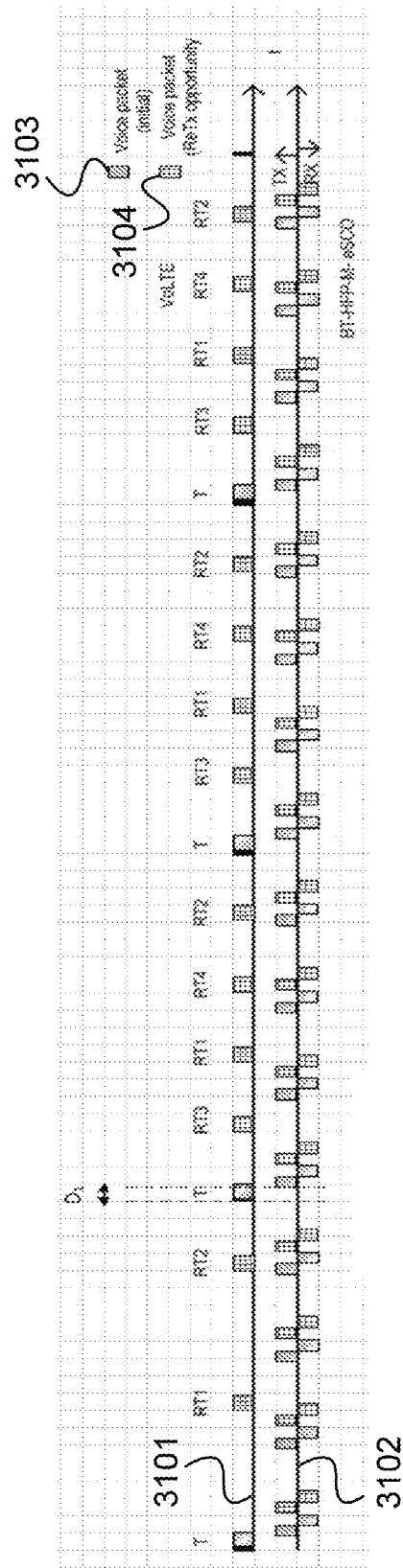
FIG. 31 shows a transmission diagram.

FIG. 31 shows a transmission diagram 3100.

A top time line 3101 represents VoLTE traffic in LTE-FDD UL over the air (1 ms grid). The HARQ process is synchronous with a 8 ms period and the voice codec has a 20 ms period.

Sub frames with T and RTn labels correspond to the initial transmission of a VoLTE sub-frame and to its n-th retransmission (in the sense of HARQ retransmission). VoLTE original sub-frames are illustrated by a first hatching 3103 and potential retransmission are illustrated by a second hatching 3104.

A bottom time line 3102 shows the Bluetooth HFP traffic, seen from the master point of view and based on eSCO packets. BT slots with second hatching 3104 corresponds to potential BT retransmissions as per eSCO traffic definition.

Due to both traffic characteristics (periods and duration), applying MAC protocol synchronization can allow efficient coexistence between VoLTE and BT HFP operations. Two different trade-offs are possible, a first one where only the BT-HFP-eSCO initial reception is protected from LTE UL interference and a second one where both BT-HFP-eSCO initial reception and retransmitted slot reception are protected.

Reception of the original packet transmitted by the BT slave can be protected from the LTE re-transmission under following conditions:

Protection from T $mod(D_0, 5TTI) >= TTI - T_s$ OR
$mod(D_0, 5TTI) <= 5TTI - 2 T_s$ Protection from RT1

$mod(D_0, 5TTI) <= 3TTI - 2 T_s$ OR
$mod(D_0, 5TTI) >= 4TTI - T_s$

Protection from RT2

$mod(D_0, 5TTI) <= TTI - 2 T_s$ OR
$mod(D_0, 5TTI) >= 2TTI - T_s$

Protection from RT3

$$\mod(D_0, 5\text{TTI}) <= 4\text{TTI}-2\text{Ts} \text{ OR } \mod(D_0, 5\text{TTI}) >= 5 \text{ TTI}-\text{Ts}$$

Reception of the packet re-transmitted by the BT slave can be protected from the LTE re-transmission under following conditions:

Protection from T $$\mod(D_0, 5\text{TTI}) >= 4\text{TTI} \text{ OR } \mod(D_0, 5\text{TTI}) <= 3\text{TTI}-\text{Ts}$$

Protection from RT1

$$\mod(D_0, 5\text{TTI}) <= \text{TTI}-\text{Ts} \text{ OR } \mod(D_0, 5\text{TTI}) >= 2\text{TTI}$$

Protection from RT2

$$\mod(D_0, 5\text{TTI}) <= 4\text{TTI}-\text{Ts} \text{ OR } \mod(D_0, 5\text{TTI}) >= 0$$

Protection from RT3

$$\mod(D_0, 5\text{TTI}) <= 2\text{TTI}-\text{Ts} \text{ OR } \mod(D_0, 5\text{TTI}) >= 3 \text{ TTI}$$

As a first approach for VoLTE and BT eSCO coexistence, BT may be protected from LTE TX, ReTx1, ReTx2, ReTX3 (i.e. protected of the first transmission and the first three retransmissions of a packet), without BT retry protection.

In this case, the BT initial packet exchange (1 TX slot+1 RX slot) is protected from the LTE UL transmissions as long as the LTE does not retransmit four times consecutively for the same HARQ process. BT retransmission if any may be jammed by LTE UL transmission. This may be realized by requiring the BT master initial packet transmission is delayed vs LTE initial sub frame transmission by $D_0$ with $2\text{TTI}-\text{Ts}<=\mod(D_0, 5\text{TTI})<=3 \text{ TTI}-2 \text{ Ts}$, e.g. $1375 \mu s<=\mod(D_0, 5 \text{ ms})<=1750 \mu s$. An example is shown in FIG. 32.

Figure 32:
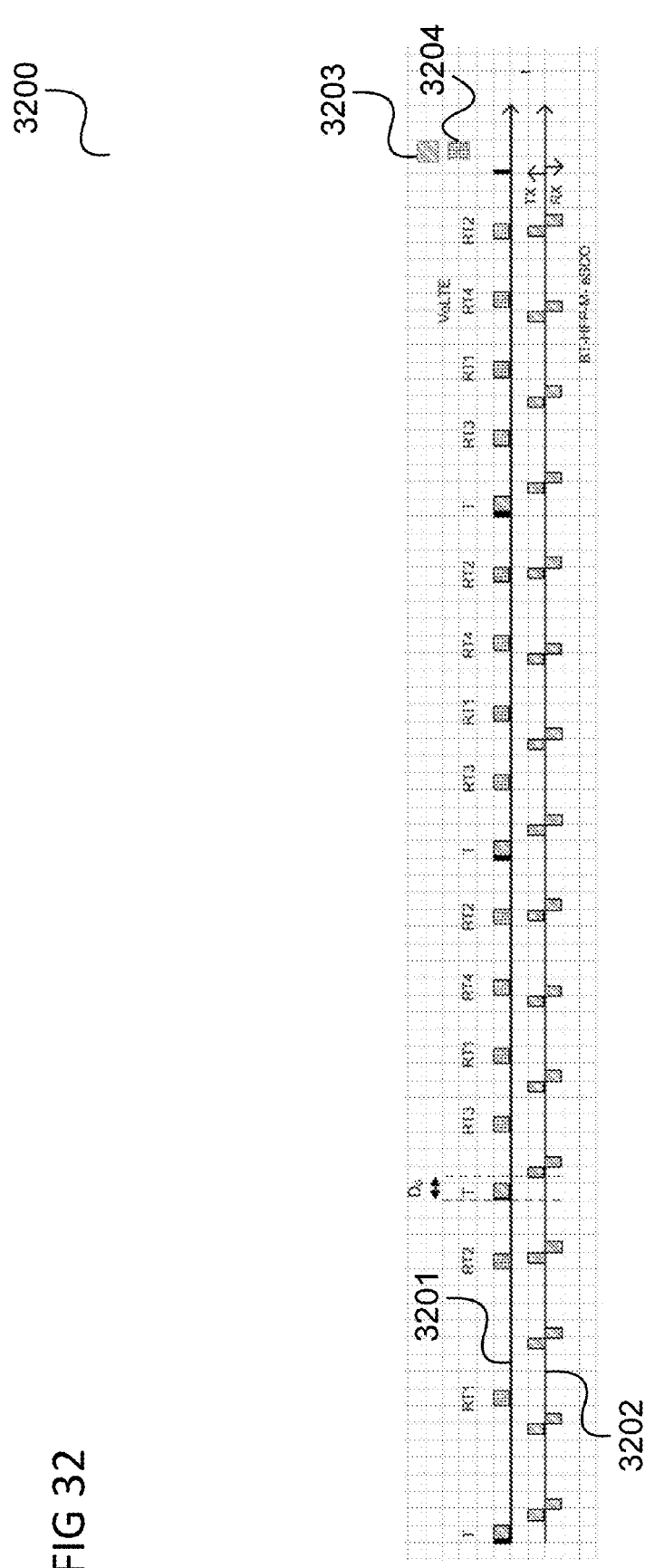
FIG. 32 shows a transmission diagram.

FIG. 32 shows a transmission diagram 3200.

A top time line 3201 represents VoLTE traffic in LTE-FDD UL. Sub frames with T and RTn labels correspond to the initial transmission of a VoLTE sub-frame and to its n-th retransmission (in the sense of HARQ retransmission). VoLTE original sub-frames are illustrated by a first hatching 3103 and potential retransmission are illustrated by a second hatching 3104.

A bottom time line 3102 shows the Bluetooth HFP traffic, seen from the master point of view and based on eSCO packets. BT slots with second hatching 3104 corresponds to potential BT retransmissions as per eSCO traffic definition.

As a second approach for VoLTE and BT eSCO coexistence, BT and BT repeat (i.e. BT packet retransmission) may be protected from LTE TX and ReTx1 (i.e. from packet transmissions and the first packet retransmission). In this case, the BT initial packet exchange (1 TX slot+1 RX slot) and its potential first re-transmission is protected from the LTE UL transmissions as long as the LTE system does not retransmit two times consecutively for the same HARQ process. If LTE system retransmits more than two times some BT transmissions/retransmissions may be jammed. This may be realized by requiring that the BT master initial packet transmission is delayed vs. LTE initial sub frame transmission by $D_1$ with $D_1=\text{TTI}-\text{Ts}$. For example, $\mod(D_1, 5 \text{ ms})=375$ us for eSCO and eSCO repeat protection from LTE T and RT1. This transmission scenario corresponds to the one shown in FIG. 31.

As a third approach for VoLTE and BT eSCO coexistence BT may be protected from LTE TX, ReTx1. BT retry is not protected.

In this case, the BT initial packet exchange (1 TX slot+1 RX slot) is protected from the LTE UL transmissions as long as the LTE does not retransmit two times consecutively for the same HARQ process. If LTE retransmits more than two times some BT transmission/retransmission may be jammed This may be realized by requiring that BT master initial packet transmission is delayed vs LTE initial sub frame transmission by $D_0$ with $\text{TTI}-\text{Ts}<=\mod(D_{3,5}, \text{ TTI})<=3 \text{ TTI}-2 \text{ Ts}$. For example, $375 \mu s<=\mod(D_3, 5 \text{ ms})<=1625$ us for eSCO protection from LTE T, RT1. This transmission scenario corresponds to the one shown in FIG. 31.

As a further approach BT SCO may be protected as follows. According to Bluetooth the HFP profile may be used to carry voice from/to a headset with SCO traffic which occupies ⅓ of the communication medium time and has no retransmission capability. An example is given in FIG. 33.

Figure 33:
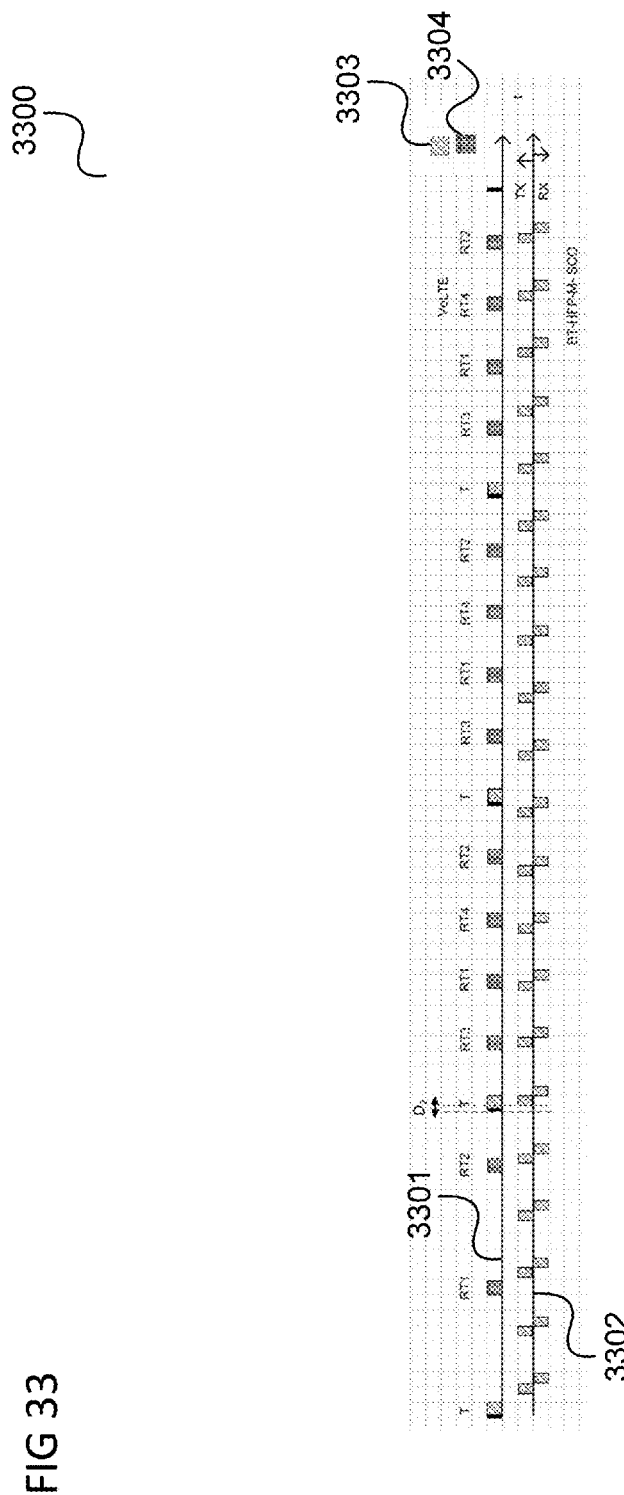
FIG. 33 shows a transmission diagram.

FIG. 33 shows a transmission diagram 3300.

A top time line 3301 represents VoLTE traffic in LTE-FDD UL. Sub frames with T and RTn labels correspond to the initial transmission of a VoLTE sub-frame and to its n-th retransmission (in the sense of HARQ retransmission). VoLTE original sub-frames are illustrated by a first hatching 3103 and potential retransmission are illustrated by a second hatching 3104.

A bottom time line 3102 shows the Bluetooth HFP traffic, seen from the master point of view and based on SCO packets.

Two thirds of the BT packet exchange (1 TX slot+1 RX slot) are protected from the LTE UL transmissions. If some LTE retransmission occurs it is likely to jam some more BT slots. This can be realized by requiring that BT delayed vs LTE active sub-frame start between TTI−Ts and TTI and $\text{TTI}-\text{Ts}<=\mod(D_2, 6 \text{ Ts})<=\text{TTI}$. For example, $375 \mu s<=\mod(D_2, 3.75 \text{ ms})<=1$ ms for minimum LTE VoLTE interference over SCO traffic. If $D_2$ is not within this range, then two thirds of the SCO packet may be jammed by the VoLTE sub-frame transmissions.

In summary, the delays or range of delays between VoLTE Tx and BT master Tx identified above (which may be considered as optimum) provide minimum collision likelihood between VoLTE subframe transmissions and BT HFP packet receptions. The delay requirements are derived corresponding to eSCO packets usage for BT HFP profile or SCO packets usage.

Usage of eSCO packet may be desirable as it coexists much better with the VoLTE traffic pattern. If SCO is used one third of the BT packets is lost due to collision with VoLTE UL sub frames, and it cannot be solved via LTE denial of this frames as it the effect on call quality would be worse (20 ms loss vs 5 ms loss).

Also among eSCO solutions, the third approach may be desirable because:

- it is sufficient to completely protect BT initial receptions
- its delay requirements are quite loose (2×BT Tslots); this can be exploited in case of LTE handover during the call.

A possible concept may be as follows:

A) call set-up
1) BT Pairing which typically happens prior to VoLTE call establishment is done without any specific coexistence constraints.
2) When the LTE call is established, information of the periodically allocated sub-frames (SPS based) is passed to the BT added in NRT messaging. It may for example be available 5 to 10 ms after the SPS pattern is applied.
3) The BT master then interpret the SPS indication message (period, duration, offset) and use the LTE frame sync RT signal as a sync reference.
4) When establishing the eSCO/SCO traffic, the BT master allocates the BT slots which fulfill the delay requirements with respect to VoLTE transmissions (which is always possible as for the third approach the delay is 2×Tslot).

B) LTE Handover

When LTE performs handover during the VoLTE call from a first cell to a second cell, the LTE system clock in the first cell may differ in phase from the LTE system clock in the second cell (or second sector). SPS allocation may be different as well. As a consequence the delay between BT and VoLTE traffic patterns may not be fulfilled anymore:

1) Handover and new SPS allocation may then be provided to BT via NRT messaging
2) BT master may change BT slots allocation for the eSCO traffic in order to fulfill again the delay requirement (always possible only with the third approach described above).

It should be noted that due to the absence of a timestamp mechanism, it may not be guaranteed yet that BT can derive directly the VoLTE subframe positions from the SPS indication in NRT messaging. If not, the BT entity may detect them via monitoring of the LTE UL gap envelop (RT interface) using the SPS period information. As it may take several VoLTE cycles to acquire VoLTE sync in this way, the BT may do a blind eSCO scheduling at start-up and reschedule it once the VoLTE subframes have been identified.

This mechanism may be seen to be optimized for VoLTE with 20 ms period, however it may be used for any SPS based LTE traffic. Only the delay requirements may be adapted.

In summary, for LTE–WLAN/BT coexistence in context of protocol mitigations, the following may be provided/performed:

Coexistence-friendly handover

SR postponing

Ignoring UL grant

LTE denial control (algorithm with monitoring of packet error rate)

Minimizing the impact of LTE denial over LTE HARQ and hence on the LTE link robustness (e.g. by a corresponding algorithm)

Minimizing the impact of BT HFP traffic over VoLTE traffic

Figure 34:
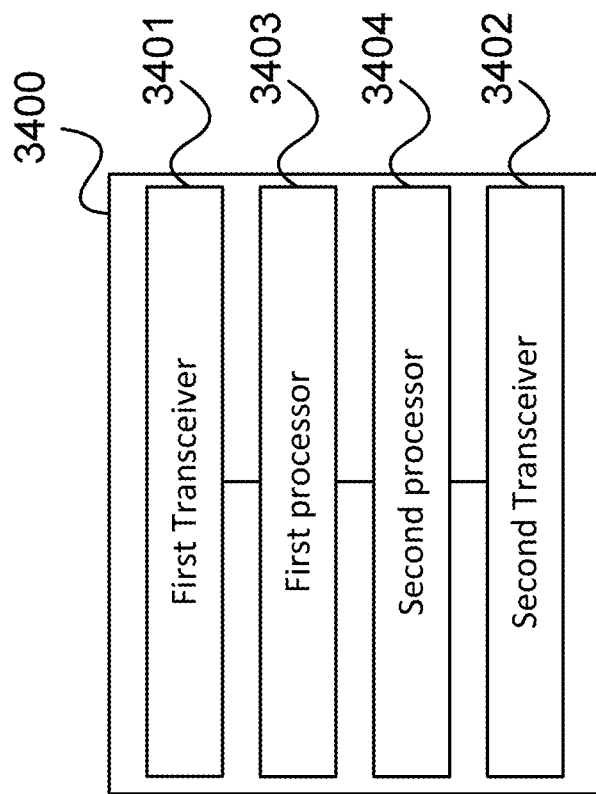
FIG. 34 shows a radio communication device.

According to one aspect of this disclosure, a radio communication device is provided as illustrated in FIG. 34.

FIG. 34 shows a radio communication device 3400.

The radio communication device 3400 includes a first transceiver 3401 configured to transmit and receive signals in accordance with a Cellular Wide Area radio communication technology and a second transceiver 3405 configured to transmit and receive signals in accordance with a Short Range radio communication technology.

The radio communication device 3400 further includes a first processor 3403 configured to control the first transceiver 3401 to receive and transmit data packets in accordance with a first data transmission frame and a second processor 3404 configured to control the second transceiver 3402 to receive and transmit data packets in accordance with a second data transmission frame.

The first processor is further configured to control the first transceiver 3401 such that the first transceiver 3401 does not transmit a data packet during at least a time period provided for a first transmission of a respective data packet transmitted by the second transceiver 3402 in accordance with the second data transmission frame.

It should be noted that although a connection of the first transceiver 3401 and the second transceiver 3402 via the processors 3403, 3404 is illustrated, the first transceiver 3401 and the second transceiver 3402 may also be directly connected.

The first processor may be further configured to control the first transceiver such that the first transceiver does not transmit a data packet during at least a further time period provided for a possible re-transmission of a respective data packet transmitted by the second transceiver in accordance with the second data transmission frame.

The first processor may be further configured to control the first transceiver such that the first transceiver does not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame.

The first processor may be further configured to control the first transceiver in accordance with an automatic repeat request mechanism.

For example, the first processor is further configured to control the first transceiver in accordance with a hybrid automatic repeat request mechanism including a plurality of automatic repeat request processes for transmitting data.

The first processor may be further configured to control the first transceiver such that the first transceiver does not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame using the same automatic repeat request process.

The first processor may be further configured to control the first transceiver in accordance with a hybrid automatic repeat request mechanism on a Medium Access Control layer.

The second processor is for example further configured to control the second transceiver such that in case the second data transmission frame has been allocated and after this allocation, the first data transmission frame is allocated, the second data transmission frame is re-allocated taking into account the allocated first data transmission frame.

The second processor is for example further configured such that the re-allocation of the second data transmission frame only changes an allocation of time slots within the second data transmission frame for at least one of transmitting and receiving signals.

The second processor may be further configured to change a slave characteristic of the second transceiver to a master characteristic of the second transceiver upon receipt of a corresponding command signal received from the first processor.

The second processor may be further configured to control the second transceiver such that in case the second data transmission frame has been allocated and after this allocation, the second processor receives a handover indication of the first transceiver including an indication of a changed first data transmission frame, the second data transmission frame is re-allocated taking into account the changed first data transmission frame.

The first transceiver may be further configured to transmit and receive signals in accordance with a Third Generation Partnership Project radio communication technology.

The first transceiver may be configured to transmit and receive signals in accordance with a 4G radio communication technology.

For example, the first transceiver is configured to transmit and receive signals in accordance with a Long Term Evolution radio communication technology.

The second transceiver may be configured to transmit and receive signals in accordance with a Short Range radio communication technology selected from a group consisting of:
  Bluetooth radio communication technology;
  Ultra Wide Band radio communication technology;
  Wireless Local Area Network radio communication technology;
  Infrared Data Association radio communication technology;
  Z-Wave radio communication technology;
  ZigBee radio communication technology;
  HIgh PErformance Radio LAN radio communication technology;
  IEEE 802.11 radio communication technology; and
  Digital Enhanced Cordless Telecommunications radio communication technology.

The second transceiver may be configured to transmit and receive signals in accordance with a Bluetooth radio communication technology; and
wherein the second processor is further configured to switch from a Bluetooth low power mode into an active Bluetooth Hands Free Profile when a Cellular Wide Area radio communication is established.

The may be configured as a radio communication terminal device.

Figure 35:
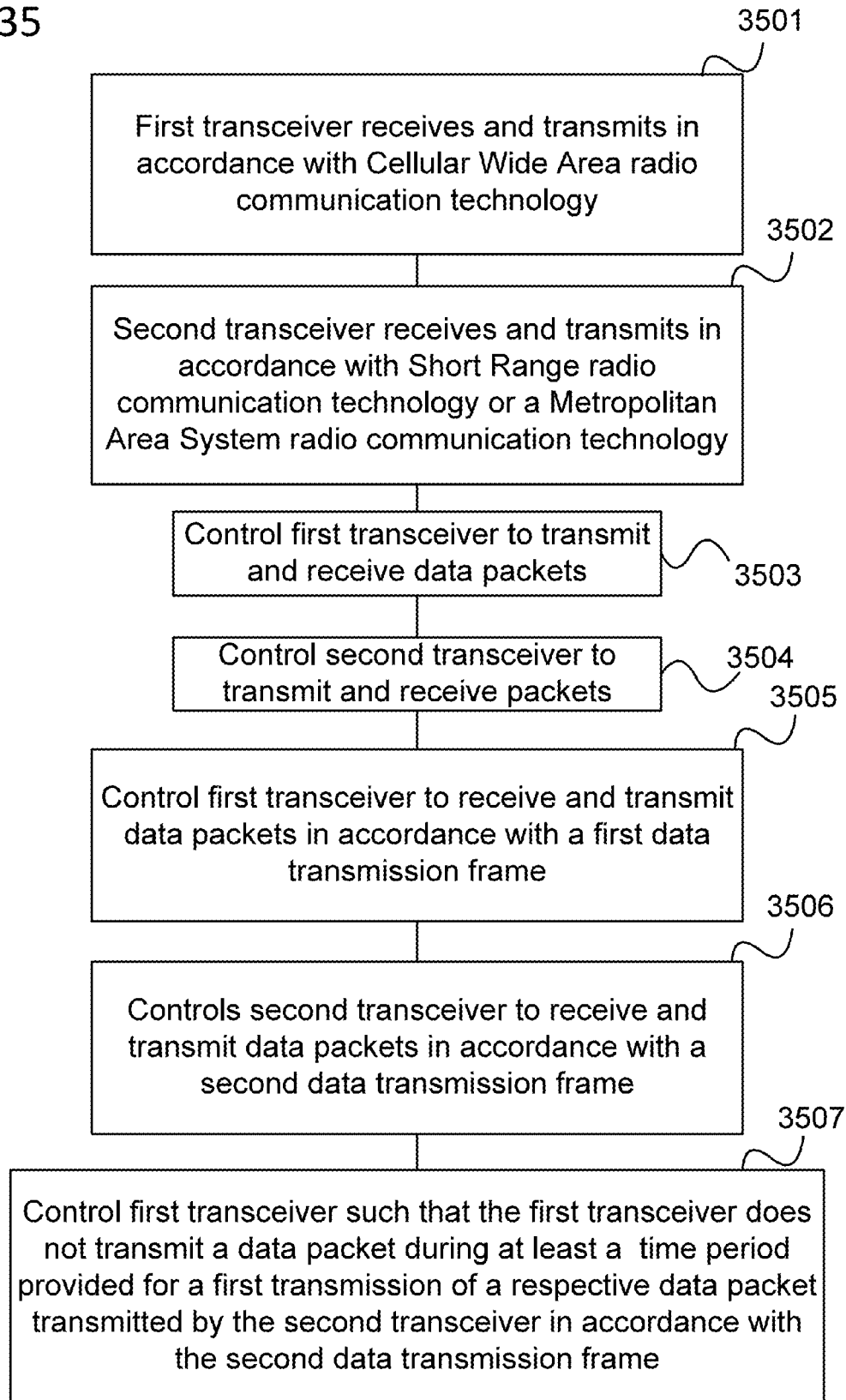
FIG. 35 shows a flow diagram.

According to one aspect of this disclosure, a method for operating a radio communication device as illustrated in FIG. 35 is provided.

FIG. 35 shows a flow diagram 3500.

In 3501, a first transceiver transmits and receives signals in accordance with a Cellular Wide Area radio communication technology.

In 3502, a second transceiver transmits and receives signals in accordance with a Short Range radio communication technology.

In 3503, the first processor controls the first transceiver to receive and transmit data packets in accordance with a first data transmission frame.

In 3504, the second processor controls the second transceiver to receive and transmit data packets in accordance with a second data transmission frame.

In 3505, the first processor further controls the first transceiver such that the first transceiver does not transmit a data packet during at least a time period provided for a first transmission of a respective data packet transmitted by the second transceiver in accordance with the second data transmission frame.

The first processor may further control the first transceiver such that the first transceiver does not transmit a data packet during at least a further time period provided for a possible re-transmission of a respective data packet transmitted by the second transceiver in accordance with the second data transmission frame.

The first processor may further control the first transceiver such that the first transceiver does not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame.

The first processor may further control the first transceiver in accordance with an automatic repeat request mechanism.

The first processor may further control the first transceiver in accordance with a hybrid automatic repeat request mechanism including a plurality of automatic repeat request processes for transmitting data.

The first processor may further control the first transceiver such that the first transceiver does not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame using the same automatic repeat request process.

For example, the first processor further controls the first transceiver in accordance with a hybrid automatic repeat request mechanism on a Medium Access Control layer.

The second processor may control the second transceiver such that in case the second data transmission frame has been allocated and after this allocation, the first data transmission frame is allocated, the second data transmission frame is re-allocated taking into account the allocated first data transmission frame.

The second processor may re-allocates the second data transmission frame such that it only changes an allocation of time slots within the second data transmission frame for at least one of transmitting and receiving signals.

The second processor may changes a slave characteristic of the second transceiver to a master characteristic of the second transceiver upon receipt of a corresponding command signal received from the first processor.

The second processor may control the second transceiver such that in case the second data transmission frame has been allocated and after this allocation, the second processor receives a handover indication of the first transceiver including an indication of a changed first data transmission frame, the second data transmission frame is re-allocated taking into account the changed first data transmission frame.

The first transceiver may transmit and receive signals in accordance with a Third Generation Partnership Project radio communication technology.

The first transceiver may transmit and receive signals in accordance with a 4 G radio communication technology.

For example, the first transceiver transmits and receives signals in accordance with a Long Term Evolution radio communication technology;

According to one aspect of this disclosure, the second transceiver transmits and receives signals in accordance with a Short Range radio communication technology selected from a group consisting of:
  Bluetooth radio communication technology;
  Ultra Wide Band radio communication technology;
  Wireless Local Area Network radio communication technology;
  Infrared Data Association radio communication technology;
  Z-Wave radio communication technology;
  ZigBee radio communication technology;
  HIgh PErformance Radio LAN radio communication technology;
  IEEE 802.11 radio communication technology; and
  Digital Enhanced Cordless Telecommunications radio communication technology.

According to one aspect of this disclosure, the second transceiver transmits and receives signals in accordance with a Bluetooth radio communication technology and the second processor further switches from a Bluetooth low power mode into an active Bluetooth Hands Free Profile when a Cellular Wide Area radio communication is established.

In the radio communication device 3400, the first transceiver for example corresponds to the LTE subsystem 2101, the second transceiver corresponds to the WLAN/Bluetooth communication circuit 2102. The first processor and the second processor may correspond to corresponding controllers of these communication modules. For example, the first processor may correspond to the communication circuit 2104. The first processor may for example correspond (or include) the RT arbitration entity 2111. Alternatively, any of the corresponding tasks may be carried out by the application processor 2105.

Further examples for LTE/BT/WLAN coexistence are given in the following.

The NRT arbiter 2108 uses a mixture of application requirements (from connectivity and LTE apps) and context information from both cores, i.e. both LTE and Bluetooth or WLAN (e.g. band, bandwidth, EARFCN) to arbitrate and indicate static information such as selected frequency bands or selected power levels to LTE and connectivity (i.e. Bluetooth or WLAN). It may also provide indications to the RT arbiter located in LTE subsystem.

For example, the NRT arbiter 2108 does not arbitrate between WLAN and BT (arbitration between these is for example done in the connectivity chip).

When the LTE subsystem camps on a new cell, the LTE SW indicates the new LTE Information to the NRT 2108 arbiter and this information is stored to be reused in NRT algorithms e.g. according to 2407, 2408, 2410.

The NRT arbiter may then run an NRT algorithm protecting BT from LTE-FDD.

This algorithm is run in the NRT arbitration unit 2108. It is split in two subroutines:
Subroutine 1 is activated each time the LTE subsystem 2101 camps on a new cell while BT is active (BT state is for example indicated separately via the NRT coexistence interface). It determines the frequency range where BT can co-run safely with LTE in worst case condition. Subroutine 1 is illustrated in FIG. 36.

Figure 36:
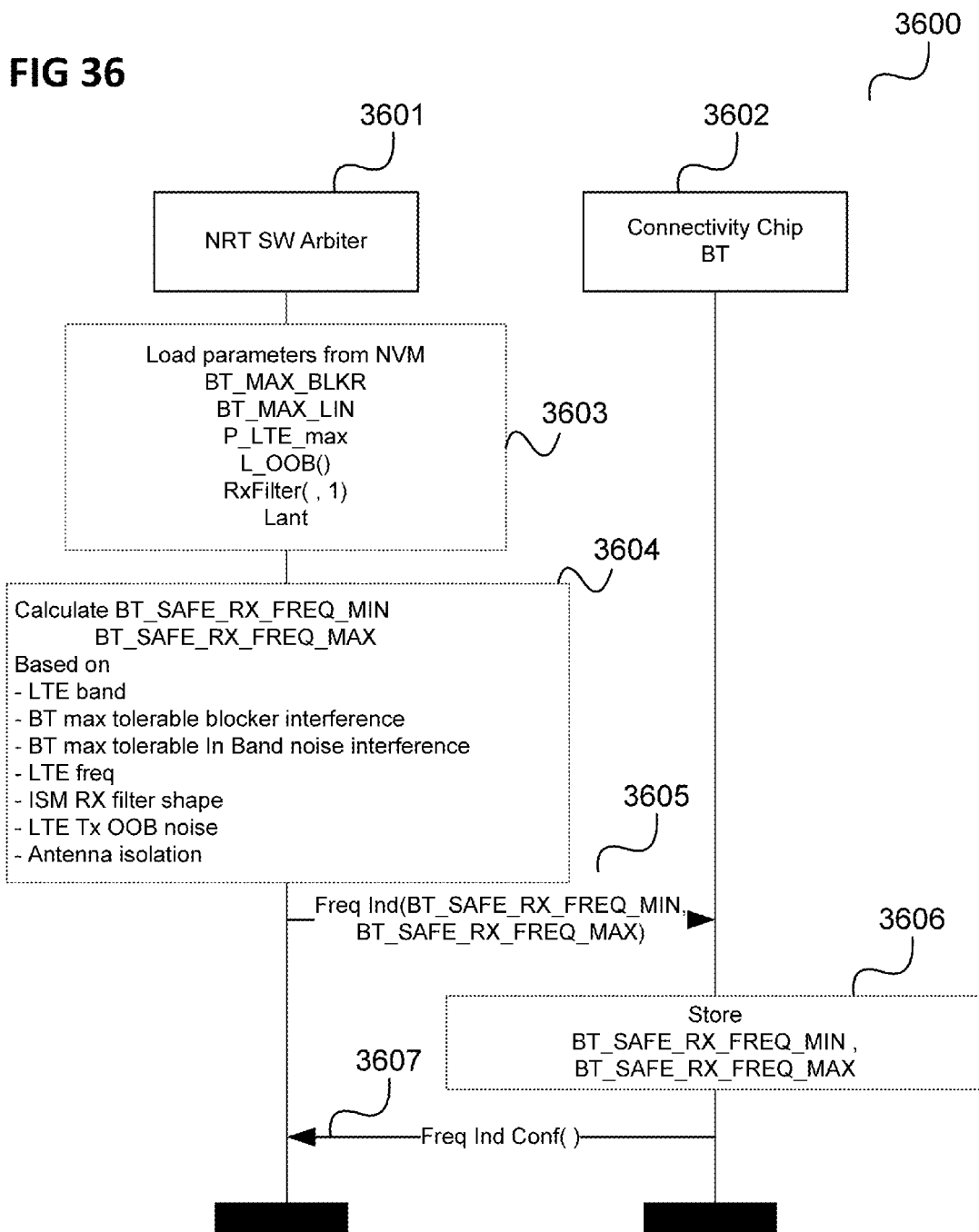
FIG. 36 shows a message flow diagram illustrating a process for BT/LTE coexistence.

FIG. 36 shows a message flow diagram 3600.

The message flow takes place between an NRT arbiter 3601 corresponding to the NRT arbiter 2108 and a BT communication circuit 3602 corresponding to the WLAN/BT communication circuit 2102.

In 3603, the NRT arbiter 3601 loads parameters from a non-volatile memory. These may include the parameters Lant (antenna isolation) between LTE Tx and WLAN/BT Rx, P_LTE_max (maximum power of LTE), Nmin required minimum number of BT channels to apply AFH, BT_max_PSD (in dBm/Mhz) (maximum BT power spectral density), BT_MAX_BLKR (BT maximum tolerable blocker interference), BT_MAX_LIN (BT maximum tolerable In Band noise interference), L_OOB( ) (contains LTE transmitter Out Of Band spectrum (relative to In Band power)) and ISM RX filter shape parameters (e.g. Band7Filter(, 1) (or RxFilter (, 1)).

In 3604, the NRT arbiter 3601 calculates BT_SAFE_RX_FREQ_MIN and BT_SAFE_RX_FREQ_MAX based on
  LTE band
  BT max tolerable blocker interference
  BT max tolerable In Band noise interference
  LTE freq
  ISM RX filter shape
  LTE Tx OOB noise
  Antenna isolation
BT_SAFE_RX_FREQ_MIN, BT_SAFE_RX_FREQ_MAX give the ISM frequency range (1 Mhz accuracy) fulfilling co-running targets (de-sense, throughput loss) in worst case (LTE max power, max bandwidth, BT RX @sensitivity level). These are for example static such that they can be pre-calculated and stored in a look-up table.

In 3605, the NRT arbiter 3601 communicates BT_SAFE_RX_FREQ_MIN and BT_SAFE_RX_FREQ_MAX to the BT communication circuit 3602.

In 3606, the BT communication circuit 3602 stores BT_SAFE_RX_FREQ_MIN and BT_SAFE_RX_FREQ_MAX and confirms reception of these parameters in 3607. Subroutine 2 is illustrated in FIG. 37.

Figure 37:
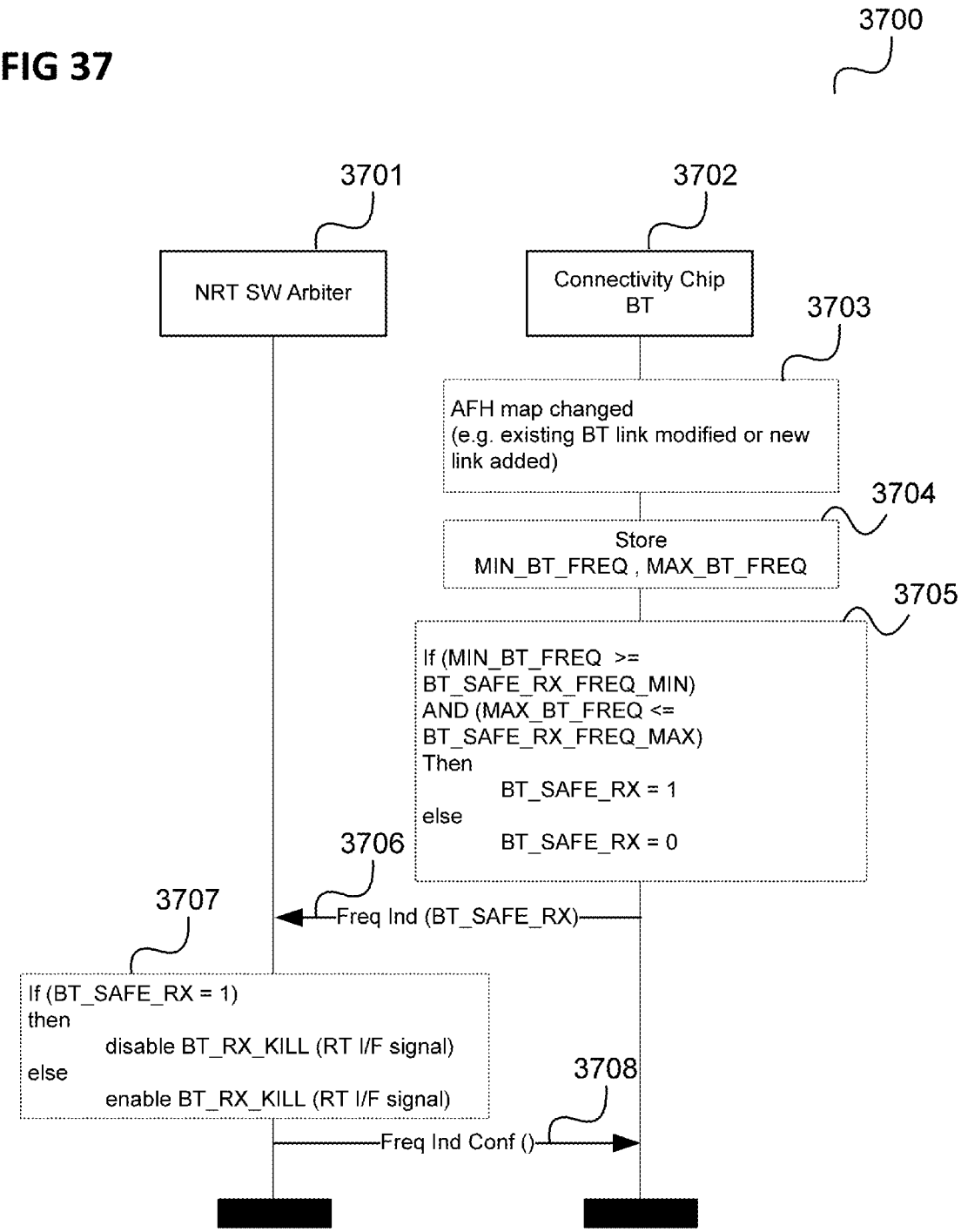
FIG. 37 shows a message flow diagram illustrating a process for BT/LTE coexistence.

FIG. 37 shows a message flow diagram 3700.

The message flow takes place between an NRT arbiter 3701 corresponding to the NRT arbiter 2108 and a BT communication circuit 3702 corresponding to the WLAN/BT communication circuit 2102.

Subroutine 2 is activated each time the BT communication circuit 3702 modifies its AFH map in 3703.

This modification is for example done autonomously on BT side either for traffic purpose or for coexistence purpose.

In 3704, the BT communication circuit 3702 then stores the minimum BT frequency and the maximum BT frequency according to the changed AFH map.

In 3705, the BT core (i.e. the BT communication circuit 3702) assesses whether its full AFH map is contained in the safe frequency range and indicates the result to NRT arbiter 3701 (in this example by means of a single bit indication) in 3706. When receiving the information the NRT arbiter 3701 enables/disables the real time interface (or a subset of the real interface where differentiation between BT and WLAN is possible) in 3707 and sends a confirmation to the BT communication circuit 3702 in 3708.

In case of no way to differentiate between WiFi and BT, if the parameters BT_RX_KILL and WIFI_RX_KILL (see FIG. 39) are both disabled then the real time interface is disabled. Otherwise the real time interface is enabled.

Further, the NRT arbiter may run an NRT algorithm protecting WLAN from LTE-FDD.

This algorithm is run in the NRT arbitration unit 2108. It is split in two subroutines:
Subroutine 1 is activated each time the LTE subsystem 2101 camps on a new cell while WLAN is active (WLAN state is for example indicated separately via the NRT coexistence interface). It determines the frequency range where WLAN can co-run safely with LTE. Subroutine 1 is illustrated in FIG. 38.

Figure 38:
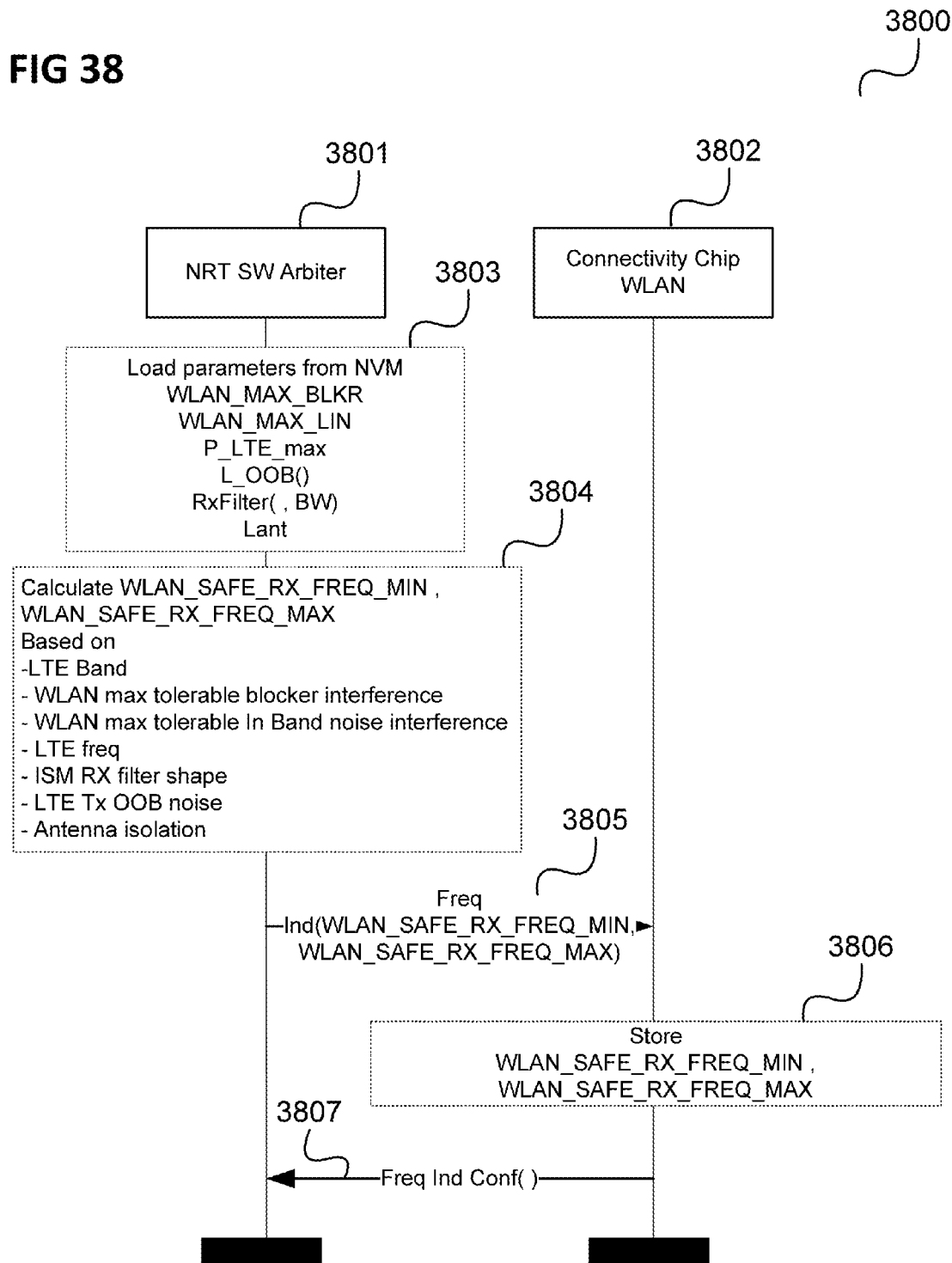
FIG. 38 shows a message flow diagram illustrating a process for WiFi/LTE coexistence.

FIG. 38 shows a message flow diagram 3800.

The message flow takes place between an NRT arbiter 3801 corresponding to the NRT arbiter 2108 and a WLAN communication circuit 3802 corresponding to the WLAN/BT communication circuit 2102.

In 3803, the NRT arbiter 3801 loads parameters from a non-volatile memory. These may include the parameters Lant (antenna isolation) between LTE Tx and WLAN/BT Rx, P_LTE_max (maximum power of LTE), WLAN_max_PSD (maximum WLAN power spectral density), WLAN_MAX_BLKR (WLAN maximum tolerable blocker interference), WLAN_MAX_LIN (WLAN maximum tolerable In Band noise interference), L_OOB( ) (contains LTE transmitter Out Of Band spectrum (relative to In Band power)) and ISM RX filter shape parameters (e.g. Band7Filter(,BW) (or RxFilter (,BW)). Band7Filter(, BW) is the ISM RX filter shape integrated over LTE cell BW. 5 Band7Filter tables are stored in NVM corresponding to BW=1, 5, 10, 15, 20 Mhz).

In 3804, the NRT arbiter 3801 calculates WLAN_SAFE_RX_FREQ_MIN and WLAN_SAFE_RX_FREQ_MAX based on
LTE band
WLAN max tolerable blocker interference
WLAN max tolerable In Band noise interference
LTE freq
ISM RX filter shape
LTE Tx OOB noise
Antenna isolation
WLAN_SAFE_RX_FREQ_MIN, WLAN_SAFE_RX_FREQ_MAX give the ISM frequency range (1 Mhz accuracy) fulfilling co-running targets (de-sense, throughput loss) in worst case (LTE max power, max bandwidth, WLAN RX @sensitivity level). These are for example static such that they can be pre-calculated and stored in a look-up table.

In 3805, the NRT arbiter 3801 communicates WLAN_SAFE_RX_FREQ_MIN and WLAN_SAFE_RX_FREQ_MAX to the WLAN communication circuit 3802.

In 3806, the WLAN communication circuit 3802 stores WLAN_SAFE_RX_FREQ_MIN and WLAN_SAFE_RX_FREQ_MAX and confirms reception of these parameters in 3807. Subroutine 2 is illustrated in FIG. 39.

Figure 39:
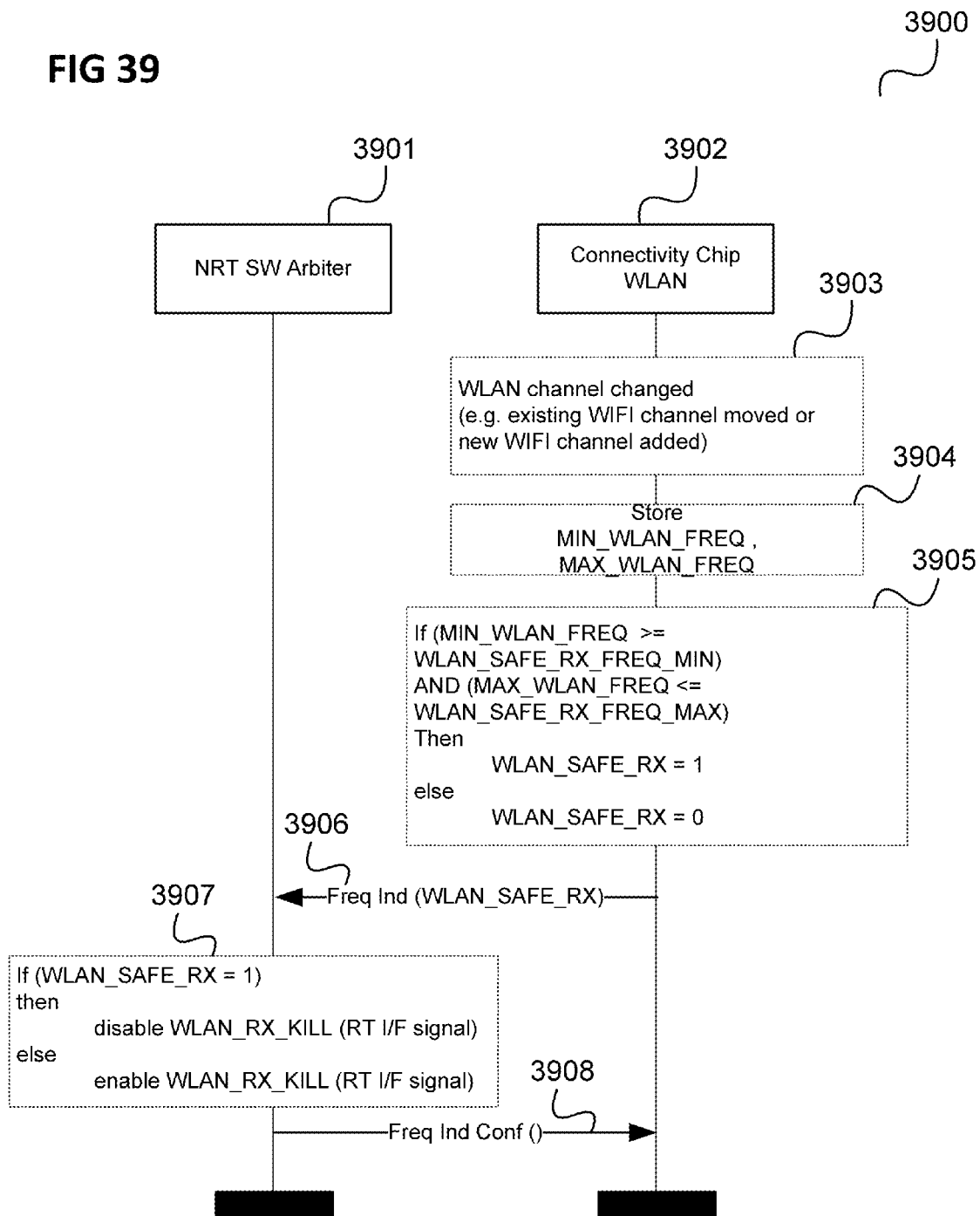
FIG. 39 shows a message flow diagram illustrating a process for WiFi/LTE coexistence.

FIG. 39 shows a message flow diagram 3900.

The message flow takes place between an NRT arbiter 3901 corresponding to the NRT arbiter 2108 and a WLAN communication circuit 3902 corresponding to the WLAN/BT communication circuit 2102.

Subroutine 2 is activated each time the WLAN communication circuit 3902 modifies its list of active WLAN channels in 3903.

This modification is for example done autonomously on WLAN side either for traffic purpose or for coexistence purpose.

In 3904, the WLAN communication circuit 3902 then stores the minimum WLAN frequency and the maximum WLAN frequency according to the changed list of active WLAN channels.

In 3905, the WLAN core (i.e. the WLAN communication circuit 3902) assesses whether its WLAN channels are in the safe frequency range and indicates the result to NRT arbiter 3901 (in this example by means of a single bit indication) in 3906. When receiving the information the NRT arbiter 3901 enables/disables the real time interface (or a subset of the real interface where differentiation between BT and WLAN is possible) in 3907 and sends a confirmation to the WLAN communication circuit 3902 in 3908. In case of no way to differentiate between WiFi and BT, if the parameters BT_RX_KILL (see FIG. 39) and WIFI_RX_KILL are both disabled then the real time interface is disabled. Otherwise the real time interface is enabled.

In the following, further examples for the non real time application interface, the non real time coexistence interface and parameters stored in non-volatile memory are given.

The NRT Application Interface transfers messages carrying application information about connectivity and LTE applications. The "I/O" field has the following meaning for parameters: "I" means from AP to NRTA, "O" means from NRTA to AP.

TABLE 11

Non Real Time applications coexistence interface

| Parameter | Info Bits | I/O | Description |
| --- | --- | --- | --- |
| PERIOD | 16 | I/O | Required application service period ms. Overrides any previous use. |
| DURATION | 6 | I/O | Required application service duration ms. Overrides any previous use. |

The NRT coexistence interface transfers messages carrying CWS information. The "I/O" field has the following meaning for parameters: "I" means from CWS to NRTA, "O" means from NRTA to CWS.

TABLE 12

Non Real Time coexistence interface

| Parameter | Info bits | I/O | Description |
| --- | --- | --- | --- |
| WLAN_ACTIVE | 1 | I | NRT controller is enabled by this indication -> Replace IS_COEX previously in NRT Apps I/F |
| WLAN_SAFE_RX | 1 | I | Indication that WLAN operation stays withing the safe freq range (used to disable the RT I/F or the WLAN portion of it) |
| WLAN_BANDWIDTH | 2 | I | WLAN Bandwidth 0 = 20 MHz, 1 = 40 MHz, 2 = 80 MHz, 3 = Invalid |
| BT_ACTIVE | 1 | I | NRT controller is enabled by this indication -> Replace IS_COEX previously in NRT Apps I/F |
| BT_SAFE_RX | 1 | I | Indication that BT operation stays withing the safe freq range (used to disable the RT I/F or the BT portion of it) |
| LTE_ACTIVE | 1 | O | Used by CWS -> indication to CWS that LTE corrunning constraints are released |
| WLAN_LTE_EN | 1 | O | Transmission of WLAN packets shorter than 2 LTE OFDM symbols For future use:LTE-TDD only |
| LTE_SPS_PATTERN | 24 | O | SPS Periodicity (ms): 11 bits SPS event duration (ms): 9 bits SPS initial offset (sub-frame offset in first LTE frame where SPS is applied): 4 bits TBC: Indicate periodic LTE activity to the connectivity chip. This one can then exploit this for its own scheduling. |

TABLE 12-continued

Non Real Time coexistence interface

| Parameter | Info bits | I/O | Description |
|---|---|---|---|
| LTE_BITMAP | 10 × 2 | O | 0 = Special subframe<br>1 = RX LTE subframe<br>2 = TX LTE subframe<br>For future use: Indicate LTE-TDD frame structure to the connectivity cores. |
| WLAN_SAFE_RX_FREQ_MIN | 12 | O | Lower limit of freq range where WLAN can receive during LTE Tx (worst case, static approach)<br>In Mhz |
| WLAN_SAFE_RX_FREQ_MAX | 12 | O | Upper limit of freq range where WLAN can receive during LTE Tx (worst case, static approach)<br>In Mhz |
| BT_SAFE_RX_FREQ_MIN | 12 | O | Lower limit of freq range where BT can receive during LTE Tx (worst case, static approach)<br>In Mhz |
| BT_SAFE_RX_FREQ_MAX | 12 | O | Upper limit of freq range where BT can receive during LTE Tx (worst case, static approach)<br>In Mhz |
| WLAN_TX_POWER | 4 | I/O | WLAN Tx power (applied or to be applied)<br>For future use (LTE-TDD). To be used by NRT controller to evaluate WLAN interference over LTE (usefull in tethering case where WLAN Tx power can be reduced). |

The following table lists examples for parameters stored in non-volatile memory used.

TABLE 13

| NVM Parameters |
|---|
| NVM Parameter |
| NRT_capability |
| BT_Max_PSD |
| BT_channel_freq |
| Nmin |
| P_LTE_max |
| L_OOB |
| Band7Filter |
| Lant |

In the radio communication devices 3400, 4300, the first transceiver for example corresponds to the LTE subsystem 2101, the second transceiver corresponds to the WLAN/Bluetooth communication circuit 2102. The first processor and the second processor may correspond to corresponding controllers of these communication modules. For example, the first processor may correspond to the communication circuit 2104. The first processor may for example correspond (or include) the RT arbitration entity 2111. Alternatively, any of the corresponding tasks may be carried out by the application processor 2105.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
   a first transceiver configured to transmit and receive signals in accordance with a Cellular Wide Area radio communication technology;
   a second transceiver configured to transmit and receive signals in accordance with a Short Range radio communication technology;
   a first processor configured to control the first transceiver to receive and transmit data packets during at least one data transmission frame; and
   a second processor configured to control the second transceiver to receive and transmit data packets during the at least one data transmission frame based on at least one desensing threshold for the second transceiver;
   wherein after transmission by the first transceiver has begun, the first processor is further configured to stop the first transceiver from transmitting a data packet during the entirety of the at least one data transmission frame to allow unilateral transmission by the second transceiver during the at least one data transmission frame; and wherein the first processor is further configured to control the first transceiver to not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame.

2. The radio communication device of claim 1, wherein the first processor is further configured to control the first transceiver such that the first transceiver does not transmit a data packet during at least a further time period provided for a possible re-transmission of a respective data packet transmitted by the second transceiver in accordance with the second data transmission frame.

3. The radio communication device of claim 1, wherein the first processor is further configured to control the first transceiver in accordance with an automatic repeat request mechanism.

4. The radio communication device of claim 3, wherein the first processor is further configured to control the first transceiver in accordance with a hybrid automatic repeat request mechanism comprising a plurality of automatic repeat request processes for transmitting data.

5. The radio communication device of claim 4, wherein the first processor is further configured to control the first transceiver such that the first transceiver does not transmit a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame using the same automatic repeat request process.

6. The radio communication device of claim 1, wherein the first processor is further configured to control the first transceiver in accordance with a hybrid automatic repeat request mechanism on a Medium Access Control layer.

7. The radio communication device of claim 1, wherein the second processor is further configured to control the second transceiver such that in case the second data transmission frame has been allocated and after this allocation, the first data transmission frame is allocated, the second data transmission frame is re-allocated taking into account the allocated first data transmission frame.

8. The radio communication device of claim 7, wherein the second processor is further configured such that the re-allocation of the second data transmission frame only changes an allocation of time slots within the second data transmission frame for at least one of transmitting and receiving signals.

9. The radio communication device of claim 1, wherein the second processor is further configured to change a slave characteristic of the second transceiver to a master characteristic of the second transceiver upon receipt of a corresponding command signal received from the first processor.

10. The radio communication device of claim 1, wherein the second processor is further configured to control the second transceiver such that in case the second data transmission frame has been allocated and after this allocation, the second processor receives a handover indication of the first transceiver comprising an indication of a changed first data transmission frame, the second data transmission frame is re-allocated taking into account the changed first data transmission frame.

11. The radio communication device of claim 1, wherein the first transceiver is configured to transmit and receive signals in accordance with a Third Generation Partnership Project radio communication technology.

12. The radio communication device of claim 1, wherein the first transceiver is configured to transmit and receive signals in accordance with a 4G radio communication technology.

13. The radio communication device of claim 12, wherein the first transceiver is configured to transmit and receive signals in accordance with a Long Term Evolution radio communication technology.

14. The radio communication device of claim 1, wherein the second transceiver is configured to transmit and receive signals in accordance with a Short Range radio communication technology selected from a group consisting of: Bluetooth radio communication technology; Ultra Wide Band radio communication technology; Wireless Local Area Network radio communication technology; Infrared Data Association radio communication technology; Z-Wave radio communication technology; ZigBee radio communication technology; HIgh PErformance Radio LAN radio communication technology; IEEE 802.11 radio communication technology; and Digital Enhanced Cordless Telecommunications radio communication technology.

15. The radio communication device of claim 1, wherein the second transceiver is configured to transmit and receive signals in accordance with a Bluetooth radio communication technology; and wherein the second processor is further configured to switch from a Bluetooth low power mode into an active Bluetooth Hands Free Profile when a Cellular Wide Area radio communication is established.

16. The radio communication device of claim 1, being configured as a radio communication terminal device.

17. A method for operating a radio communication device, the method comprising:
transmitting and receiving signals by a first transceiver in accordance with a Cellular Wide Area radio communication technology during at least one data transmission frame;
transmitting and receiving signals by a second transceiver in accordance with a Short Range radio communication technology during the at least one data transmission frame based on at least one desensing threshold for the second transceiver;
stopping the first transceiver from transmitting data packets during the at least one data transmission frame by a first processor after the first transceiver has already begun transmitting; wherein the first processor is configured to stop the first transceiver from transmitting during the entirety of the at least one data transmission frame to allow unilateral transmission by the second transceiver during the at least one data frame; wherein the first processor further controls the first transceiver to stop the first transceiver from transmitting a data packet during at least a time period provided for a first transmission of a respective data packet transmitted by the second transceiver in accordance with the second data transmission frame only if a predefined number of retransmissions of a data packet by the first transceiver is transmitted in accordance with the first data transmission frame; and
controlling by a second processor the second transceiver to receive and transmit data packets in accordance with the at least one data transmission frame.

18. The method of claim 17, wherein the first processor further controls the first transceiver such that the first transceiver does not transmit a data packet during at least a further time period provided for a possible re-transmission of a respective data packet transmitted by the second transceiver in accordance with the second data transmission frame.

* * * * *